United States Patent
Kitada et al.

(10) Patent No.: US 9,602,413 B2
(45) Date of Patent: Mar. 21, 2017

(54) BANDWIDTH CONTROL DEVICE AND METHOD TO REDUCE DIFFERENCE IN PASS BANDWIDTH

(71) Applicant: FUJITSU LIMITED, Kawasaki-shi, Kanagawa (JP)

(72) Inventors: Atsushi Kitada, Kawasaki (JP); Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 14/638,734

(22) Filed: Mar. 4, 2015

(65) Prior Publication Data

US 2015/0312156 A1    Oct. 29, 2015

(30) Foreign Application Priority Data

Apr. 25, 2014 (JP) ................................ 2014-091450
Sep. 30, 2014 (JP) ................................ 2014-202275

(51) Int. Cl.
*H04L 12/26* (2006.01)
*H04L 12/813* (2013.01)
*H04L 12/823* (2013.01)

(52) U.S. Cl.
CPC .......... *H04L 47/20* (2013.01); *H04L 43/0882* (2013.01); *H04L 43/16* (2013.01); *H04L 47/32* (2013.01)

(58) Field of Classification Search
CPC .......... H04L 47/20; H04L 47/22; H04L 47/26; H04L 47/32
USPC .............................. 370/230, 230.1, 235, 236
See application file for complete search history.

(56) References Cited

U.S. PATENT DOCUMENTS

| | | | | |
|---|---|---|---|---|
| 5,493,566 A | * | 2/1996 | Ljungberg | .............. H04L 47/10 370/231 |
| 6,324,165 B1 | * | 11/2001 | Fan | ..................... H04L 12/5602 370/232 |
| 6,865,156 B2 | * | 3/2005 | Horioka | .............. H04L 12/5601 370/236.1 |
| 7,864,677 B2 | * | 1/2011 | Sekido | .................... H04L 47/31 370/231 |
| 7,944,834 B2 | * | 5/2011 | Alesi | ....................... H04L 47/10 370/229 |

(Continued)

FOREIGN PATENT DOCUMENTS

JP    2009-194705    8/2009

*Primary Examiner* — Dmitry H Levitan
(74) *Attorney, Agent, or Firm* — Staas & Halsey LLP

(57) ABSTRACT

A bandwidth control device includes: a management unit to subtract, when a first bandwidth control device (first device) or one or more second bandwidth control devices (second devices) allow a packet to pass, an amount of the passed packet from a permissible passage amount to be passed the first device; and a correction unit to correct the permissible passage amount of the first device or a threshold value of the first device based on a result of a comparison between a passage amount of packets passed the first device and passage amounts of packets passed the second devices, wherein the first device determines whether a packet is to be allowed to pass through or not based on a result of a comparison between the permissible passage amount and the threshold value and allows the packet to pass or discard the packet according to the determination result.

18 Claims, 44 Drawing Sheets

(56) References Cited

U.S. PATENT DOCUMENTS

| | | | |
|---|---|---|---|
| 8,234,401 B2* | 7/2012 | Bettink | H04L 47/41 |
| | | | 370/229 |
| 9,054,996 B2* | 6/2015 | Voruganti | H04L 47/12 |
| 2009/0207729 A1 | 8/2009 | Sekido | |
| 2012/0127862 A1* | 5/2012 | Madsen | H04L 47/10 |
| | | | 370/235 |
| 2014/0161135 A1* | 6/2014 | Acharya | H04L 47/263 |
| | | | 370/412 |

* cited by examiner

FIG. 6
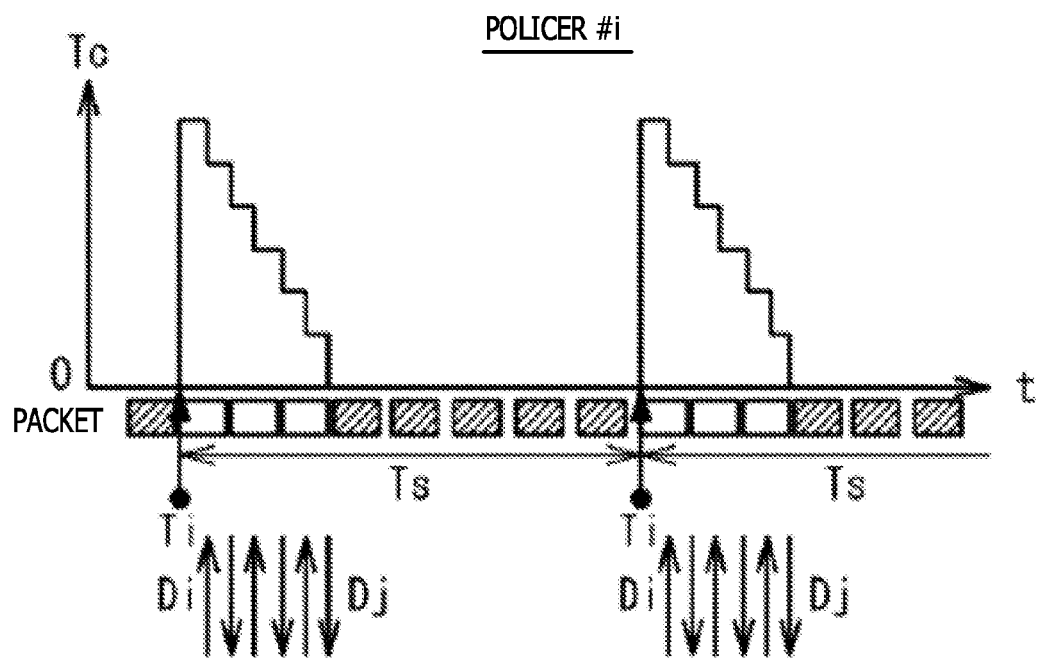
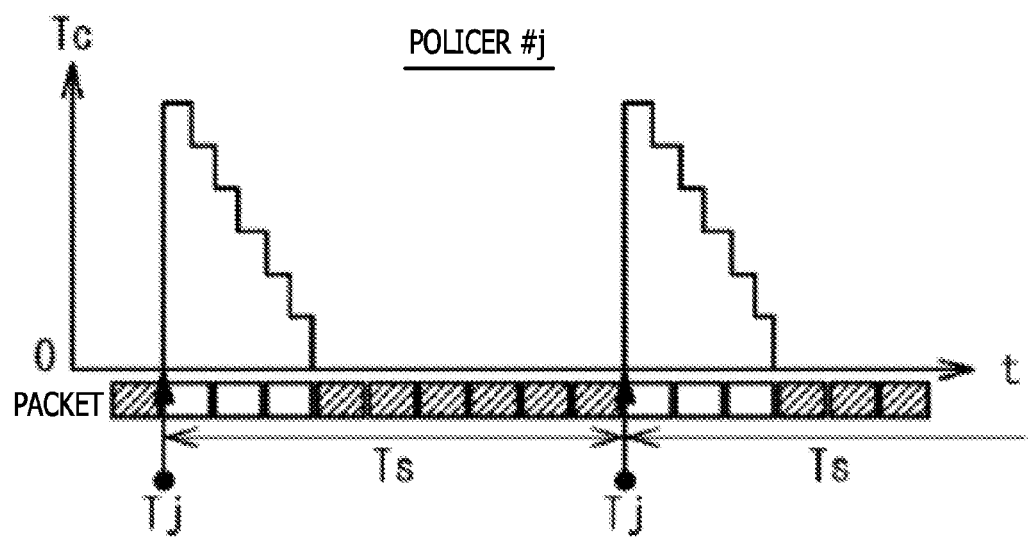

FIG. 9

| POLICER NUMBER | GROUP NUMBER | MAXIMUM ACCUMULATION AMOUNT [Byte] | SUPPLY AMOUNT(Tm) [Byte] | ACCUMULATION AMOUNT(Tc) [Byte] | CORRECTION VALUE(±Δth) [Byte] |
|---|---|---|---|---|---|
| 1 | 1 | 10000 | 3000 | −100 | 500 |
| 2 | 1 | 10000 | 3000 | 3000 | −740 |
| 3 | 4 | 5000 | 1000 | 1000 | 0 |
| 4 | 37 | 12000 | 2600 | 2600 | −200 |
| 5 | 2 | 7200 | 500 | 500 | 300 |
| ... | ... | ... | ... | ... | ... |
| M−1 | 15 | 3000 | 40 | 40 | −5 |
| M | 37 | 12000 | 2600 | 2600 | 100 |

FIG. 10

| POLICER NUMBER | POLICER NUMBER WITHIN A GROUP | PASSAGE AMOUNT [Byte] | CORRECTION ALLOW/DISALLOW FLAG |
|---|---|---|---|
| 1 | 1 | 3500 | 1 |
| | 2 | 7200 | 1 |
| | 15 | 500 | 0 |
| | 37 | 2800 | 1 |
| 2 | 2 | 6000 | 1 |
| | 1 | 3000 | 1 |
| | 15 | 300 | 0 |
| | 37 | 1000 | 1 |
| 3 | 3 | 3768 | 1 |
| | 46 | 2069 | 1 |
| ⋮ | ⋮ | ⋮ | ⋮ |
| M | M | 276 | 0 |
| | 4 | 4000 | 1 |
| | 217 | 1080 | 0 |

FIG. 28

| POLICER NUMBER | POLICER NUMBER WITHIN A GROUP | PASSAGE AMOUNT [Byte] | CORRECTION ALLOW/DISALLOW FLAG | | | |
| --- | --- | --- | --- | --- | --- | --- |
| | | | CALCULATION SECTION 1 | CALCULATION SECTION 2 | ... | CALCULATION SECTION Z |
| 1 | 1  | 3500 | 1 | 0 | | 1 |
|   | 2  | 7200 | 1 | 0 | | 0 |
|   | 15 | 500  | 0 | 0 | | 1 |
|   | 37 | 2800 | 1 | 1 | | 1 |
| 2 | 2  | 6000 | 1 | 1 | | 0 |
|   | 1  | 3000 | 1 | 1 | | 1 |
|   | 15 | 300  | 0 | 0 | | 0 |
|   | 37 | 1000 | 1 | 1 | | 1 |
| 3 | 3  | 3768 | 1 | 1 | | 1 |
|   | 46 | 2069 | 1 | 1 | | 1 |
| ⋮ | ⋮ | ⋮ | ⋮ | ⋮ | | ⋮ |
| N | N   | 276  | 0 | 0 | | 0 |
|   | 4   | 4000 | 1 | 1 | | 1 |
|   | 217 | 1080 | 0 | 0 | | 0 |

UPDATE   UPDATE   UPDATE

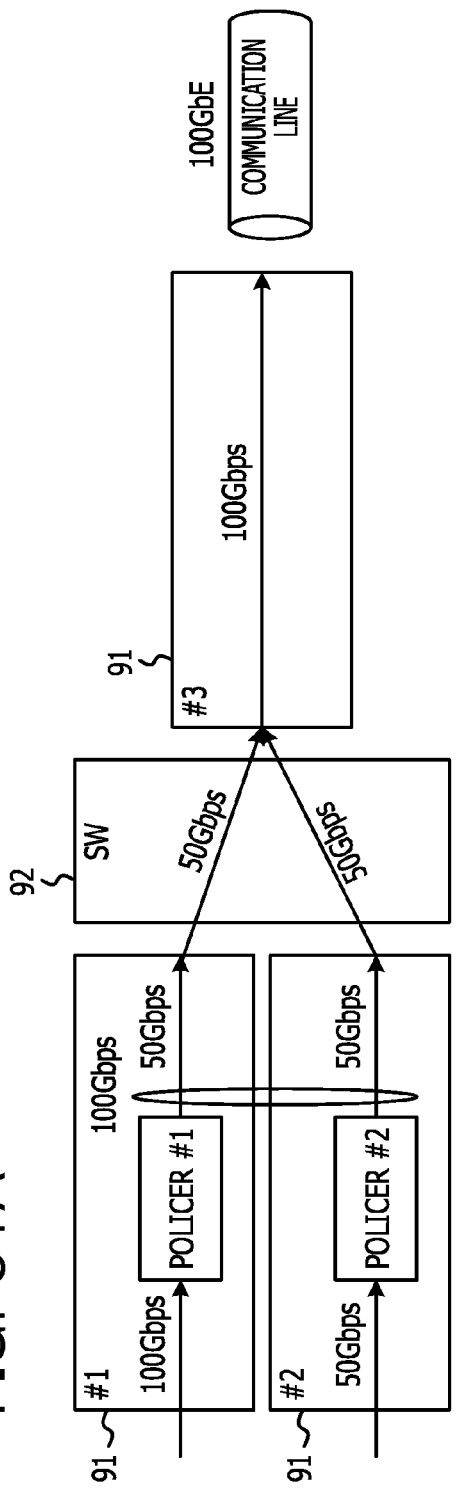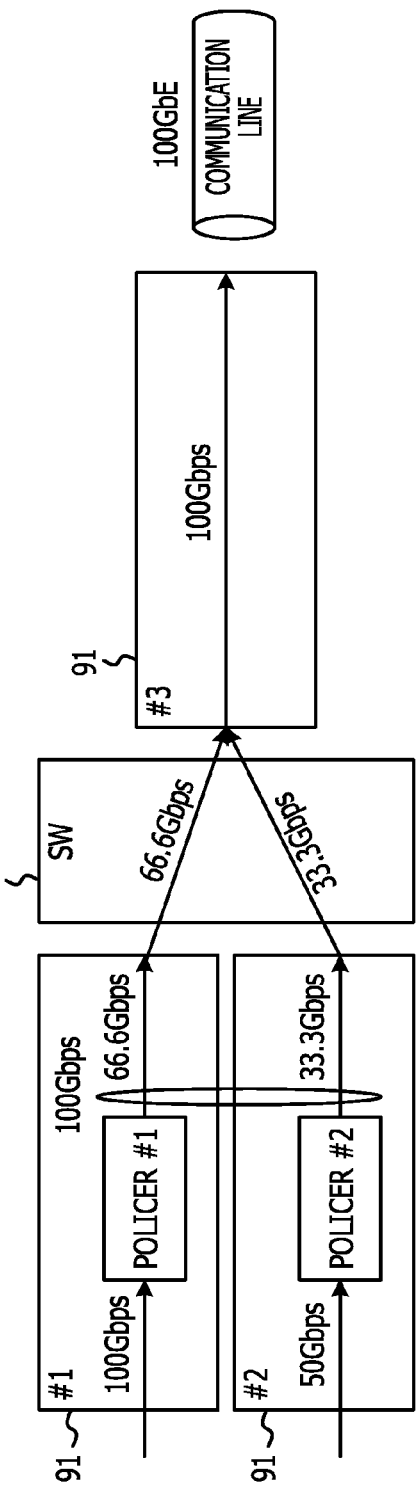

FIG. 32
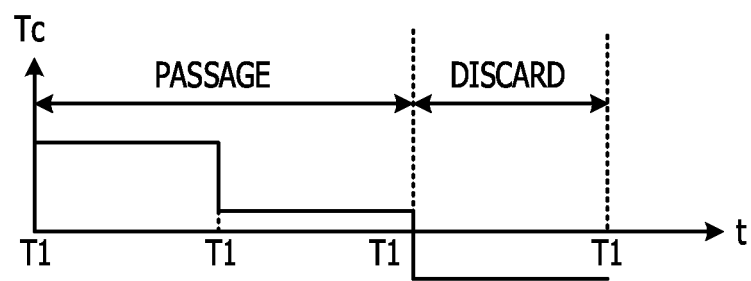
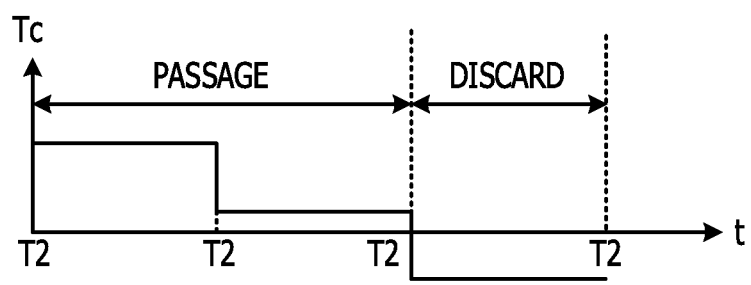

FIG. 33
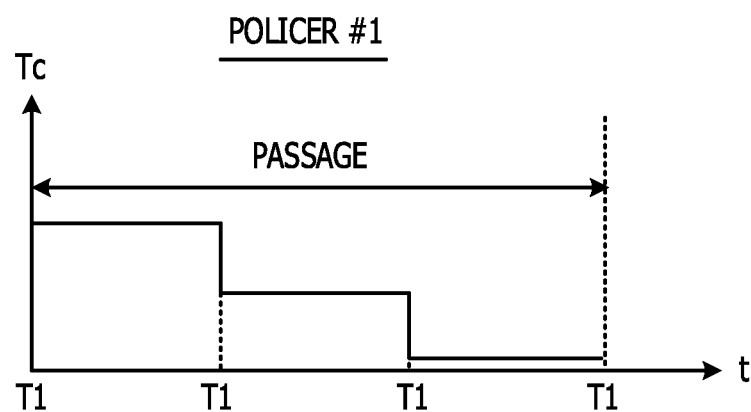
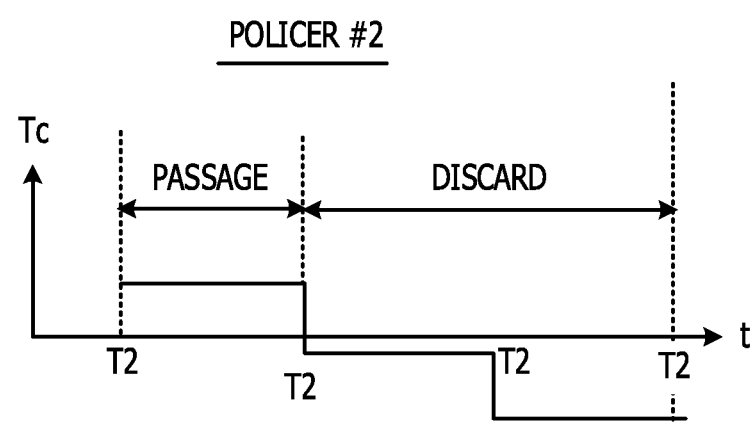

FIG. 35A

| POLICER NUMBER | POLICER NUMBER WITHIN A GROUP | PASSAGE AMOUNT [Byte] |
|---|---|---|
| 1 | 1 | 10000 |
|   | 2 | 10000 |
|   | N | 5000 |
| 2 | 2 | 12000 |
|   | 1 | 7200 |
|   | N | 30000 |
| ⋮ | ⋮ | ⋮ |
| N | N | 100 |
|   | 1 | 200 |
|   | 2 | 400 |

FIG. 35B

| POLICER NUMBER | POLICER NUMBER WITHIN A GROUP | PASSAGE AMOUNT [Byte] |
|---|---|---|
| 1 | 1 | 25000 |
|   | 2 | 30000 |
|   | N | 13000 |
| 2 | 2 | 20000 |
|   | 1 | 72000 |
|   | N | 102000 |
| ⋮ | ⋮ | ⋮ |
| N | N | 100 |
|   | 1 | 200 |
|   | 2 | 400 |

FIG. 36A

|  | POLICER #i | OTHER POLICERS #j,#k |
|---|---|---|
| PASSAGE AMOUNT [Byte] | 10,000 | 6,000 |
| INPUT AMOUNT [Byte] | 20,000 | 10,000 |
| PASSAGE RATIO [%] | 50% | 60% |

FIG. 36B

|  | POLICER #i | OTHER POLICERS #j,#k |
|---|---|---|
| PASSAGE AMOUNT [Byte] | 10,000+667 | 6,000-667 |
| INPUT AMOUNT [Byte] | 20,000 | 10,000 |
| PASSAGE RATIO [%] | 53.3% | 53.3% |

FIG. 37A

| POLICER NUMBER | POLICER NUMBER WITHIN A GROUP | PASSAGE AMOUNT [Byte] |
|---|---|---|
| 1 | 1 | 10000 |
| | 2, N | 15000 |
| 2 | 2 | 12000 |
| | 1, N | 37200 |
| ⋮ | ⋮ | ⋮ |
| N | N | 100 |
| | 1, 2 | 600 |

FIG. 37B

| POLICER NUMBER | POLICER NUMBER WITHIN A GROUP | PASSAGE AMOUNT [Byte] |
|---|---|---|
| 1 | 1 | 25000 |
| | 2, N | 43000 |
| 2 | 2 | 20000 |
| | 1, N | 174000 |
| ⋮ | ⋮ | ⋮ |
| N | N | 100 |
| | 1, 2 | 600 |

FIG. 44

|  |  | AT THE TIME OF TOKEN SYNCHRONIZATION | AT THE TIME OF TOKEN ASYNCHRONIZATION | EXPECTED VALUE |
|---|---|---|---|---|
| COMPARATIVE EXAMPLE | POLICER #1 | 25.00 | 50.00 | N/A |
|  | POLICER #2 | 20.00 | 0.00 |  |
|  | POLICER #3 | 5.00 | 0.00 |  |
| PASSAGE AMOUNT FAIR CONTROL | POLICER #1 | 20.56 | 21.25 | 20.00 |
|  | POLICER #2 | 20.11 | 20.11 | 20.00 |
|  | POLICER #3 | 9.67 | 9.61 | 10.00 |
| PASSAGE RATIO FAIR CONTROL | POLICER #1 | 25.00 | 25.00 | 25.00 |
|  | POLICER #2 | 20.00 | 20.00 | 20.00 |
|  | POLICER #3 | 5.06 | 5.00 | 5.00 |

BANDWIDTH CONTROL DEVICE AND METHOD TO REDUCE DIFFERENCE IN PASS BANDWIDTH

CROSS-REFERENCE TO RELATED APPLICATIONS

This application is based upon and claims the benefit of priority from the prior Japanese Patent Applications No. 2014-091450 filed on Apr. 25, 2014 and No. 2014-202275 filed on Sep. 30, 2014, the entire contents of which are incorporated herein by reference.

FIELD

The embodiments discussed herein are related to a bandwidth control device and a bandwidth control method.

BACKGROUND

With an increased demand for communications, the performance of a relay apparatus such as a layer 2 switch or a router is required to be improved. The relay apparatus transmits a received packet to other apparatuses according to a destination of the packet.

A relay apparatus in which a policing function which limits a bandwidth for traffic inputted from other apparatuses is improved is described in, for example, Japanese Laid-Open Patent Publication No. 2009-194705.

SUMMARY

According to an aspect of the invention, a bandwidth control device of a group formed by a first bandwidth control device and one or more second bandwidth control devices, the bandwidth control device includes: a management unit configured to subtract, when the first bandwidth control device or the one or more second bandwidth control devices allow a packet to pass, an amount of the passed packet from a permissible passage amount to be passed the first bandwidth control device; and a correction unit configured to correct the permissible passage amount of the first bandwidth control device or a threshold value of the first bandwidth control device based on a result of a comparison between a passage amount of packets passed the first bandwidth control device and passage amounts of packets passed the one or more second bandwidth control devices, wherein the first bandwidth control device is configured to determine whether a packet is to be allowed to pass through or not based on a result of a comparison between the permissible passage amount and the threshold value and to allow the packet to pass or discard the packet according to the determination result.

The object and advantages of the invention will be realized and attained by means of the elements and combinations particularly pointed out in the claims.

It is to be understood that both foregoing general description and the following detailed description are exemplary and explanatory and are not restrictive of the invention, as claimed.

BRIEF DESCRIPTION OF DRAWINGS

FIG. 6 is a diagram illustrating an example of improvement of the difference in pass bandwidth between the policers caused by a synchronization between the token supply timings;

FIG. 9 is a table illustrating an example of a token management table;

FIG. 10 is a table illustrating an example of a passage amount management table;

FIG. 28 is a table illustrating another example of the passage amount management table;

FIGS. 31A and 31B are diagrams illustrating examples of a passage amount equalizing control and a passage ratio equalizing control;

FIG. 32 is a graph illustrating an example of change in a token accumulation amount in a case where the token supply timings are synchronized with each other between the policers;

FIG. 33 is a graph illustrating the example of change in the token accumulation amount in a case where the token supply timings are not synchronized with each other between the policers;

FIGS. 35A and 35B are tables illustrating examples of a passage amount management table and an input amount management table, respectively;

FIGS. 36A and 36B are tables illustrating examples of the passage ratio before and after the correction of a threshold value, respectively;

FIGS. 37A and 37B are tables illustrating other examples of the passage amount management table and the input amount management table, respectively;

FIG. 44 is a table illustrating an output rate of other simulation results.

DESCRIPTION OF EMBODIMENTS

Figure 1:
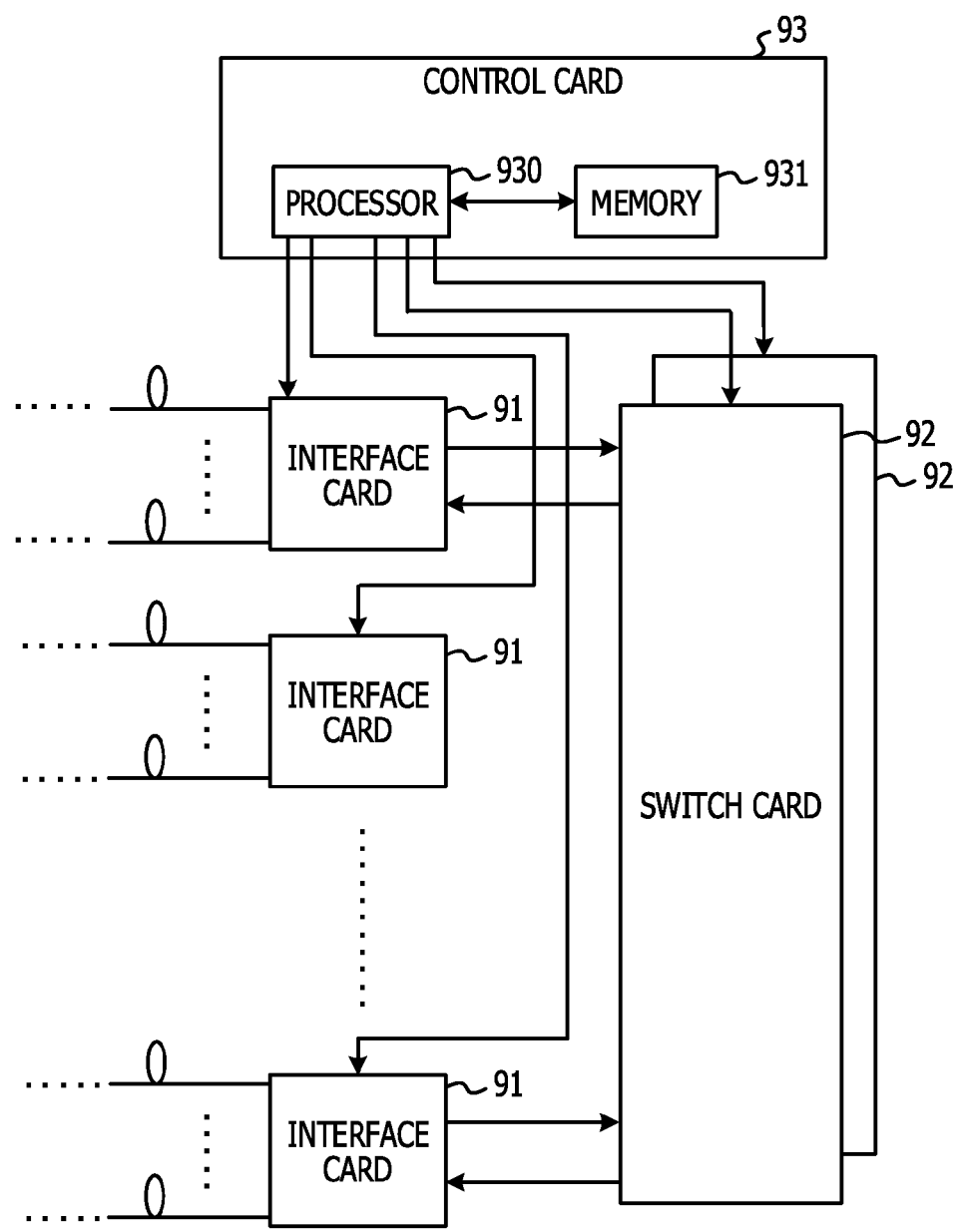
FIG. 1 is a block diagram illustrating an example of a configuration of a communication apparatus.

A policer having a policing function allows a packet to pass by consuming a token supplied periodically and discards the packet in a case of a token deficiency to control the bandwidth for traffic inputted to the relay apparatus. The policer controls the bandwidth for each traffic of a user identified by, for example, a virtual local area network identifier (VID, VLAN ID) or a multi-protocol label switching (MPLS) label of the packet. Therefore, a token supply rate of each policer is determined according to, for example, a bandwidth contract with a user.

When a link aggregation is used in which a plurality of links (physical communication line) are bound, for example, in order to improve an apparent communication speed, packets of traffic of the same user may be input to a plurality of policers independent from each other. In this case, the plurality of policers are grouped and tokens of all policers are consumed each time when a certain policer belonged to a corresponding group allows the packet to pass. Accordingly, it becomes possible to limit a total bandwidth for the traffic of the same user inputted across the plurality of policers in its entirety. In the meantime, the bandwidth control method described above may be performed on a plurality of policer groups to which traffic packets of other users are respectively input.

However, there exists a problem that a difference in pass bandwidth between the plurality of policers becomes larger in the bandwidth control method. For example, when timings at which the tokens are supplied to respective policers are not synchronized with each other, a policer to which the token is supplied earlier than the other policer among two policers which have the same input rate and are deficient in the tokens consumes all the tokens and allows the packet to pass.

In the meantime, since a token accumulation amount of a policer to which the token is supplied later than the other policer to which the token is supplied earlier decreases until the token accumulation amount becomes a negative value due to the consumption of the token by the other policer, the token accumulation amount of the policer does not reach a required amount even when the tokens are supplied, and as a result, the policer barely passes the packets. Therefore, the difference in pass bandwidth between the two policers becomes larger.

In contrast, Japanese Laid-Open Patent Publication No. 2009-194705 discloses a technique where the packet is allowed to pass through equally between the policers by setting a time interval of a token supply as a single period and limiting the packet not to pass through during a next period of the period during which the packet is allowed to pass through. However, in the technique described above, for example, since a period during which a single packet has passed through as well as a period during which one thousand packets have passed through are evenly determined as a period during which the packet has passed through, a predetermined equivalence in terms of an opportunity of a packet passage is guaranteed but the difference in pass bandwidth is not efficiently reduced.

Further, the token supply timings may be synchronized with each other between the policers but the synchronization causes the control of the relay apparatus to be complicated in its entirety, which results in an occurrence of a problem that a hardware or software scale becomes larger and the cost increases.

Even when the token supply timings are synchronized with each other between the policers, the policer of which a packet input timing is closer to the token supply timing timely consumes more tokens, and as a result, the difference in the pass bandwidth between the policers increases according to a temporal input pattern of the packet. In the meantime, the problem described above is not limited to the relay apparatus and may also occur in, for example, a different type of communication apparatus such as a wavelength multiplex transmission apparatus.

Hereinafter, descriptions will be made on a bandwidth control device and a bandwidth control method that efficiently reduce the difference in the pass bandwidth between the bandwidth control device and the other bandwidth control devices belongs to the same group with reference to drawings.

FIG. 1 is a block diagram illustrating an example of a configuration of a communication apparatus. The communication apparatus includes a plurality of network interface cards 91, two switch cards 92 and a control card 93. Respective cards 91 to 93 are accommodated in individual slots and electrically connected to each other. In the meantime, in the present specification, a relay apparatus such as a layer 2 switch or a router is exemplified as a communication apparatus equipped with a bandwidth control device of the embodiments, but the communication apparatus is not limited thereto and the bandwidth control device of the embodiments may be similarly equipped in another type of the communication apparatuses, for example, a wavelength multiplex transmission apparatus.

The communication apparatus relays a packet received from other apparatus to any other apparatus according to the destination of the packet. In the meantime, in the present specification, the packet refers to a PDU (Protocol Data Unit) as a data (information) transfer unit and an Ethernet (registered trademark, the same hereinafter) frame is exemplified as the PDU, but the packet is not limited thereto and another PDU such as an IP (Internet Protocol) packet may be used.

Each of a plurality of network interface cards 91 transmits and receives the packet to and from other apparatus. The other apparatus may include, for example, a terminal apparatus such as a personal computer, a server apparatus, and a router. The plurality of network interface cards 91 are connected to optical fibers via a plurality of ports thereof and communicate with other apparatuses based on, for example, 10 GBASE-LR standard.

Each of the two switch cards 92 exchanges the packet with the plurality of network interface cards 91. More specifically, the switch card 92 receives the packet from the network interface card 91 as an input and outputs the packet to the network interface card 91 according to the destination of the packet. The two switch cards 92 are used as an active switch card and a reserved switch card in preparation for a fault, such as a hardware failure.

The control card 93 controls the plurality of network interface cards 91 and two switch cards 92. The control card 93 is connected with, for example, a network control apparatus and performs a processing for a user interface, a processing for setting the cards 91 and 92, and a processing for collecting information from the cards 91 and 92. The control card 93 includes a processor 930 such as a CPU, which executes the processings and a memory 931 storing a program which drives the processor 930.

Figure 2:
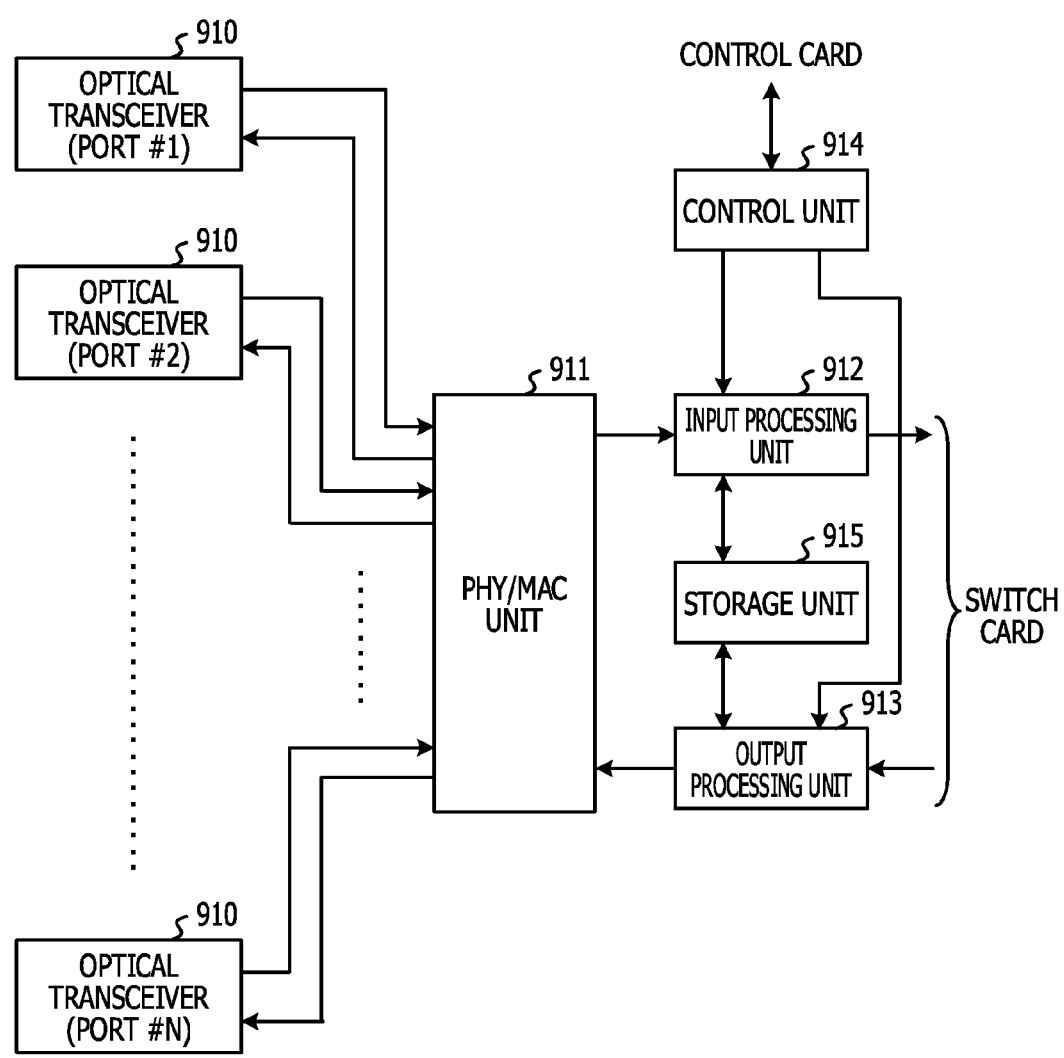
FIG. 2 is a block diagram illustrating an example of a functional configuration of a network interface card.

FIG. 2 is a block diagram illustrating an example of a functional configuration of the network interface card 91. The network interface card 91 includes a plurality of optical transceivers 910, a PHY/MAC unit 911, an input processing unit 912, an output processing unit 913, a control unit 914, and a storage unit 915.

Each of the plurality of optical transceivers 910 converts an optical signal received through the optical fiber from other apparatus into an electrical signal to be output to the PHY/MAC unit 911, and further, converts an electrical signal input from the PHY/MAC unit 911 into an optical signal to be transmitted to other apparatus through the optical fiber. That is, the plurality of optical transceivers 910 function as a plurality of ports #1 to #N (N is a positive integer) for transmitting and receiving the packets to and from other apparatus.

The PHY/MAC unit 911 performs, for example, a processing of establishing a link with other apparatuses or a processing of distributing the packets to the plurality of optical transceivers 910. The PHY/MAC unit 911 outputs the packet inputted from the plurality of optical transceivers 910 to the input processing unit 912, and outputs the packet inputted from the output processing unit 913 to the plurality of optical transceivers 910.

The input processing unit 912 and the output processing unit 913 are each a logical circuit such as a FPGA (Field Programmable Gate Array) or ASIC (Application Specific Integrated Circuit), and perform an ingress packet processing and egress packet processing, respectively. The input processing unit 912 performs a bandwidth control processing for the packet inputted from the PHY/MAC unit 911 and outputs the packets to the switch card 92.

The output processing unit 913 performs a control processing of a transmission rate on the packets inputted from the switch card 92 and outputs the packets to the PHY/MAC unit 911. The storage unit 915 is a storage medium such as the memory and stores various data used in the processing performed by the input processing unit 912 and the output processing unit 913.

The control unit 914 communicates with the control card 93 to control the input processing unit 912 and the output processing unit 913. The control unit 914 is provided with a processor such as the CPU and the memory (not illustrated). The processings performed by the control unit 914 may include, for example, various setting processings for the input processing unit 912 and the output processing unit 913, and a collection processing of alarm detected in the input processing unit 912 and the output processing unit 913.

Figure 3:
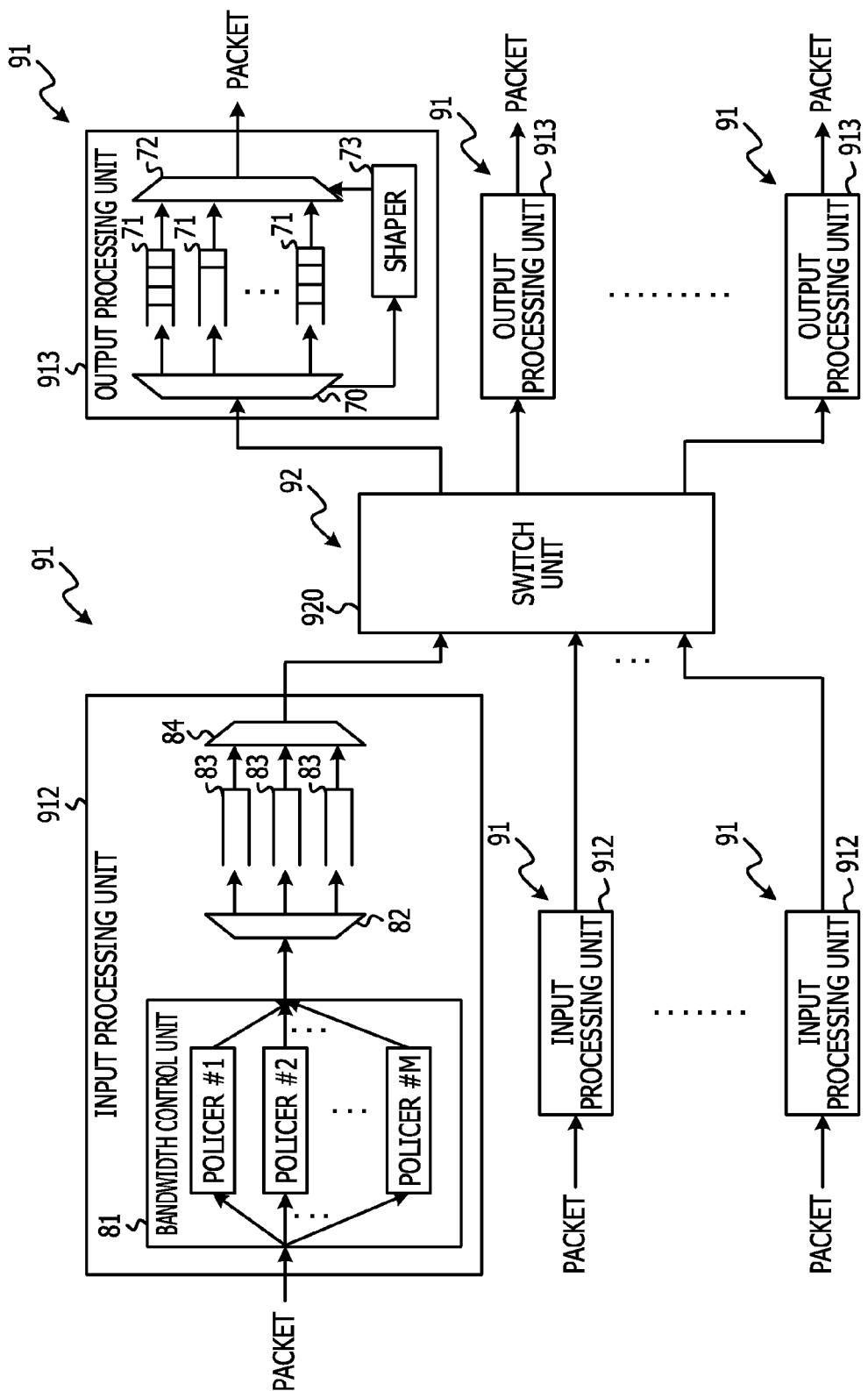
FIG. 3 is a diagram illustrating a packet path within the communication apparatus.

In FIG. 3, a packet path within the communication apparatus is illustrated. In the meantime, FIG. 3 also illustrates the configurations of the input processing unit 912 and the output processing unit 913.

The packets are first inputted to the input processing unit 912 of the network interface card 91. The input processing unit 912 includes a bandwidth control unit 81, a distribution unit 82, a plurality of input queues 83, and an output unit 84.

The bandwidth control unit 81 discards the packets which cause a predetermined bandwidth to be exceeded by a plurality of policers (bandwidth control devices) #1 to #M, (where M is a positive integer) such that a traffic amount of packets inputted to the communication apparatus does not exceed the predetermined bandwidth. Each of a plurality of policers #1 to #M is provided to correspond to the traffic of the user identified by, for example, the VID or MPLS label assigned to the packets. The bandwidth control unit 81 identifies the traffic of packets inputted from the ports #1 to #N through the PHY/MAC unit 911 and distributes the traffic of packets to the corresponding policers #1 to #M.

Each of the policers #1 to #M allows the packets to pass by consuming a token (permissible passage amount supplied periodically and discards the packets in the case of a token deficiency to control the bandwidth of the packets to be inputted to the communication apparatus. Since the policers #1 to #M control the bandwidth for each traffic of the user, a token supply rate for each of the policers #1 to #M is determined according to, for example, a bandwidth contract with a user. The packets which have passed through the policer #1 to #M are input to the distribution unit 82.

The distribution unit 82 distributes the packets to the plurality of input queues 83 according to the network interface card 91 which corresponds to the destination. That is, the input queues 83 are provided for each network interface card 91. The plurality of input queues 83 accumulate the packets until the packets are read by the output unit 84. The output unit 84 selects an input queue from the plurality of input queues 83, reads the packet from the selected input queue 83, and outputs the packet to the switch unit 920 of the switch card 92. The switch unit 920 outputs the inputted packet to the output processing unit 913 of the network interface card 91 according to the destination.

The output processing unit 913 includes a distribution unit 70, a plurality of queues 71, a read-out processing unit 72, and a shaper (scheduler) 73. The packet outputted from the switch unit 920 is input to the distribution unit 70. The distribution unit 70 distributes the packets of, for example, for each traffic of the user to the plurality of queues 71.

The read-out processing unit 72 reads the packets from the plurality of queues 71 according to an instruction from the shaper 73. The read packets are transmitted from the ports #1 to #N to other apparatus.

The shaper 73 acquires information (a data amount of packet) of the packets stored in each of the plurality of queues 71 from the distribution unit 70 and indicates a target queue to be read to the read-out processing unit 72 based on the acquired information. Accordingly, the transmission rate is suitably controlled for each traffic.

Comparative Example

Figure 4:
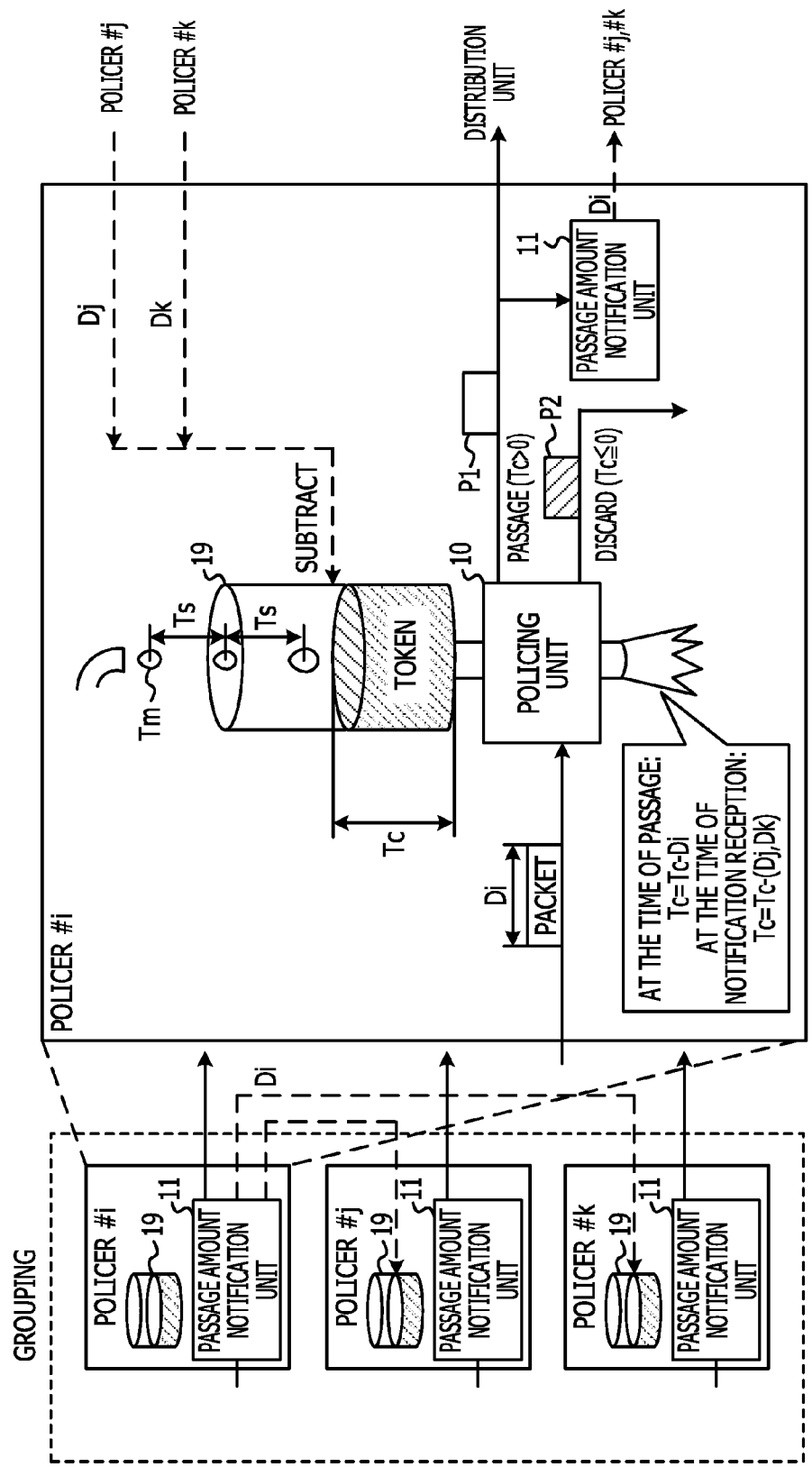
FIG. 4 is a block diagram illustrating a configuration of a comparative example of a bandwidth control unit.

FIG. 4 is a block diagram illustrating a configuration of a comparative example of a bandwidth control unit 81. Policers #i, #j, and #k (i, j, k are positive integers) are grouped and the traffic of the same user or other user is input to the policers #i, #j, and #k. Accordingly, a total bandwidth of the traffic of the same user or a total bandwidth of the traffic of other user inputted across the plurality of policers #i, #j, and #k is limited in its entirety. In the meantime, the number of policers to be grouped is not limited.

When a link aggregation in which a plurality of links (physical communication lines) are bound is used, for example, in order to improve an apparent communication speed, the packets of the traffic of the same user are input to the policers #i, #j, and #k, respectively. In this case, the policers #i, #j, and #k are provided in the interface cards 91 that are independent from each other.

As described above, since the policers #1 to #M are provided for each traffic of the user, even when the packets of the traffic of the same user are input from a plurality of ports 910 of a common interface card 91, respectively, the packets are gathered in the same policers #1 to #M. In contrast, when the packets of the traffic of the same user are input from the ports 910 of a plurality of interface cards 91, respectively, the packets are processed in each interface card 91 and input to the policers #i, #j, and #k of each of other interface cards 91.

Further, when the packets of the traffic of different users are input to the policers #i, #j, and #k, respectively, the interface card 91 provided with the policers #i, #j, and #k may either be a common interface card 91 or each of the interface cards 91 may be different from each other.

Although FIG. 4 illustrates only the configuration of the policer #i among the policers #i, #j, and #k that belong to the same group, other policers #j and #k also have the same configuration as that of the policer #i. The policer #i includes a policing unit 10, a token bucket 19, and a passage amount notification unit 11.

The token bucket 19 accumulates tokens (that is, tokens of permissible passage amount) supplied periodically. The token supply rate, that is, a policing rate (one time token supply amount Tm/time interval Ts at which a token is supplied) is determined according to a bandwidth contract with a user for traffic to be inputted. In the meantime, the token bucket 19 is a conceptual configuration represented as a management unit of a token accumulation amount Tc.

The policing unit 10 determines whether the inputted packet is allowed to pass through or not based on a result of a comparison between the token accumulation amount Tc and a predetermined threshold value and allows the packet to pass or discards the packet according to the determination result. The threshold value is not limited, but is set to 0 (zero) in the present example. More specifically, when Tc is greater than 0 (that is, Tc>0), the policing unit 10 allows a packet P1 to pass and when Tc is equal to or less than 0 (that is, Tc≤0), the policing unit 10 discards a packet P2. The token and the threshold value are individual values for respective policers #i, #j, and #k. In the meantime, the packet P1 which has passed through is output to the distribution unit 82.

When the packet P1 is allowed to pass through, the token accumulation amount Tc which amounts to a length (data amount) Di of the packet P1 is consumed (subtracted) (that is, Tc=Tc−Di). Further, the passage amount notification unit 11 detects the length Di of the packet P1 which has passed through and notifies the length Di to other policers #j and #k that belong to the same group as that of the policer #i. When the input packets are also avowed by each of policers #j and #k to pass through, the policers #j and #k notify the lengths Dj and Dk of the packets, respectively, from the passage amount notification unit 11 to the policer #i.

When the lengths Dj and Dk of the packets are notified from other policers #j and #k, the token accumulation amount Tc which amounts to the notified packet lengths Dj and Dk is consumed (Tc=Tc−(Dj or Dk)). That is, in all the policers #i, #j, and #k that belong to the same group, the token accumulation amount Tc is subtracted each time when the corresponding policer #i (first bandwidth control device) or other policers #j and #k (other bandwidth control devices) allow the packet to pass. Accordingly, it becomes possible to limit the total bandwidth of the traffic of the same user inputted across the plurality of policers #i, #j, and #k in its entirety.

However, in the bandwidth control method described above, there is a problem that a difference in pass bandwidth between the policers #i, #j, and #k becomes larger, as will be described below.

Figure 5:
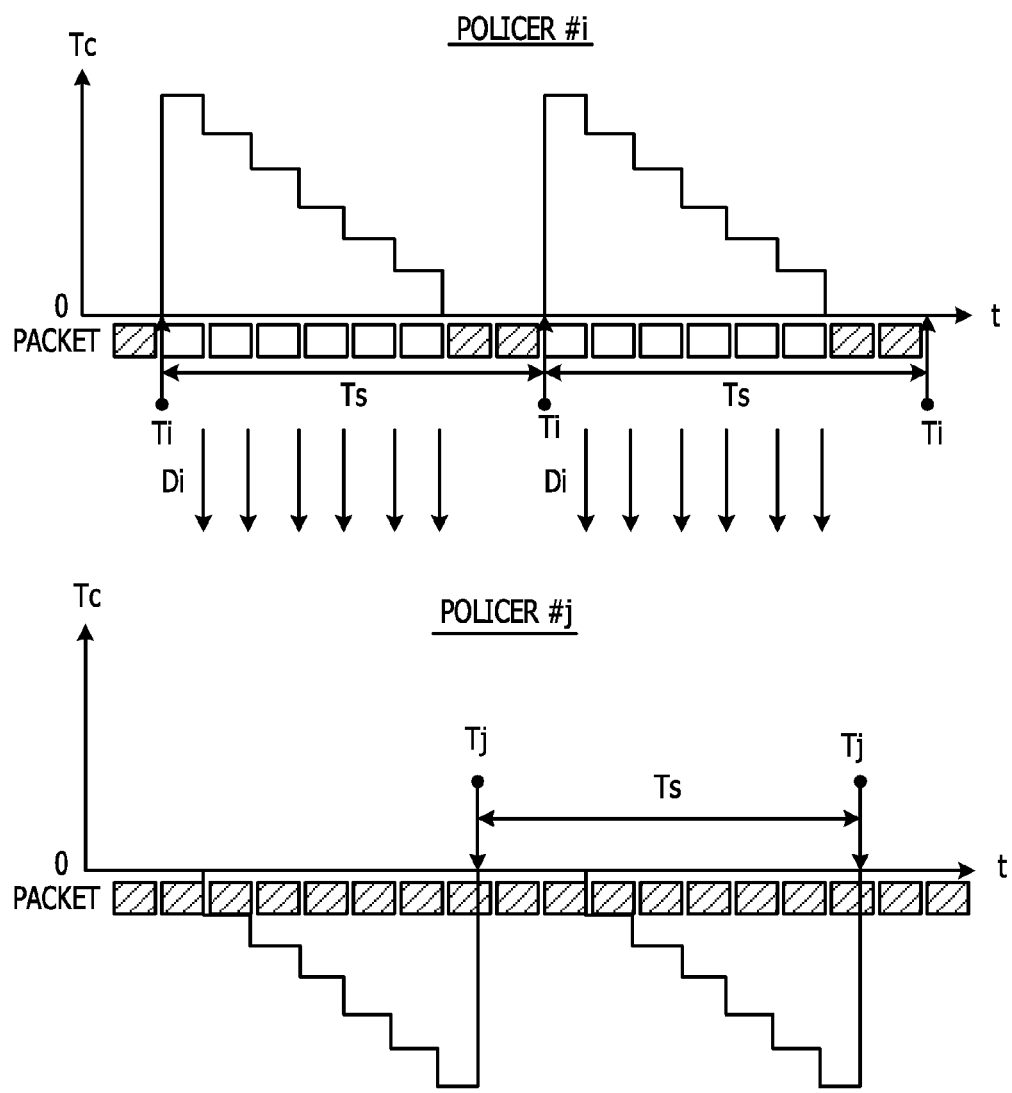
FIG. 5 is a diagram illustrating an example of a difference in pass bandwidth between policers generated due to an asynchronization between token supply timings.

In FIG. 5, an example of a difference in pass bandwidth between the policers #i and #j generated due to the asynchronization between the token supply timings is illustrated. In FIG. 5, the horizontal axis indicates a time t and the vertical axis indicates a token accumulation amount Tc.

Further, regarding "packets" indicated along the horizontal axis, hatched rectangular frames indicate the packets discarded by the policers #i and #j and non-hatched rectangular frames indicate the packets which have passed through the policer #i and #j. Further, an arrow extending from the policer #i to the policer #j indicates a notification of the length Di of packet from the policer #i to the policer #j.

In the present example, the timings Ti and Tj at which tokens are supplied to policers #i and #j, respectively, are not synchronized with each other. That is, the token supply time intervals Ts are identical to each other between the policers #i and #j, but the token supply timings Ti and Tj are not coincident with and deviated from each other between the policers #i and #j. Further, the input rates of the packets of the policers #i and #j are set to be the same rate.

At first (time t=0), since both policers #i and #j are deficient in the token accumulation amount Tc (Tc=0), the packets are discarded by both policers #i and #j. Thereafter, since the policer #i is supplied with the token earlier than the other policer #j, the policer #i may allow the packet to pass. That is, the policer #i to which the token is supplied earlier than the other policer #j among two policers #i and #j that are deficient in the token consumes all the tokens to allow the packet to pass.

In the meantime, the length Di of the packet which has passed through each time when the policer #i allows the packet to pass is notified to the other policer #j to which the token is supplied later than the policer #i, and the length Di of the notified packet is subtracted from the token accumulation amount Tc of the policer #j. Accordingly, the token accumulation amount Tc of policer #j is reduced from 0 (zero) to become a negative value (minus value).

Accordingly, even when the token is supplied, the token accumulation amount Tc of the policer #j becomes 0 (zero) from the negative value and is unable to exceed the threshold value (that is, 0) in order to make the packet pass through. Accordingly, the policer #j continues to discard the packet even after the token is supplied.

That is, the token accumulation amount Tc of the policer #j to which the token is supplied later than the policer #i is reduced to become the negative value due to the consumption of the token by the policer #i to which the token is supplied earlier than the policer #j. Therefore, even when the token is supplied, the token accumulation amount Tc of the policer #j to which the token is supplied later than the policer #i does not reach a required amount (a value greater than the threshold value) and thus, the policer #j is unable to pass most of the packets.

In this manner, the difference in pass bandwidth between two policers #i and #j becomes larger. In the meantime, in the present example, although the pass bandwidth between the policers #i and #j is exemplified, the difference in pass bandwidth may also occur similarly between other policers #i, #j, and #k.

Regarding the problem of the difference in pass bandwidth, when the technology disclosed in Japanese Laid-Open Patent Publication No. 2009-194705 as described above is used, a predetermined equivalence in an opportunity of a packet passage between the policers #i and #j is guaranteed, but the difference in pass bandwidth is not efficiently reduced between the policers #i and #j. However, under the conditions illustrated in FIG. 5, when the token supply timings Ti and Tj of the policers #i and #j are made to synchronize (match) with each other, the difference in pass bandwidth between the policers #i and #j may be reduced.

FIG. 6 illustrates an example of improvement of the difference in pass bandwidth between the policers #i and #j caused by the synchronization of the token supply timings Ti and Tj. In the present example, since the token supply timings Ti and Tj of the policers #i and #j are synchronized with each other, when the tokens are supplied, both policers #i and #j are able to consume the tokens of their own, respectively, to allow the packet to pass. In this case, since the policers #i and #j notify the lengths Di and Dj of the packets between each other, the token accumulation amount Tc is reduced at double speed compared to the example of FIG. 5.

However, since the policers #i and #j are able to allow the packet to pass at the same rate, the difference in pass bandwidth between the policers #i and #j described in the example of FIG. 5 may be reduced. In fact, in a case where the token supply timings Ti and Tj are synchronized with each other between the policers #i and #j, since the control of the communication apparatus becomes complicated in its entirety, a hardware or software scale becomes larger and thus costs increase.

Further, even in a case where the token supply timings Ti and Tj of the policers #i and #j are synchronized with each other, when variation in packet input timing between the policers #i and #j is large, the difference in pass bandwidth becomes larger.

Figure 7:
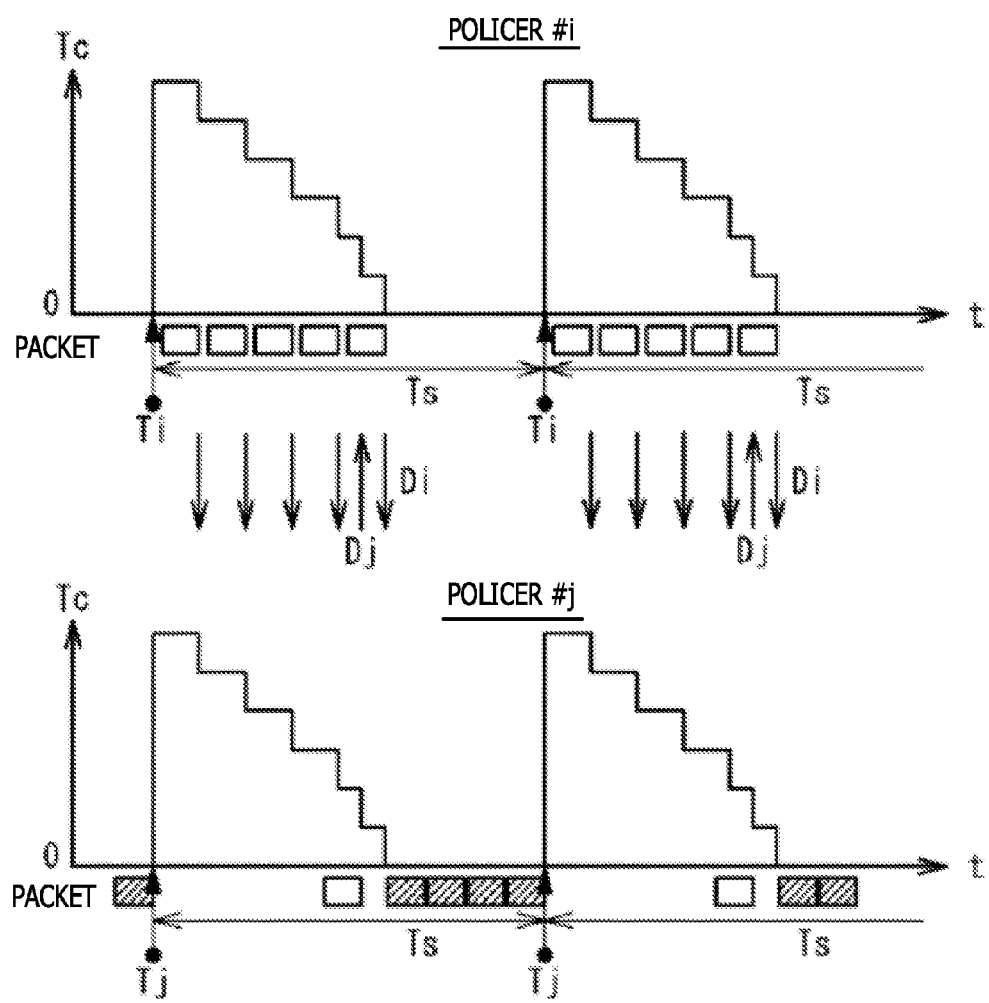
FIG. 7 is a diagram illustrating an example of difference in pass bandwidth between policers generated due to a difference in packet input timing between the policers.

FIG. 7 illustrates an example of a difference in pass bandwidth between the policers #i and #j generated due to a difference in the packet input timing between the policers #i and #j. In the present example, the input rates of the packet of the policers #i and #j are the same rate, but the variation in packet input timing between the policers #i and #j is large.

More specifically, a time zone during which the packets are intensively input as in a burst traffic and a time zone during which no packet is input exist in each of the policers #i and #j. In the meantime, two time zones described above arrive alternatively between the policers #i and #j. That is, packet is not input to one policer of the policers #i and #j at the time when packet is input to the other policer.

In the present example, the policer #i, which has the packet input timing closer to the token supply timing Ti, may consume the tokens timely to allow the packet to pass. In the meantime, no packet passes through the policer #j, which has the packet input timing far away from the token supply timing Tj, at the token supply timing Ti of the policer #i.

However, since the token of the policer #j is already consumed by the policer #i at the time when the packet is input into the policer #j, the policer #j is nearly unable to allow the packet to pass. That is, since the policer #i of which the packet input timing closer to the token supply timing consumes more tokens timely, the difference in the pass bandwidth between the policers #i and #j increases according to a temporal input pattern of packets.

First Embodiment

In the first embodiment, in the policers #i, #j, and #k within the same group, a threshold value of token used for determination of allow and disallow passage of the packet is corrected based on a result of the comparison of the packet passage amounts between the corresponding policer and other policers to reduce the difference in the pass bandwidth between the policers #i, #j, and #k.

Figure 8:
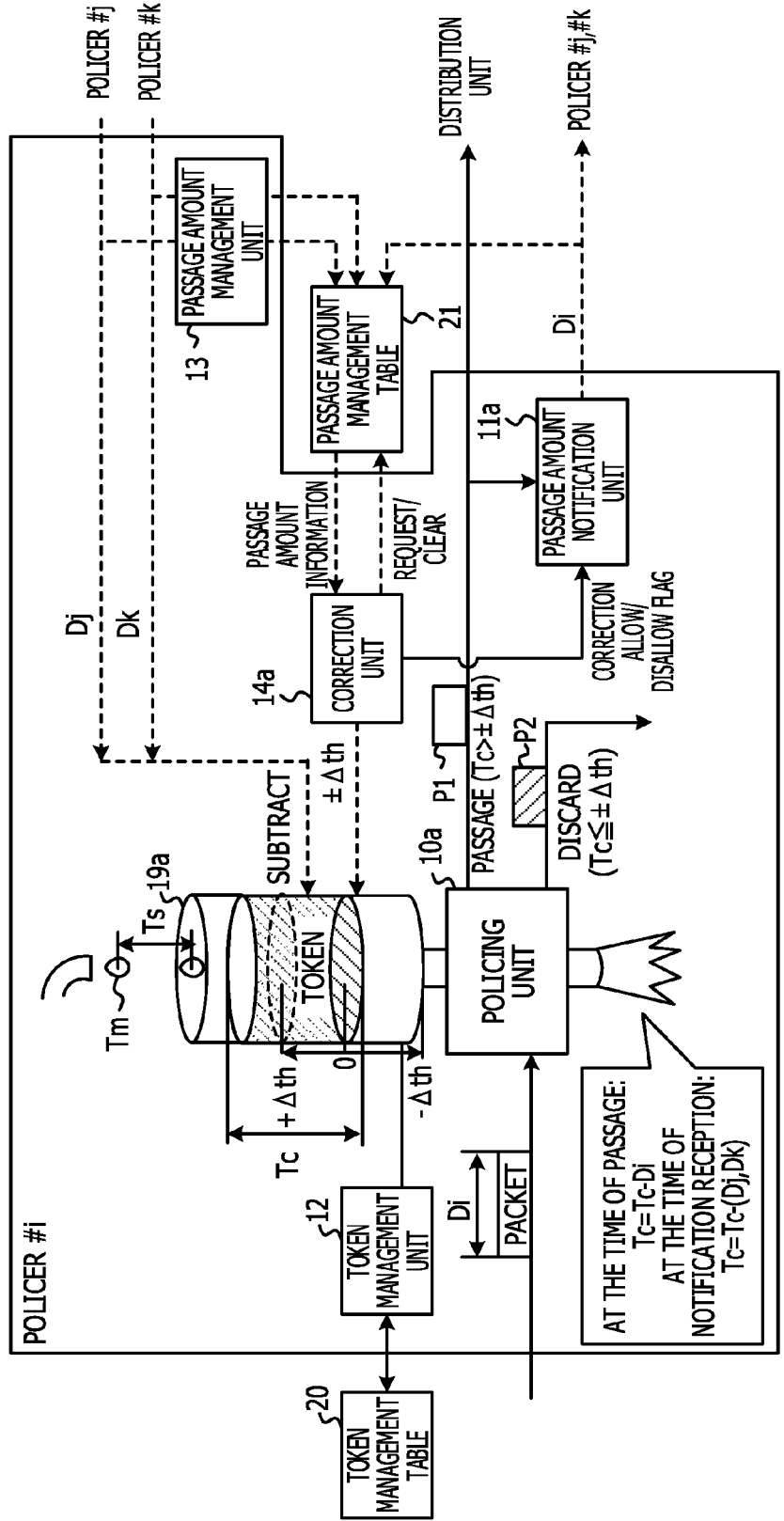
FIG. 8 is a block diagram illustrating a configuration of a first embodiment of a bandwidth control unit.

FIG. 8 is a block diagram illustrating a configuration of a first embodiment of the bandwidth control unit 81. In FIG. 8, only the configuration of the policer #i is illustrated among the policers #i, #j, and #k within the same group, but other policers #j and #k also have the same configuration.

The policer #i includes a policing unit 10a, a passage amount notification unit 11a, a token management unit (management unit) 12 functioning as a token bucket 19a, a passage amount management unit 13, and a correction unit 14a. The token management unit 12 manages, for example, the token accumulation amount Tc using a token management table 20 stored in a storage unit 915.

In FIG. 9, an example of the token management table 20 is illustrated. A "policer number", a "group number", a "maximum accumulation amount [Byte]", a "supply amount (Tm) [Byte]", an "accumulation amount (Tc) [Byte]", and a "correction value (±Δth) [Byte]" are registered in the token management table 20. In the meantime, the token management table 20 is shared between respective policers #1 to #M.

The "policer number" corresponds to the number (#1 to #M) for identifying respective policers and the "group number" corresponds to a number for identifying a group to which the policers belong. In the present example, since both policers #1 and #2 have the group number of "1", the policers #1 and #2 belong to the same group.

The "accumulation amount (Tc) [Byte]" indicates the token accumulation amount Tc within the token bucket 19a in byte unit and the "maximum accumulation amount [Byte]" indicates the maximum amount of tokens capable of being accumulated in the token bucket 19a in byte unit. The accumulation amount Tc is limited not to exceed the maximum accumulation amount. The "supply amount (Tm) [Byte]" indicates the amount of tokens Tm supplied periodically at time intervals Ts in byte unit.

The maximum accumulation amount and the supply amount of tokens are common between the respective policers within the same group. For example, the policers #1 and #2 within the same group together have the maximum accumulation amount of 10000 bytes and the supply amount of 3000 bytes. Each of the maximum accumulation amount and the supply amount of tokens is set by, for example, a control card 93 in advance. In the meantime, the time interval Ts at which the token is supplied is common between the policers within the same group, but the token supply timings Ti are not synchronized with each other between the policers within the same group.

The "correction value (±Δth) [Byte]" corresponds to a correction value of the threshold value of the token bucket 19a calculated by the correction unit 14a. In the present embodiment, similarly to the comparative example described above, since the threshold value of the token bucket 19a before the correction is set to 0 (zero), the correction value itself becomes equal to the threshold value. In the meantime, the correction value calculation method will be described later.

When the token supply timing Ti arrives, the token management unit 12 acquires the accumulation amount Tc and the supply amount Tm from the token management table 20 and adds the supply amount Tm to the accumulation amount Tc to update the accumulation amount Tc within the token management table 20. Further, the token management unit 12 acquires the length Di of the packet which is allowed to pass through from the policing unit 10a and subtracts the length Di of the packet from the accumulation amount Tc acquired from the token management table 20 to update the accumulation amount Tc within the token management table 20.

The policing unit 10a acquires the token accumulation amount Tc and correction value from the token management table 20 through the token management unit 12. The policing unit 10a determines whether the packet is to be allowed to pass through or not based on a result of the comparison between the token accumulation amount Tc and the corrected threshold value and allows the packet to pass or discards the packet according to the determination result. More specifically, when the token accumulation amount Tc is greater than the correction value, the policing unit 10a allows the packet P1 to pass, and when the Tc is equal to or less than the correction value, the policing unit 10a discards the packet P2. In the meantime, the packet P1 which has passed through is output to the distribution unit 82.

When the packet P1 is allowed to pass through, the token accumulation amount Tc which amounts to a length (data amount) Di of the packet P1 is consumed (subtracted) (that is, Tc=Tc−Di). Further, the passage amount notification unit 11 detects the length Di of the packet P1 which has passed through and notifies the length Di to other policers #j and #k that belong to the same group as that of the policer #i. The passage amount notification unit 11a transmits a correction allow/disallow flag which indicates whether the threshold value of the policer #i is allowed to correct or not, along with the length Di of the packet P1 as the passage information to other policers #j and #k within the same group.

Further, when each of other policers #j and #k also allows the input packet to pass, the lengths (data amount) Dj and Dk of the packets are notified from the passage amount notification unit 11a to the policer #i along with the correction allow/disallow flag as the passage information by other policers #j and #k, respectively. When the lengths (data amount) Dj and Dk of the packets are notified from other policers #j and #k, respectively, the token management unit 12 subtracts the lengths (data amount) Dj and Dk of the packets from the accumulation amount Tc acquired from the token management table 20 to update the accumulation amount Tc within the token management table 20. That is, the token accumulation amount Tc which amounts to the notified lengths Dj and Dk of the packets is consumed (Tc=Tc−(Dj or Dk)).

Accordingly, similarly to the comparative example described above, among all the policers #i, #j, and # k that belong to the same group, the token management unit 12 subtracts the token accumulation amount Tc of the policer #i each time when the policer #i (first bandwidth control device) or other policers #j and #k (other bandwidth control devices) allow the packet to pass. Accordingly, it becomes possible to limit the total bandwidth of the traffic of the same user or the total bandwidth of the traffic of different users that are inputted across the plurality of policers #i, #j, and #k in its entirety.

The passage amount management unit 13 manages a passage amount of packets of other policers #j and #k using the passage amount management table 21 based on the lengths Dj and Dk of the packets notified from other policers #j and #k. Further, the passage amount notification unit 11a updates the passage amount of the packet of the policer #i registered in the passage amount management table 21 based on the length Di of the packet of the policer #i.

In FIG. 10, an example of the passage amount management table 21 is illustrated. A "policer number", a "policer number within a group", a "passage amount [Byte]", and a "correction allow/disallow flag" are registered in the passage amount management table 21. In the meantime, the passage amount management table 21 is shared between the plurality of policers #1 to #M.

The "policer number" indicates the number (#1 to #M) for identifying the policer and the "policer number within a group" indicates the policer numbers of all the policers that belong to the same group as that of the corresponding policer. For example, since the numbers "1", "2", "15", and "37" as the policer numbers within a group are registered in a column where the policer number is "1", the policers that belong to the same group as that of the policer #1 are the policers #2, #15, and #37.

Further, the passage amount management table 21 discerns information used for each of the policers #1 to #M using the "policer number". That is, the passage amount management unit 13 and the passage amount notification unit 11a of the policers #1 to #M access the columns of the policer numbers of "1" to "M", respectively. In the meantime, the corresponding policer number is registered in the top row of the "policer number within a group" of each "policer number" and other policer numbers of the policers that belong to the same group are registered in the rows ranging from second to last rows of the "policer number within a group" column.

The "passage amount [Byte]" indicates a total length of packets (data amount) that have passed through each policer indicated by the policer number within a group within a predetermined period in byte unit. For example, the passage amounts of packets of the policers #1, #2, #15, and #37 that are cumulatively summed up by the policer #1 within a predetermined period are 3500 bytes, 7200 bytes, 500 bytes, and 2800 bytes, respectively. Further, the passage amounts of packets of the policers #2, #1, #15, and #37 that are cumulatively summed up by the policer #2 within a predetermined period are 6000 bytes, 3000 bytes, 300 bytes, and 1000 bytes, respectively.

As described above, the total passage packet amounts of the policers #1, #2, #15, and #37 cumulatively summed up by policer #1 are different from those cumulatively summed up by policer #2. This is because a start timing and an end timing of the period during which the passage amount of the policer #1 is cumulatively summed up are different from those of the policer #2. That is, in the present embodiment, since the period during which the passage amount of each of the policers #1 to #M is cumulatively summed up is coincident with the time interval Ts at which the token is supplied and the token supply timings are not synchronized with each other between the policers, the start timings and the end timings of the period during which the passage amounts of the policers are cumulatively summed up are different from each other between the policers, respectively. In the meantime, the period during which the passage amount of each of the policers #1 to #M is cumulatively summed up is not limited thereto and may be set to a value which is irrespective of the time interval Ts at which the token is supplied.

Each time when the packet passes through each of the policers #1 to #M, the passage amount notification unit $11a$ of each of the policers #1 to #M updates a passage amount of the packet allowed to pass through each of the policer numbers #1 to #M and a passage amount of the packet allowed to pass through of each of the policer numbers #1 to #M within a group by adding the length Di of the packet which has passed through to the passage amount. For example, the passage amount notification unit $11a$ of the policer #1 updates the passage amount of the policer number within a group of "1" in the column of the policer number "1". Further, the passage amount notification unit $11a$ of the policer #2 updates the passage amount of the policer number within a group of "2" in the column of the policer number "2".

Further, each time when the lengths Dj and Dk of the packets that have passed through other policers are notified from other policers that belong to the same group, the passage amount management unit 13 of each of the policers #1 to #M update each of the passage amounts of the policer number within a group of #1 to #M of the policer numbers #1 to #M. The update of passage amount is performed by adding the lengths Dj and Dk of the packets notified from other policer to the corresponding passage amount.

For example, when the length of the packet is notified from the policer #2 that belongs to the same group, the passage amount management unit 13 of the policer #1 updates the passage amount of the policer number within a group of "2" in the column of the policer number "1". Further, when the length of the packet is notified from the policer #1 that belongs to the same group, the passage amount management unit 13 of the policer #2 updates the passage amount of the policer number within a group of "1" in the column of the policer number "2".

As described above, the passage amount notification unit $11a$ of each of the policers #1 to #M cumulatively sums up the passage amount of packets of the corresponding policer among all the policers that belong to a group to which the corresponding policer belongs. Further, the passage amount management unit 13 of each of the policers #1 to #M cumulatively sums up the passage amount of packets of the other policers among all the policers that belong to the group to which the corresponding policer belongs. The passage amounts of all the policer numbers within a group of each of the policers #1 to #M are cleared to 0 byte by the correction unit $14a$ at the time when the token supply timing Ti arrives.

Further, the "correction allow/disallow flag" indicates whether the policer indicated by the policer number within a group is a target policer to be corrected ("1") or not to be corrected ("0") by the correction unit $14a$. For example, among the policers #1, #2, #15, and #37 that belong to the same group, the policers #1, #2, and #37 have the correction allow/disallow flag of "1" and thus correspond to the target policers to be corrected, and the policer #15 has the correction allow/disallow flag of "0" and thus does not correspond to the target policer to be corrected. As will be described below, the correction unit $14a$ refers to the correction allow/disallow flag to determine whether execution of the correction value calculation processing is allowed or disallowed and whether use of the passage amount of each of other policers is allowed or disallowed in the correction value calculation processing.

Referring back to FIG. 8, the correction unit $14a$ compares the passage amount of packets of the policer #i with those of other policers #j and #k that belong to the same group and corrects the threshold value of the policer #i based on the comparison result. When the passage amount of packets of the policer #i is relatively large in the group, the correction unit $14a$ raises (+Δth) the bottom (which equals to the threshold value) of the token bucket $19a$ and otherwise, when the passage amount of packets of the policer #i is relatively small, the correction unit $14a$ lowers (−Δth) the bottom of the token bucket $19a$.

That is, the correction unit $14a$ corrects the threshold value of the policer #i (first bandwidth control device) based on a result of a comparison between the passage amount of packets of the policer #i and those of other policers #j and #k (other bandwidth control devices). The correction unit $14a$ outputs the correction value (±Δth) to the token management unit 12 to be registered in the token management table 20. The policing unit $10a$ determines whether the packet is to be allowed to pass through using the correction value (±Δth). In the meantime, in the present embodiment, since the threshold value is set to 0 (zero), the correction value is equal to the threshold value (0±Δth=±Δth).

Accordingly, the policer of which the passage amount of the packets is relatively large among the policers #i, #j, and #k that belong to the same group becomes difficult to allow the packet to pass and the policer of which the passage amount of the packets is relatively small becomes easy to allow the packet to pass. Accordingly, the passage amounts of the packets of the policers #i, #j, and #k that belong to the same group are averaged such that the difference in pass bandwidth between the policers #i, #j, and #k is reduced. In the present example, the difference in pass bandwidth between each policer #i and other policers #j and #k that belong to the same group is reduced.

More specifically, the correction unit $14a$ requests the passage amount information to the passage amount management table 21 to acquire the passage amount information. In the passage amount information, the passage amount of the packets of the policer #i (passage amount in the top row of the "policer number within a group" column of FIG. 10) and the passage amounts of the packets (rows ranging from second to last rows of the "policer number within a group" column) of other policers #j and #k that belong to the same group as that of the policer #i are included.

Figure 11:
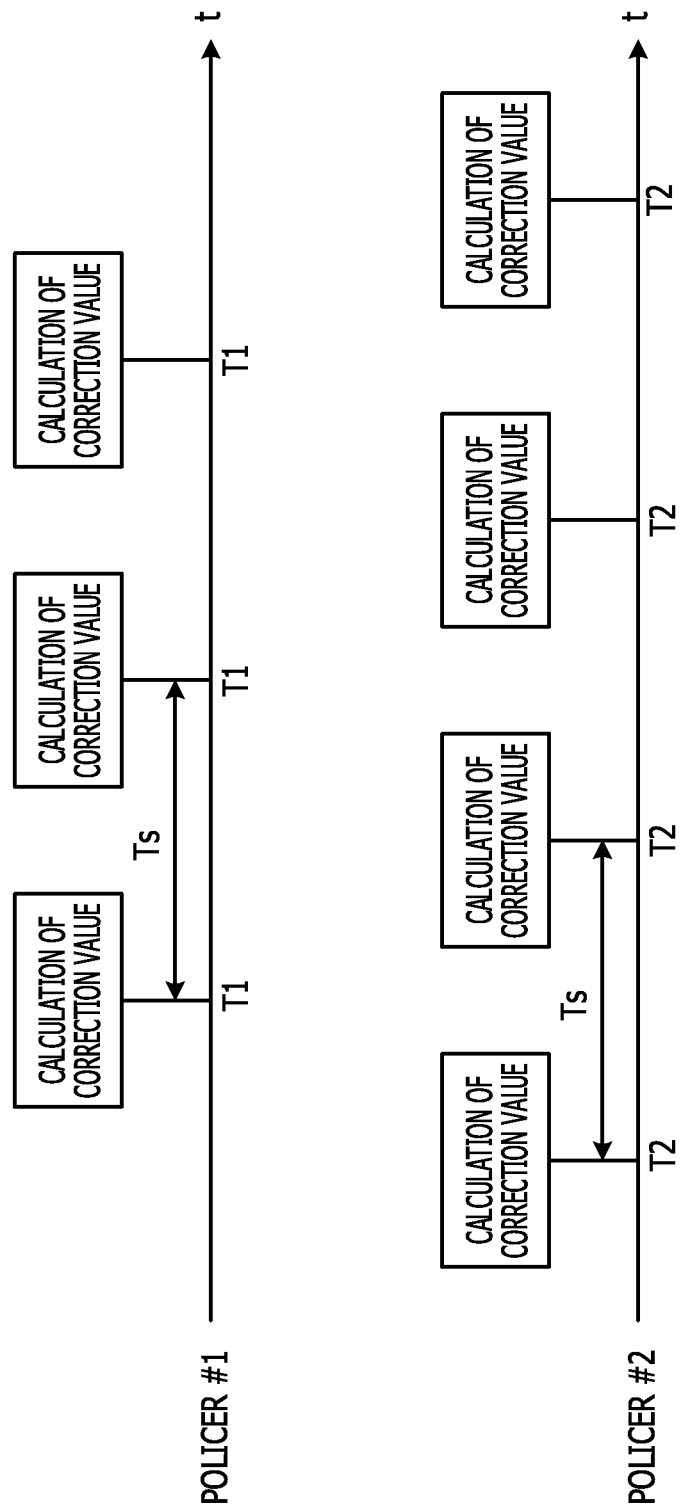
FIG. 11 is a diagram illustrating an example of a correction value calculation timing.

The correction unit $14a$ calculates the correction value (±Δth) based on the acquired passage amount information. In FIG. 11, an example of a correction value calculation timing is illustrated. FIG. 11 illustrates the correction value calculation timings of the policers #1 and #2 as an example. In the meantime, the horizontal axis indicates the time in FIG. 11.

The correction units 14a of the policers #1 and #2 calculate the correction values in synchronization with the token supply timings T1, T2, respectively. Therefore, the correction value calculation timings of the policers #1 and #2 are different from each other even though the policers #1 and #2 belong to the same group.

Each of the policers #1 and #2 calculates the correction value after the token is supplied and clears all the passage amounts of each of the policer numbers within the passage amount management table 21 to 0. That is, the correction value is calculated based on the cumulatively summed up passage amount at each time interval Ts at which the token is supplied. Hereinafter, descriptions will be made on the correction value calculation method.

The correction unit 14a calculates an average value Xa of the passage amounts of packets of other policers #j and #k that belong to the same group as that of the policer #i. The correction unit 14a calculates the correction value (±Δth) based on a difference between the passage amount X of packet of the policer #i and the calculated average value Xa.

$$\pm\Delta th = \pm\Delta th(\text{pre}) + X - Xa \quad (1)$$

The correction unit 14a calculates the correction value (±Δth) according to, for example, Equation (1) described above. Here, the term "±Δth(pre)" in Equation (1) is a correction value acquired from the token management table 20 (see FIG. 9), that is, the correction value calculated at the previous time. The correction unit 14a calculates the correction value by adding the difference between the passage amount X of packet of the policer #i (first bandwidth control device) and the average value Xa of the passage amounts of packets of other policers #j and #k (other bandwidth control devices) that belong to the same group to the correction value calculated at the previous time.

When Equation (1) is used, the correction value is calculated using the correction value obtained at the previous calculation processing as a base. Therefore, the correction unit 14a may calculate a suitable correction value based on the passage amount cumulatively summed up over a long time period using the correction value calculated at the previous time in the calculation processing performed at the time sections after a certain section for the calculation processing even in a case where a suitable correction value is unable to be calculated within a single time section of the calculation processing alone (that is, the time interval Ts of FIG. 11).

Therefore, according to the correction value calculation method based on Equation (1), for example, when the burst traffic in which variation in the input timing of packet exists is input to a policer, a high precision correction value may be obtained.

$$\pm\Delta th = X - Xa \quad (2)$$

Further, the correction unit 14a may calculate the correction value (±Δth) according to Equation (2). In this case, the correction unit 14a calculates the correction value as the difference between the passage amount X of packet of the policer #i (first bandwidth control device) and the average value Xa of the passage amounts of packets of other policers #j and #k (other bandwidth control devices) that belong to the same group.

When Equation (2) is used, the correction value is calculated for each time section of the calculation processing unlike the case where Equation (1) is used. Therefore, the correction unit 14a may calculate the suitable correction value immediately based on the passage amount cumulatively summed up over a short time period.

Therefore, according to the correction value calculation method based on Equation (2), in a case where the traffic in which variation in the input timing of packet is small is input to the policer as in a case of, for example, distribution of image data or music data, a high precision correction value may be obtained.

Further, the correction unit 14a may determine whether the calculation of the correction value of the policer #i is to be allowed or the passage amounts of packets of other policers #j and #k that belong to the same group as that of the policer #i are to be used for calculating the correction value, according to the correction allow/disallow flag (see, e.g., FIG. 10).

In this case, the correction unit 14a calculates the correction value when the correction allow/disallow flag of the policer #i in the policer number within a group is "1" and otherwise, does not calculate the correction value when the correction allow/disallow flag of the policer #i is "0". Further, the correction unit 14a uses the passage amount of packets of a corresponding policer for calculating the correction value when the correction allow/disallow flags of other policers #j and #k in the policer number within a group is "1" and otherwise, does not use the passage amount of packets of a corresponding policer for calculating the correction value when the correction allow/disallow flag of other policers #j and #k in the policer number within a group is "0".

The correction unit 14a sets the correction allow/disallow flag of the policer #i to "1" when the token accumulation amount Tc is equal to or less than the threshold value and sets the correction allow/disallow flag of the policer #i to "0" when the token accumulation amount Tc is greater than the threshold value. That is, the correction unit 14a calculates an average value Xa of only the passage amounts of packets of the policer of which the token accumulation amount Tc is equal to or less than the threshold value among the policers #i, #j and #k that belong to the same group. This is because the pass bandwidth of the packet of each of other policers of which the input rate of the packet is high may be caused to decrease more than necessary when the passage amount of packets of the policer of which input rate of the packet is low is used for calculating the correction value.

For example, in a case where the total pass bandwidth of the policers #1, #2, #15, and #37 is limited to 10 Mbps, when the input rate of the policer #15 is set to 1 Mbps, in an ideal bandwidth control, the remaining 9 Mbps are evenly allocated such that 3 Mbps is allocated to each of the policer #1, #2, and #37. That is, the correction value may be calculated such that each of the pass bandwidths of the policers #1, #2, #37 are 15 is converged to 3 Mbps.

However, when the passage amount of packets of the policer #15 is used for calculating the correction value, each of the pass bandwidths of the packets of the policers #1, #2, and #37 is controlled to be converged to 2.3 Mbps (which equals to (3+3+⅓) based on the average value of the passage amounts of packets of other policers. Further, since the passage amount of packets of the policer #15 is always equal to or less than the average value of the passage amounts of packets of other policers #1, #2, and #37 so that the decrease of the correction value for the policer #15 may be continued, a suitable bandwidth control for the policer #15 is not achieved. In the meantime, since the input rate of packet of the policer #15 is low, the token is supplied before the token accumulation amount Tc is completely consumed such that a shortage of the token of the policer #15 is hard to occur.

Accordingly, as described above, the passage amount of packets of the policer of which the token accumulation amount Tc is greater than the threshold value is not used for calculating the correction value such that an unsuitable bandwidth control is prevented. In the example described above, as illustrated in FIG. 10, the correction unit 14a does not use the passage amount of packets of the policer #15 for calculating the correction value by setting the correction allow/disallow flag of a policer of which the policer number within a group is "15" to "0".

The correction unit 14a compares the token accumulation amount Tc with the threshold value each time when the packet passes through and updates the correction allow/disallow flag of the corresponding policer number of the passage amount management table 21 according to the comparison result. For example, the correction unit 14a of the policer #1 updates the correction allow/disallow flag of the policer number "1" in the column of the policer number within a group of "1". When the token accumulation amount Tc updated after the packet has passed through is equal to or less than the threshold value, the correction allow/disallow flag is updated to "1" and otherwise, when the token accumulation amount Tc is greater than the threshold value, the correction allow/disallow flag is updated to "0".

In the present example, the correction allow/disallow flag is determined based on the result of the comparison between the token accumulation amount Tc and the threshold value, but may be determined based on the result of the comparison between the token accumulation amount Tc and a value obtained by adding a predetermined value to the threshold value so that a determination reference to allow/disallow the correction is adjusted. That is, the correction unit 14a calculates the average value Xa of the passage amounts of packets of the policer of which the token accumulation amount Tc is equal to or less than the threshold value or equal to or less than a value obtained by adding a predetermined value to the threshold value, among other policers #j and #k (other bandwidth control devices) that belong to the same group.

Further, the correction unit 14a outputs the correction allow/disallow flag to the passage amount notification unit 11a. The passage amount notification unit 11a transmits the correction allow/disallow flag along with the length of the packet Di as the passage information to the other policers #j and #k that belong to the same group. Other policers #j and #k also transmit the passage information containing the correction allow/disallow flag and the lengths of the packets Dj and Dk to the policer #i.

When the passage information is received from other policers #j and #k that belong to the same group, the passage amount management unit 13 registers the correction allow/disallow flag contained in the passage information in the passage amount management table 21. For example, when the passage information is received from the policer #2, the passage amount management unit 13 of the policer #1 registers the correction allow/disallow flag contained in the passage information in the policer number within a group of "2" in the column of the policer number "1". The correction allow/disallow flag within the passage amount management table 21 is read and used at the time when the correction unit 14a calculates the correction value. Next, a physical configuration of the bandwidth control unit of the first embodiment will be described.

Figure 12:
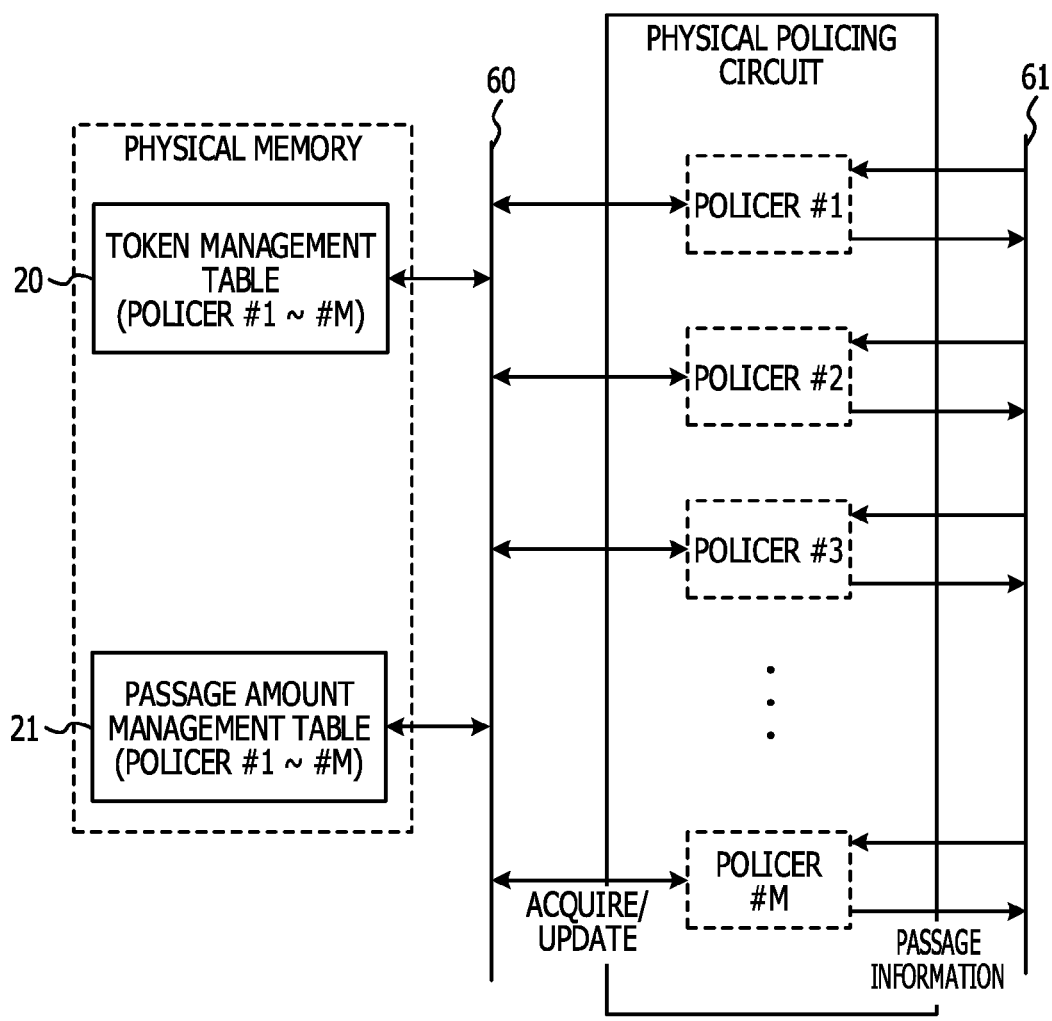
FIG. 12 is a block diagram illustrating an example of a physical configuration of a policer, passage amount management table, and token management table.

FIG. 12 is a block diagram illustrating an example of a physical configuration of the policers #1 to #M, the passage amount management table 21, and the token management table 20. Respective policers #1 to #M are formed in a plurality of regions within a physical policing circuit, for example, a FPGA or CPU, and the passage amount management table 21 and the token management table 20 are formed in a plurality of regions within a physical memory, for example, a storage unit 915 (see, e.g., FIG. 2).

Each of the policers #1 to #M accesses the passage amount management table 21 and the token management table 20 through a bus 60 to acquire or update information about the policers #1 to #M. Further, the policers #1 to #M transmit and receive the passage information to and from each other through the bus 61.

Figure 13:
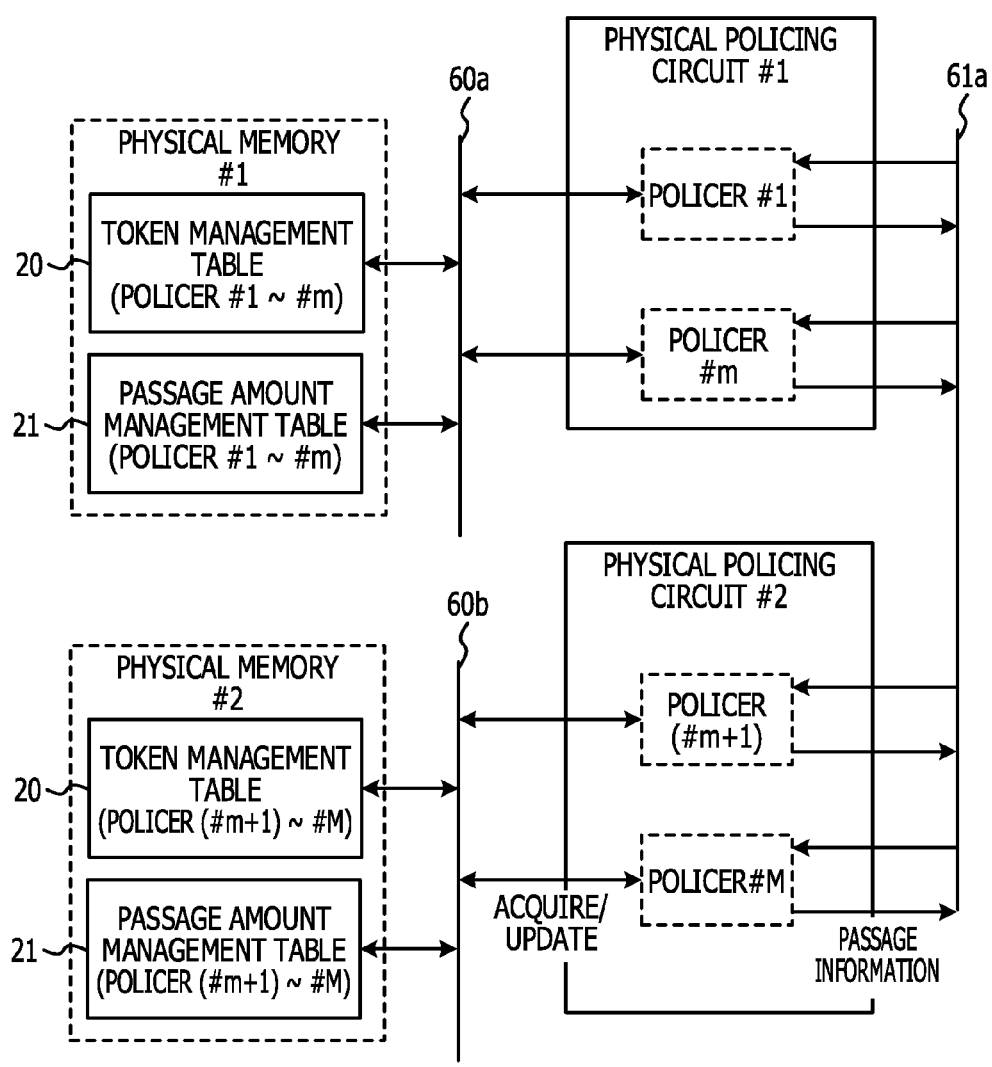
FIG. 13 is a block diagram illustrating another example of the physical configuration of the policer, passage amount management table, and token management table.

Further, FIG. 13 is a block diagram illustrating another example of the physical configuration of the policers #1 to #M, the passage amount management table 21 and the token management table 20. In the present embodiment, the policers #1 to #M are divided to be formed into two physical policing circuits #1 and #2. That is, the policers #1 to #m (m is a positive integer) are formed in a plurality of regions within a physical policing circuit #1 and the policers # m+1 to #M are formed in a plurality of regions within a physical policing circuit #2.

In the meantime, the passage amount management table 21 and the token management table 20 are also divided to be formed into two physical memories #1 and #2. That is, the passage amount management table 21 and the token management table 20 in which the information about the policer #1 to #m are registered are formed in the plurality of regions within the physical the memory #1. Further, the passage amount management table 21 and the token management table 20 in which the information about the policer #m+1 to #M are registered are formed in the plurality of regions within the physical the memory #2.

Each of the policers #1 to #m within the physical policing circuit #1 accesses the passage amount management table 21 and the token management table 20 within the physical memory #1 through a bus 60a to acquire or update information about the policers #1 to #m. Further, each of the policers #m+1 to #M within the physical policing circuit #2 accesses the passage amount management table 21 and the token management table 20 within the physical memory #2 through a bus 61a to acquire or update information about the policers #m+1 to #M. Further, the policers #1 to #M transmit and receive the passage information to and from each other through the bus 61a.

The physical configuration described above is applied to, for example, a case where the physical policing circuit #1 and #2 and physical the memory #1 and #2 are equipped in two network interface cards 91, respectively. According to the physical configuration, the bandwidth control method described above may be performed by grouping respective policers (e.g., policer #1 and #M) included within two different network interface cards 91.

Next, descriptions will be made on respective processings in the bandwidth control method of the first embodiment.

Figure 14:
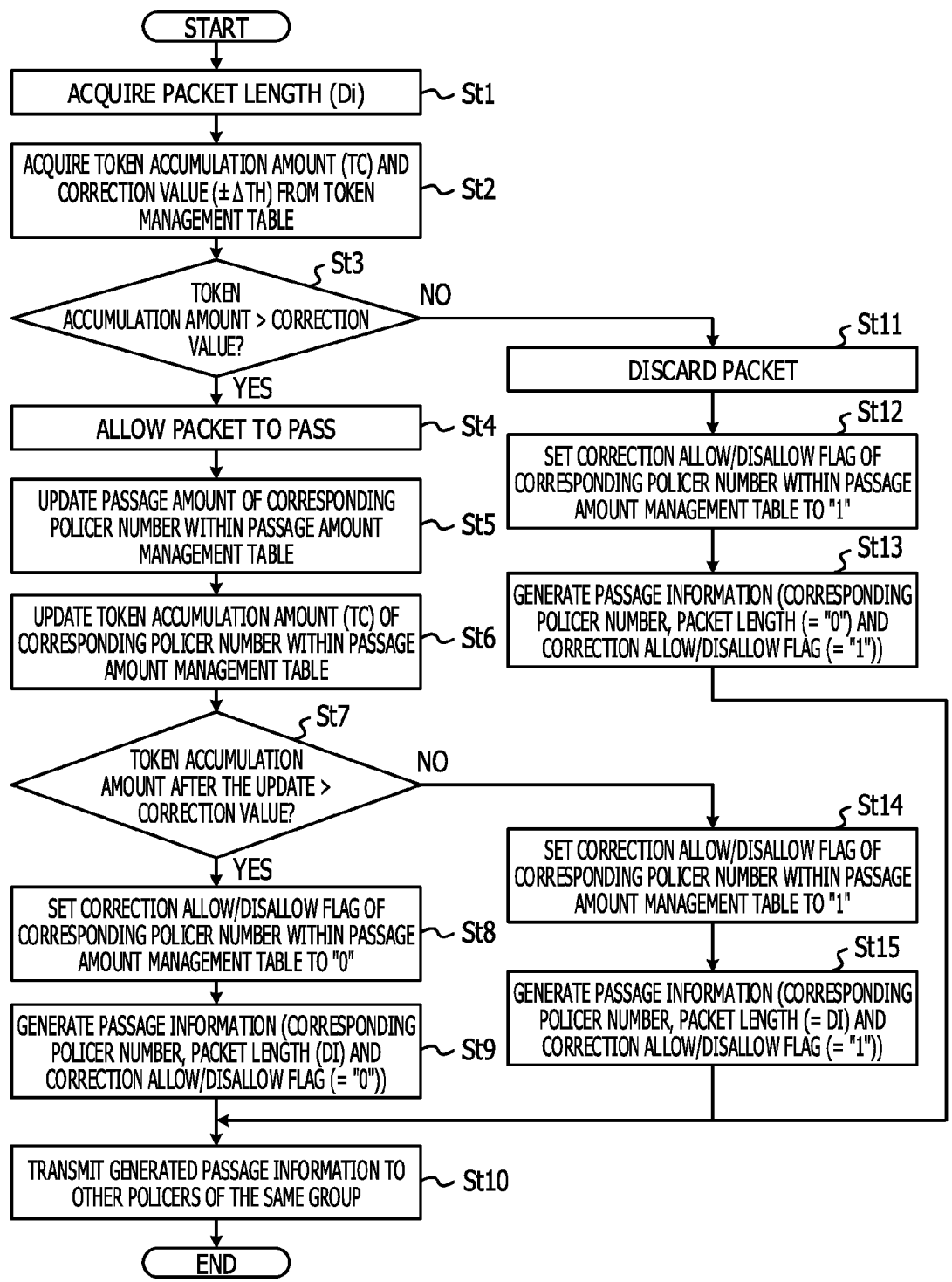
FIG. 14 is a flowchart illustrating an example of a packet processing.

FIG. 14 is a flowchart illustrating an example of a packet processing. First of all, when a packet is input, the token management unit 1 acquires the length Di of the packet (Operation St1).

Next, the policing unit 10a acquires the token accumulation amount Tc and correction value ($\pm\Delta$th) from the token management table 20 (Operation St2). Next, the policing unit 10a compares the token accumulation amount Tc with the correction value (i.e., a threshold value after the correction) (Operation St3). When it is determined that the token accumulation amount Tc is greater than the correction value ("YES" at Operation St3), the policing unit 10a allows the input packet to pass (Operation St4).

Next, the passage amount notification unit 11a updates a passage amount of the policer number "i" within the passage amount management table 21 by adding the length Di of the packet which has passed through to the passage amount (Operation St5). Next, the token management unit 12 updates the token accumulation amount Tc of the policer number "i" within the passage amount management table 21 by subtracting the length Di of the packet from the token accumulation amount Tc (Operation St6). In the meantime, the processing of Operation St6 may be executed earlier than the processing of Operation St5.

Next, the correction unit 14a compares the token accumulation amount Tc after the update with the correction value (i.e., the threshold value after the correction) (Operation St7). When it is determined that the token accumulation amount Tc after the update is greater than the correction value ("YES" at Operation St7), the correction unit 14a sets a correction allow/disallow flag of the policer number "i" within the passage amount management table 21 to "0" (Operation St8).

Next, the passage amount notification unit 11a generates the passage information containing the policer number "i", the length Di of packet, and the correction allow/disallow flag (which equals to "0") (Operation St9). Next, the passage amount notification unit 11 transmits the generated passage information to other policers #j and #k that belong to the same group (Operation St10), and ends the processing.

Further, when it is determined that the token accumulation amount Tc is equal to or less than the correction value ("NO" at Operation St3), the policing unit 10a discards the packet (Operation St11). As described above, the policing unit 10a determines whether the input packet is allowed to pass through based on the result of the comparison between the token accumulation amount Tc and the threshold value, and allows the packet to pass or discards the packet according to the determination result. Accordingly, the pass bandwidth for the packet input to the policer #i is limited.

Next, the correction unit 14a sets the correction allow/disallow flag of the policer number "i" within the passage amount management table 21 to "1" (Operation St12). Next, the passage amount notification unit 11 generates the passage information containing the corresponding policer number, the length Di of packet (which equals to "0"), and the correction allow/disallow flag (which equals to "1") (Operation St13). Next, the passage amount notification unit 11 transmits the generated passage information to other policers #j and #k that belong to the same group (Operation St10), and ends the processing.

Further, when it is determined that the token accumulation amount Tc after the update is equal to or less than the correction value ("NO" at Operation St7), the correction unit 14a sets the correction allow/disallow flag of the policer number "i" within the passage amount management table 21 to "1" (Operation St14). Next, the passage amount notification unit 11 generates the passage information containing the corresponding policer number, the length Di of packet, and the correction allow/disallow flag (which equals to "1") (Operation St15). Next, the passage amount notification unit 11 transmits the generated passage information to other policers #j and #k that belong to the same group (Operation St10), and ends the processing. In this manner, the packet processing is performed.

Figure 15:
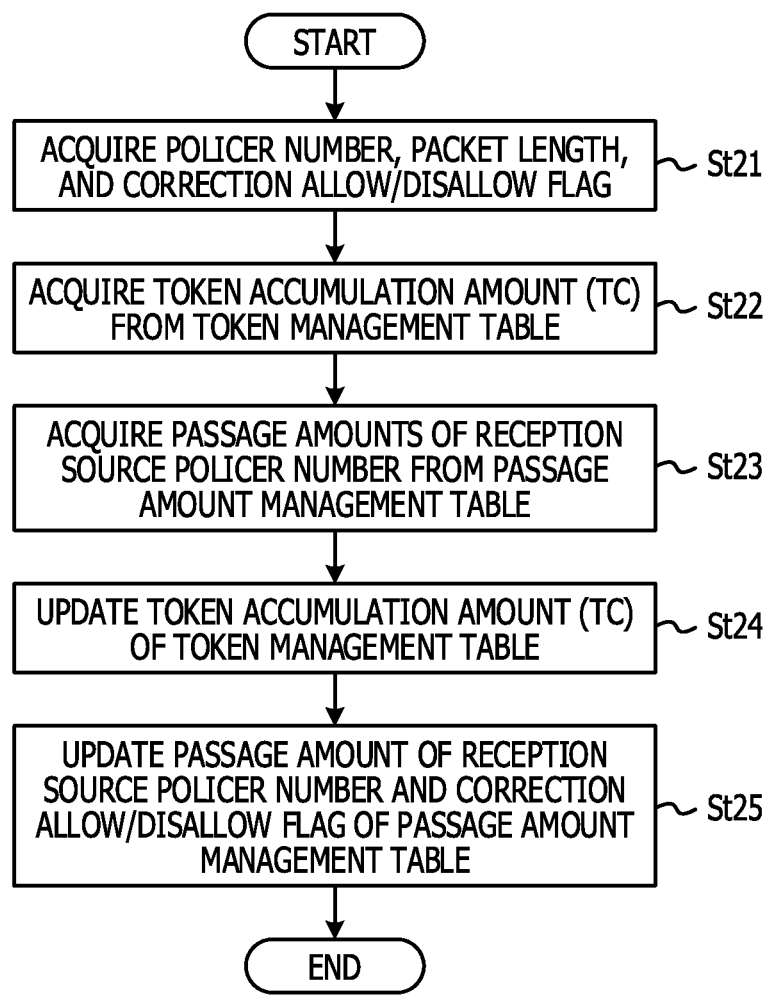
FIG. 15 is a flowchart illustrating an example of a passage information reception processing.

FIG. 15 is a flowchart illustrating an example of a passage information reception processing. First of all, when the passage information is received from other policers #j and #k that belong to the same group, the token management unit 12 and the passage amount management unit 13 acquire the reception source policer numbers "j" and "k", the lengths Dj and Dk of packets that have passed through, and the correction allow/disallow flags from the passage information (Operation St21).

Next, the token management unit 12 acquires the token accumulation amount Tc from the token management table 20 (Operation St22). Next, the passage amount management unit 13 acquires the passage amounts of the reception source policer numbers "j" and "k" from the passage amount management table 21 (Operation St23). In the meantime, the processing of Operation St23 may be executed earlier than the processing of Operation St22.

Next, the token management unit 12 updates the token accumulation amount Tc of the token management table 20 by subtracting the acquired lengths Dj and Dk of the packets from the token accumulation amount Tc (Operation St24). That is, the token accumulation amount Tc is consumed each time when any one of the policers #i, #j, and #k allows the packet to pass.

Next, the passage amount management unit 13 updates the passage amount of packets of the reception source policer numbers "j" and "k" and the correction allow/disallow flag of the passage amount management table 21 based on the passage amount and the correction allow/disallow flag acquired from the passage information, respectively (Operation St25). That is, the passage amount acquired from the passage information is added to the reception source policer numbers "j" and "k" of the passage amount management table 21 and the correction allow/disallow flag of the passage amount management table 21 is updated with the correction allow/disallow flag acquired from the passage information. In the meantime, the processing of Operation St25 may be executed earlier than the processing of Operation St24. In this manner, the passage information reception processing is performed.

Figure 16:
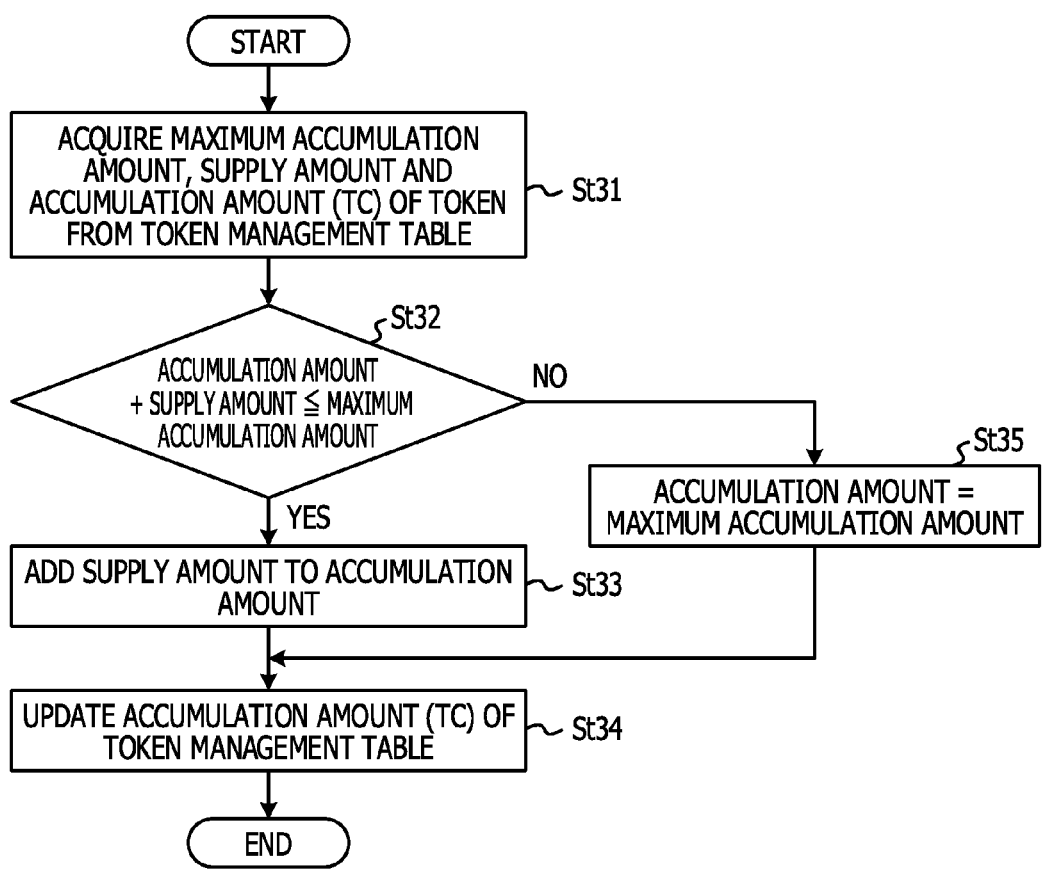
FIG. 16 is a flowchart illustrating an example of a token supply processing.

FIG. 16 is a flowchart illustrating an example of a token supply processing. First of all, when the token supply timing Ti arrives, the token management unit 12 acquires the maximum accumulation amount, the supply amount Tm, and the accumulation amount Tc of the policer number "i" from the token management table 20 (Operation St31). In the meantime, the token management unit 12 detects a token supply timing Ti using, for example, a built-in timer.

Next, the token management unit 12 determines whether a total of the accumulation amount Tc and the supply amount Tm is equal to or less than the maximum accumulation amount (Operation St32). When it is determined that the total of the accumulation amount Tc and the supply amount Tm is equal to or less than the maximum accumulation amount ("YES" at Operation St32), the token management unit 12 adds the supply amount to the accumulation amount Tc (Operation St33), updates the accumulation amount Tc of the token management table 20 (Operation St34), and ends the token supply processing.

When it is determined that the total of the accumulation amount Tc and the supply amount Tm is greater than the maximum accumulation amount ("NO" at Operation St32), the token management unit 12 sets the accumulation amount Tc as the maximum supply amount (Operation St35), updates the accumulation amount Tc of the token management table 20 (Operation St34), and ends the token supply processing. As described above, the token is supplied periodically and limited not to exceed the maximum accumulation amount. In this manner, the token supply processing is performed.

Figure 17:
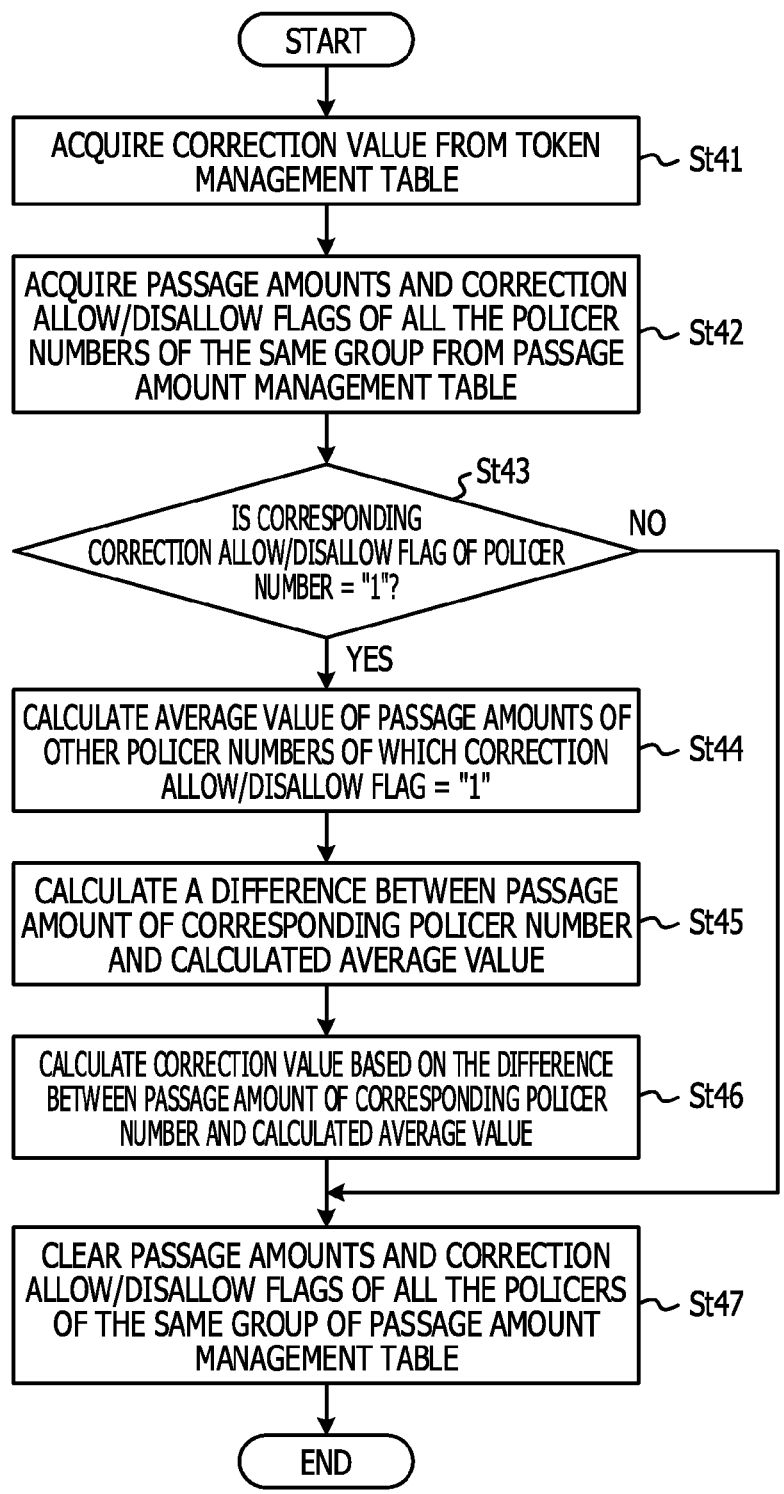
FIG. 17 is a flowchart illustrating an example of a correction value calculation processing.

FIG. 17 is a flowchart illustrating an example of a correction value calculation processing. The correction value calculation processing is executed after the token supply processing.

First of all, the correction unit 14a acquires a correction value (±Δth) of the policer number "i" from the token management table 20 (Operation St41). Next, the correction unit 14a acquires the passage amounts of the packets and the correction allow/disallow flags of all the policer numbers "i", "j" and "k" that belong to the same group from the passage amount management table 21 (Operation St42). In the meantime, the processing of Operation St42 may be executed earlier than the processing of Operation St41.

Next, the correction unit 14a determines whether the correction allow/disallow flag of the policer number "i" is "1" (Operation St43). When it is determined that the correction allow/disallow flag is "0" ("NO" at Operation St43), the correction unit 14a clears the passage amounts of the packets and the correction allow/disallow flags of all the policer numbers "i", "j" and "k" that belong to the same group of the passage amount management table 21 (Operation St47), and ends the correction value calculation processing. Accordingly, each passage amount becomes 0 byte and each correction allow/disallow flag becomes "1".

When it is determined that the correction allow/disallow flag of the policer number "i" is "1" ("YES" at Operation St43), the correction unit 14a calculates an average value of the passage amounts of other policer numbers "j" and "k" of which the correction allow/disallow flag is "1" (Operation St44). That is, the correction unit 14a calculates the average value by dividing the total of passage amounts of other policers #j and #k of which the correction allow/disallow flag is "1" by the number of other policers "j" and "k".

In the example of FIG. 10, the correction unit 14a of the policer #1 calculates an average value of the passage amounts of other policer numbers "2" and "37" of which the correction allow/disallow flag is "1". The passage amount of the policer number "2" is 7200 bytes and the passage amount of the policer number "37" is 2800 bytes. Accordingly, the average value is calculated as (7200+2800)/2=5000 (bytes). In the meantime, since the correction allow/disallow flag of the policer number "15" is "0", the passage amount of the policer number "15" is not used for calculating the average value.

That is, the correction unit 14a calculates an average value of the passage amount of the packets of the policer of which the token accumulation amount Tc is equal to or less than the threshold value or a value obtained by adding a predetermined value to the threshold value, among other policers #j and #k. Accordingly, the unsuitable pass bandwidth control as described above is prevented. In the meantime, the average value may be calculated by summing the values obtained through multiplication of the correction allow/disallow flag of the corresponding policer with each of the passage amounts of other policers #j and #k that belong to the same group and dividing the summed value by the total of the correction allow/disallow flags of other policers #j and #k.

Next, the correction unit 14a calculates a difference between the passage amount of the policer number "i" and the calculated average value (Operation St45). In the example of FIG. 10, since the passage amount of the policer number "1" is 3500 bytes, the correction unit 14a of the policer #1 calculates the difference between the passage amount of the policer number "i" and the calculated average value as 3500-5000=-1500 (bytes).

Next, the correction unit 14a calculates the correction value (±Δth) based on the difference between the passage amount of the policer number "1" and the calculated average value (Operation St46). As the correction value calculation method, a calculation method in which the correction value is calculated using, for example, Equation (1) or Equation (2) described above.

In the case of Equation (1), the correction value is calculated by adding the difference between the passage amount of the policer number "i" and the calculated average value to the correction value acquired from the token management table 20. That is, the correction value is calculated by adding a difference between the passage amount of the policer number "i" and the average value Xa of the passage amounts of the packets of other policers #j and #k to the correction value calculated at the previous time.

In the example of FIG. 9, the correction value calculated at the previous time is 500 bytes. Further, in the example of FIG. 10, the difference between the passage amount of the policer number "i" and the average value of the passage amounts of the packets of other policers #2 and #37 is −1500 bytes as described above. Accordingly, when Equation (1) is used, the correction value calculated by the correction unit 14a of the policer #1 becomes −1000 bytes (i.e., 500-1500).

In the meantime, in the case of Equation (2), the correction value is calculated as the difference between the passage amount of the policer number "i" and the calculated average value. That is, the correction value is calculated as the difference between the passage amount of the policer number "i" and the average value Xa of the passage amounts of the packets of other policers #j and #k. In the example of FIG. 10, when Equation (2) is used, the correction value calculated by the correction unit 14a of the policer #1 is −1500 bytes.

As described above, the correction unit 14a corrects the threshold value used for determining whether the packet to be allowed to pass through based on the result of the comparison between the passage amount of the policer number "i" and the passage amounts of the packets of other policers #j and #k. Accordingly, as described above, the passage amounts of the packets of other policers #i, #j, and #k that belong to the same group are averaged such that the difference in pass bandwidth between the policers #i, #j, and #k is reduced. In the meantime, the calculated correction value is registered in the token management table 20 by the token management unit 12.

Next, the correction unit 14a clears the passage amounts and the correction allow/disallow flags of all the policers #i, #j, and #k that belong to the same group of the passage amount management table 21 (Operation St47), and ends the correction value calculation processing. In this manner, the correction value calculation processing is performed.

In the first embodiment, the correction unit 14a corrects a threshold value (bottom) of the token bucket 19a, but may correct the token accumulation amount Tc instead of the threshold value.

Figure 18:
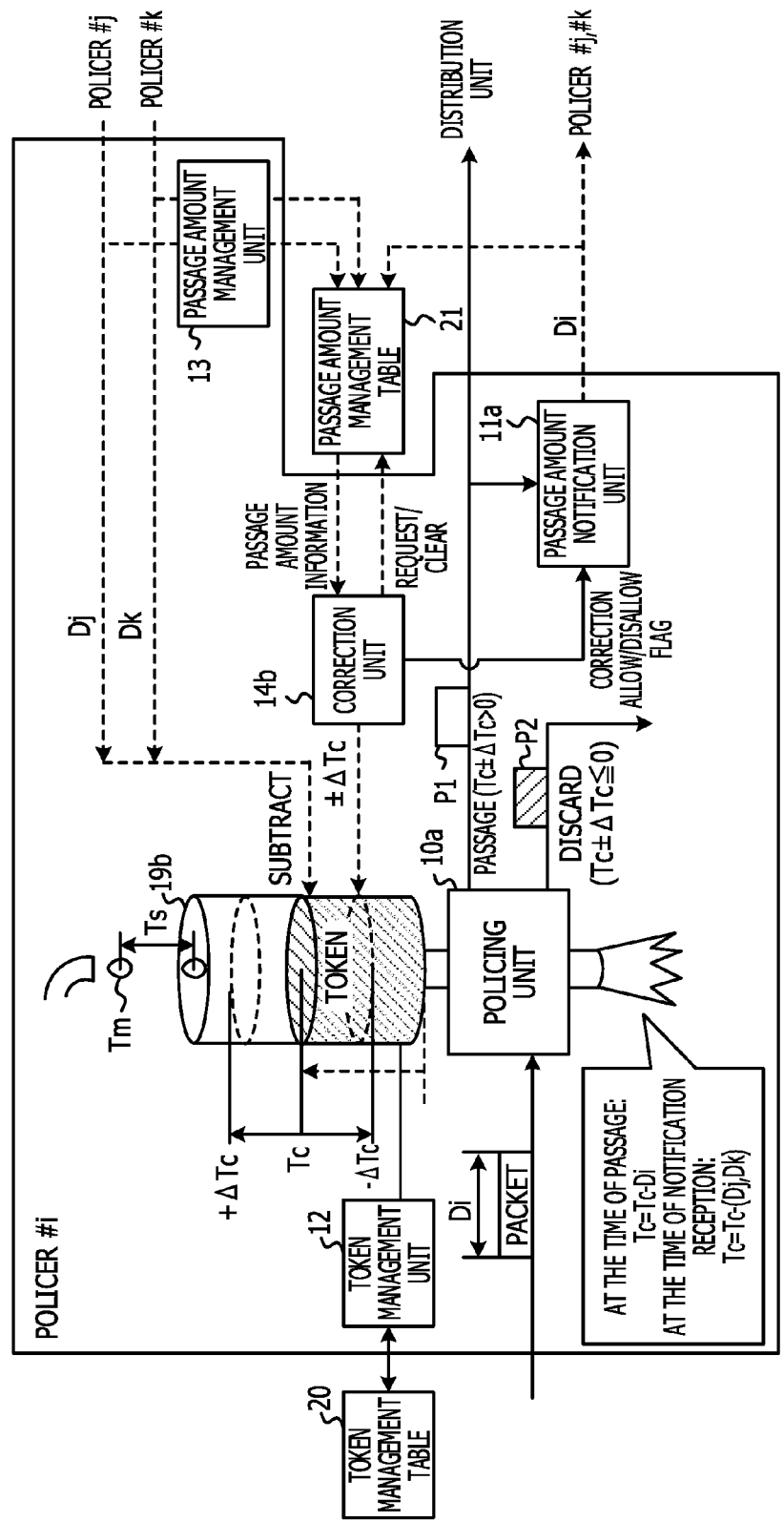
FIG. 18 is a block diagram illustrating a configuration of another embodiment of the bandwidth control unit.

FIG. 18 is a block diagram illustrating a configuration of another embodiment of the bandwidth control unit 81. In FIG. 18, the same reference numerals are assigned to the constitutional elements which are common to those of FIG. 8, and descriptions thereof will be omitted.

In FIG. 18, only the configuration of the policer #i among the policers #i, #j, and #k that belong to the same group is illustrated, but other policers #j and #k also have the same configuration. The policer #i includes a policing unit (control unit) 10a, a passage amount notification unit 11a, the token management unit 12 functioning as a token bucket 19b, the passage amount management unit 13, and a correction unit 14b.

The correction unit 14b corrects the token accumulation amount (permissible passage amount) Tc used for determining whether the packet is to be allowed to pass based on the result of the comparison between the passage amount of packets of the policer #i and those of other policers #j and #k. When the passage amount of packets of the policer #i is relatively large in the group, the correction unit 14b reduces the token accumulation amount Tc (−Δth) within the token bucket 19b and otherwise, when the passage amount of packets of the policer #i is relatively small in the group, the correction unit 14b increases the token accumulation amount Tc (+Δth) of the token bucket 19b.

$$Tc+\text{correction value} > \text{threshold value}(0) \quad (3)$$

The policing unit 10a determines whether the packet is to be allowed to pass through based on the result of the comparison between the corrected token accumulation amount Tc and the threshold value, and allows the packet to pass or discards the packet based on the determination result. That is, the policing unit 10a allows the packet to pass when Equation (3) is satisfied and otherwise, discards the packet when Equation (3) is not satisfied.

$$Tc > \text{the threshold value}(0) + \text{correction value} \quad (4)$$

In the meantime, in the first embodiment illustrated in FIG. 8, when Equation (4) described above is satisfied, the policing unit 10a allows the packet to pass and otherwise, when Equation (4) is not satisfied, the policing unit 10a discards the packet. When the passage amount of packets of the policer #i is relatively large in the group, the correction unit 14a raises (+Δth) the bottom (which equals to the threshold value) of the token bucket 19a and otherwise, when the passage amount of packets of the policer #i is relatively small in the group, the correction unit 14a lowers (−Δth) the bottom of the token bucket 19a.

That is, under the same condition, a sign (plus or minus) of the correction value calculated by the correction unit 14a becomes opposite to that calculated by the correction unit 14b. Therefore, it may be regarded that the determination conditions of Equation (3) and Equation (4) are the same. Accordingly, the same processings (see, e.g., FIG. 14 through FIG. 17) as those in the embodiment illustrated in FIG. 8 may also be performed in the present embodiment.

That is, the correction value (±Δ Tc) of the token accumulation amount Tc is calculated based on, for example, Equation (1) or Equation (2) described above. Accordingly, the same effect as that described previously may also be obtained also in the present embodiment. In the meantime, in the present embodiment, the correction value (±Δ Tc) of the token accumulation amount Tc may not be reflected in the accumulation amount Tc within the token management table.

Simulation Result

Next, descriptions will be made on a simulation result of operations of the bandwidth control unit performed based on the first embodiment illustrated in FIG. 8.

Figure 19:
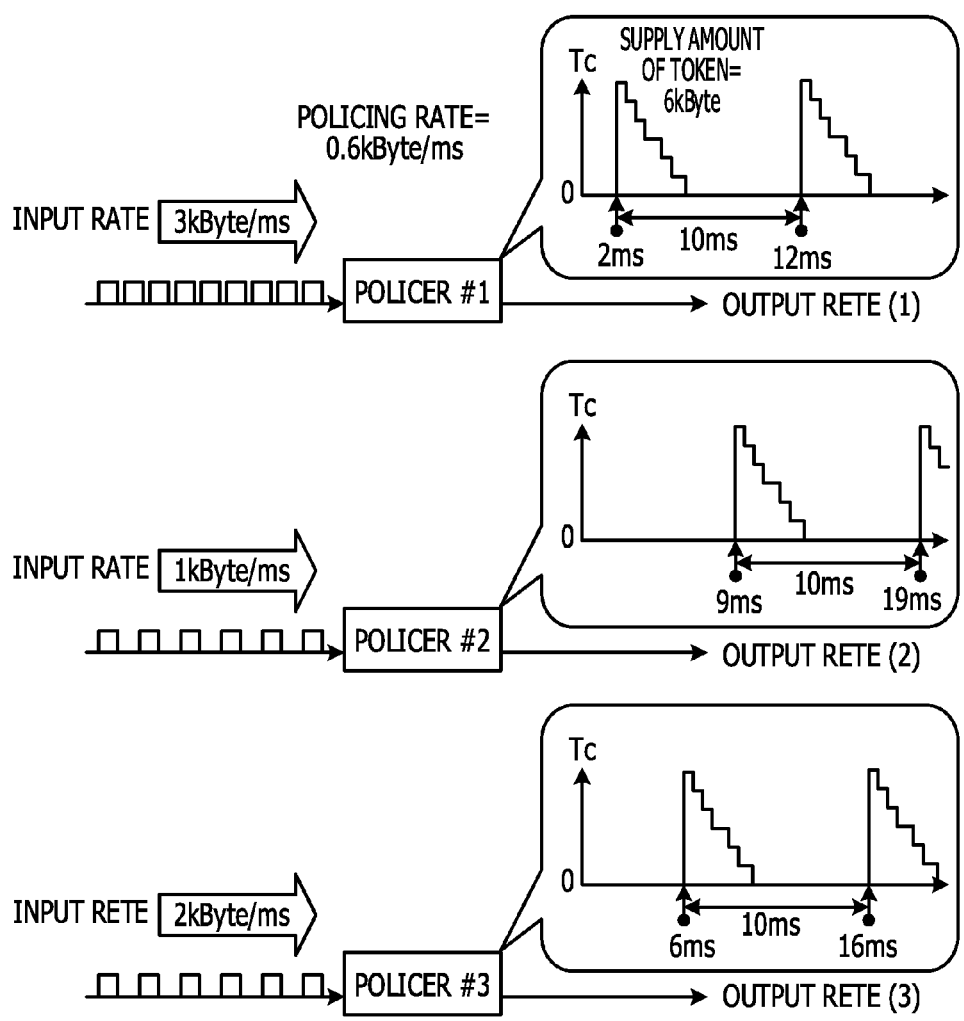
FIG. 19 is a diagram illustrating conditions in simulation for an operation of the bandwidth control unit.

In FIG. 19, conditions in simulation for operations of the bandwidth control unit are illustrated. In the present simulation, the policers #1 to #3 are grouped and the total pass bandwidth of the group is limited to 0.6 Kbytes/ms. Therefore, the token supply time interval Ts and the supply amount Tm for each of the policers #1 to #3 are set to 10 ms and 6 Kbytes, respectively.

Further, the token supply timings of the policers #1 to #3 are in asynchronization with each other. That is, the token supply timing of the policer #1 is 2+10×n (n is a positive integer) (ms), the token supply timing of the policer #2 is 9+10×n (ms), and the token supply timing of the policer #3 is 6+10×n (ms).

Further, the packets are input to the policers #1 to #3 at the input rates of 3 Kbytes/ms, 1 Kbytes/ms, and 2 Kbytes/ms, respectively. As described above, since the entire pass bandwidth of the group is limited to 0.6 Kbytes/ms, the bandwidth having an average value of 0.2 Kbytes/ms (which equals to 0.6/3) or more is input to the policers #1 to #3. That is, in the present simulation, the average value of 0.2 Kbytes/ms becomes an expected value of an output rate of each of the policers #1 to #3.

Figure 20A:
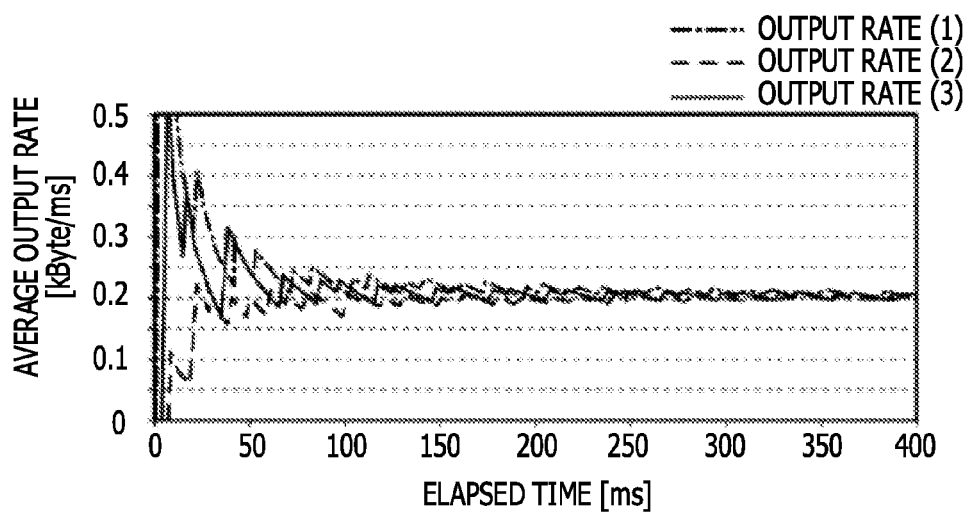
FIGS. 20A and 20B are graphs illustrating simulation results of an output rate and a correction value, respectively.
Figure 20B:
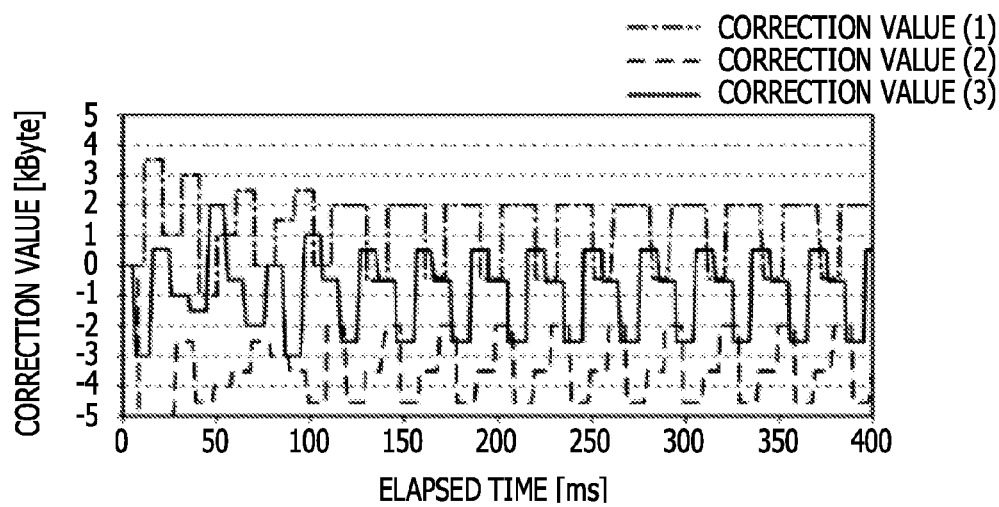

FIGS. 20A and 20B are graphs illustrating simulation results of an output rate and a correction value, respectively. In FIGS. 20A and 20B, each of the horizontal axes indicates an elapsed time (ms). Further, each of the vertical axes of FIGS. 20A and 20B illustrates the average output rates (1) to (3) Kbytes/ms of the packets and the correction values (1) to (3) Kbytes of each of the policers #1 to #3.

Referring to FIG. 20A, since the token is supplied to the policers #1 and #3 at the timing earlier than that for the policer #2, the average output rates (1) and (3) of the policers #1 and #3 exceed the expected value of 0.2 Kbytes/ms until the elapsed time reaches 30 ms. In the meantime, since the token is supplied to the policer #2 at the timing later than that for the policers #1 and #3, a time period during which the average output rates (2) of the policer #2 falls below the expected value of 0.2 Kbytes/ms until the elapsed time reaches 60 ms is long.

Therefore, as illustrated in FIG. 20B, the threshold value of each of the policers #1 and #3 is corrected with a plus correction value (+Δth) and the threshold value of the policer #2 is corrected with a minus correction value (−Δth). Accordingly, as illustrated in FIG. 20A, the average output rates (1) to (3) of the policers #1 to #3 are gradually converged to the expected value of 0.2 Kbytes/ms, respectively.

Figure 21A:
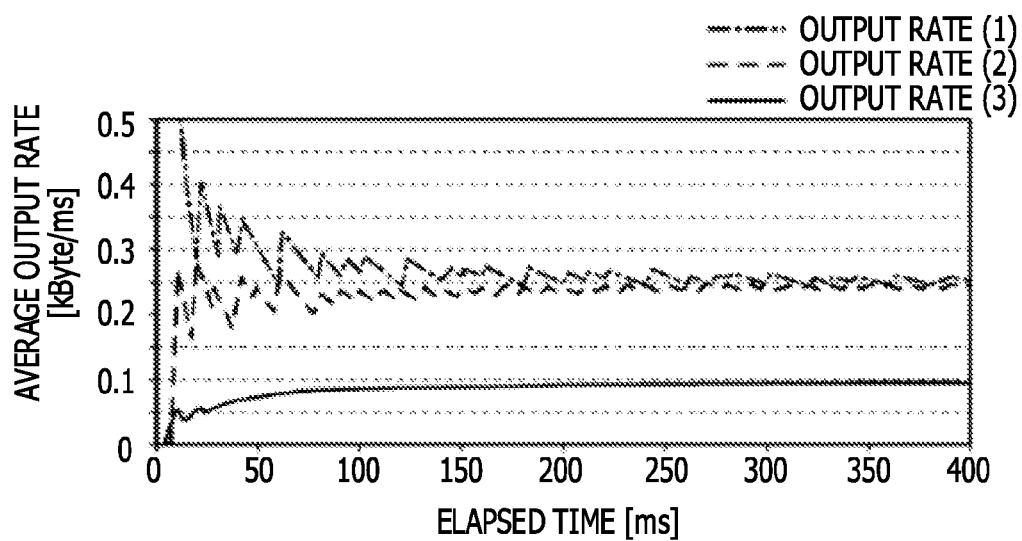
FIGS. 21A and 21B are graphs illustrating other simulation results of the output rate and the correction value, respectively.
Figure 21B:
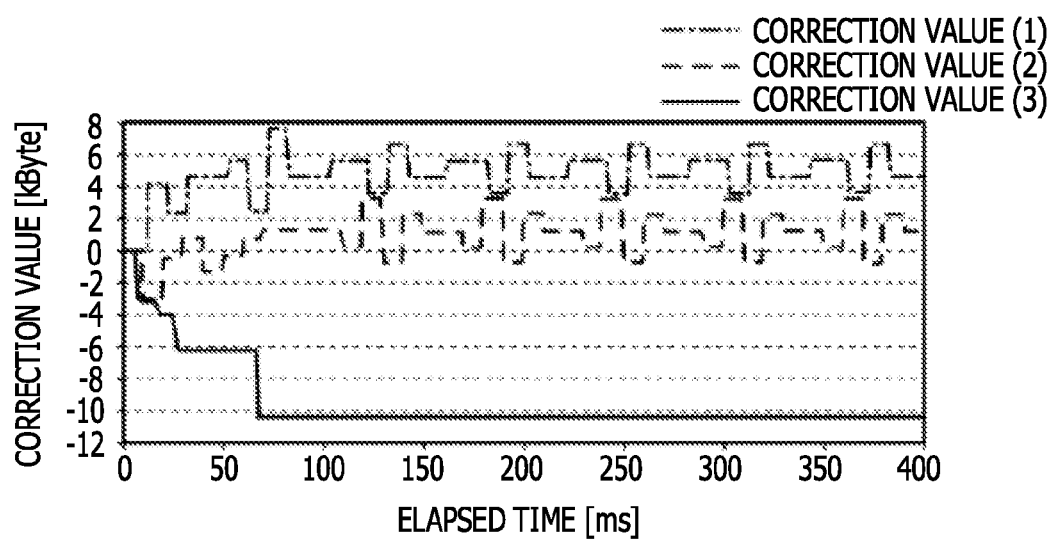

Further, FIGS. 21A and 21B are graphs illustrating other simulation results of the output rate and the correction value, respectively. The present simulation is performed by changing only the input rate of the policer #3 to 0.1 Kbytes/ms among the simulation conditions described above. That is, the bandwidth of which an average value is 0.2 Kbytes/ms or less is input only to the policer #3 among the policers #1 to #3.

Therefore, in the present simulation, the expected value of the average output rate (3) of the policer #3 is 0.1 Kbytes/ms. Further, the expected value of each of the average output rates (1) and (2) of the policers #1 and #2 becomes 0.25 Kbytes/ms (which equals to 0.5/2) obtained by equally dividing the remaining pass bandwidth 0.5 Kbytes/ms (which equals to 0.6-0.1) to be the same value.

As illustrated in FIG. 21A, the average output rates (1) and (2) of the policers #1 and #2 are gradually converged to the expected value of 0.25 Kbytes/ms, respectively. Further, the average output rate (3) of the policer #3 is gradually converged to the expected value of 0.1 Kbytes/ms.

As illustrated in FIG. 21A, the correction value for the policer #3 varies right after starting of the simulation. However, since the input rate of the policer #3 is low, the token accumulation amount Tc of the policer #3 exceeds the threshold value which is sufficiently lowered by the correction after the elapsed time of approximately 70 ms. Accordingly, since the correction allow/disallow flag of the policer

3 becomes "0", the correction value is stabilized to a predetermined value (approximately −10 Kbytes).

In the meantime, the policers #1 and #2 do not use the passage amount of the packets of the policer #3 in the correction value calculation processing after the elapsed time of approximately 70 ms. Accordingly, the average output rates (1) and (2) of the policers #1 and #2 are converged to 0.25 Kbytes/ms which is the expected value, respectively.

As described above, according to the bandwidth control method described above, since the output rate of packet for each policer is controlled to be converged to the expected value, the difference in pass bandwidth of the packet between the policers is reduced.

However, in a case where only one policer of which the correction allow/disallow flag among the plurality of policers grouped is "1" is present, the correction value of the corresponding policer is increased such that the output rate of the packet falls below the expected value.

For example, in a case where the policing rate is set to 10 Mbps and the input rate of each of the policers #1 to #3 among four policers #1 to #4 grouped is 1 Mbps, the remaining 7 Mbps (which equals to 10−1×3) is allocated to the policer #4 in the ideal bandwidth control. However, when the passage amounts of packets of all the policers #1 to #4 are used for calculating the correction value, the pass bandwidth of the packet of the policer #4 is controlled to be converged to 1 Mbps (which equals to (⅓+⅓+⅓)) based on the average value of the passage amounts of packets of other policers.

Therefore, the correction units 14a and 14b control the correction allow/disallow flag of each of the policers #1 to #3 to be "0" to exclude the passage amount of packets of each of the policers #1 to #3 from a target for the correction value calculation. That is, only the policer #4 of which the correction allow/disallow flag is "1" becomes the target for the correction value calculation.

In this case, since the correction value for the policer #4 is calculated based only on the passage amount of the first bandwidth control device, the correction value is increased each time when the correction value is calculated such that the passage amount falls below the expected value of 7 Mbps. Hereinafter, a specific example using the simulation result will be described.

Figure 22A:
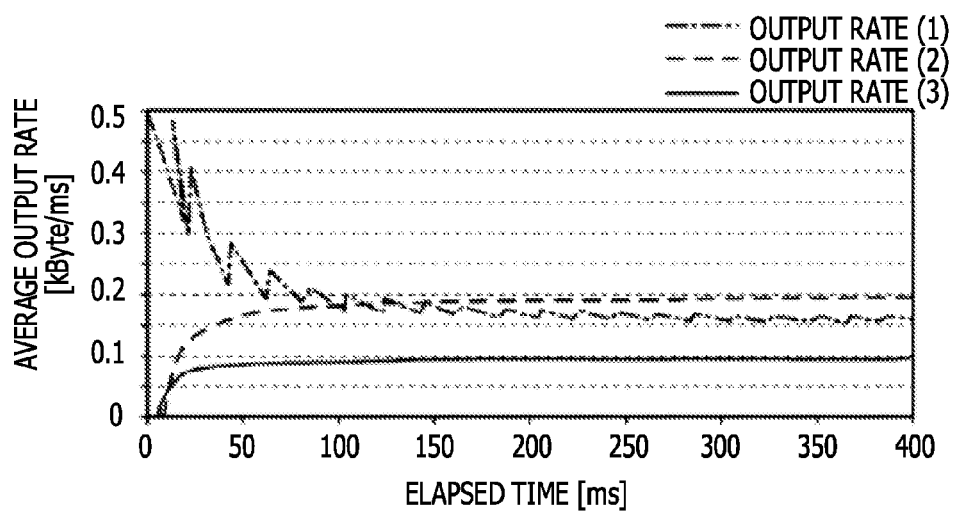
FIGS. 22A and 22B are graphs illustrating examples of the simulation results of the output rate and the correction value, respectively, in a case where only one policer within the same group performs the correction value calculation processing.
Figure 22B:
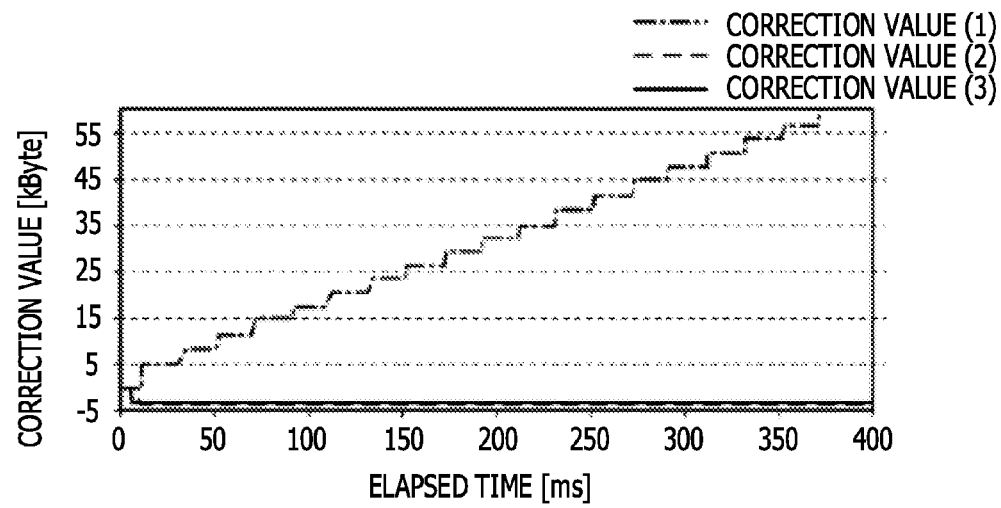

FIGS. 22A and 22B are graphs illustrating examples of the simulation results of the output rate and the correction value, respectively, in a case where only one policer within the same group performs the correction value calculation processing. The present simulation is performed by changing the input rates of the policers #2 and #3 among the simulation conditions illustrated in FIG. 19 to 0.2 Kbytes/ms and 0.1 Kbytes/ms, respectively. In this case, only the input rate of 3 Kbytes/ms of the policer #1 exceeds the average value of 0.2 Kbytes/ms of the policing rate of 0.6 Kbytes/ms.

Therefore, in the present simulation, the expected values of the average output rates (2) and (3) of the policers #2 and #3 are 0.2 Kbytes/ms and 0.1 Kbytes/ms according to the input rate, respectively. Further, the expected value of the average output rate (1) of the policer #1 is the remaining pass bandwidth of 0.3 Kbytes/ms (which equals to 0.6−0.2−0.1) of the policing rate.

As illustrated in FIG. 22B, the correction flag of the policers #2 and #3 becomes "0" such that the correction value of the policers #2 and #3 are controlled to be a predetermined value. In contrast, since the correction flag of the policer #1 is "1", only the passage amount of the packets of the first bandwidth control device is used for calculating the correction value such that the correction value monotonously increases with lapse of time.

Accordingly, as illustrated in FIG. 22A, since the average output rates (2) and (3) of the policers #2 and #3 are converged to the expected value, but the passage amount of the packets of the policer #1 is suppressed more than necessary due to an unsuitable increase of the correction value, the average output rate (1) of the policer #1 falls below the expected value.

Accordingly, when the correction allow/disallow flags of other policers #2 and #3 of the same group are "0", the policer #1 may maintain the current correction value without using the newly calculated correction value. In this case, since the correction units 14a and 14b do not output the newly calculated correction value to the token management unit 12, the correction value within the token management table 20 is not changed.

Figure 23:
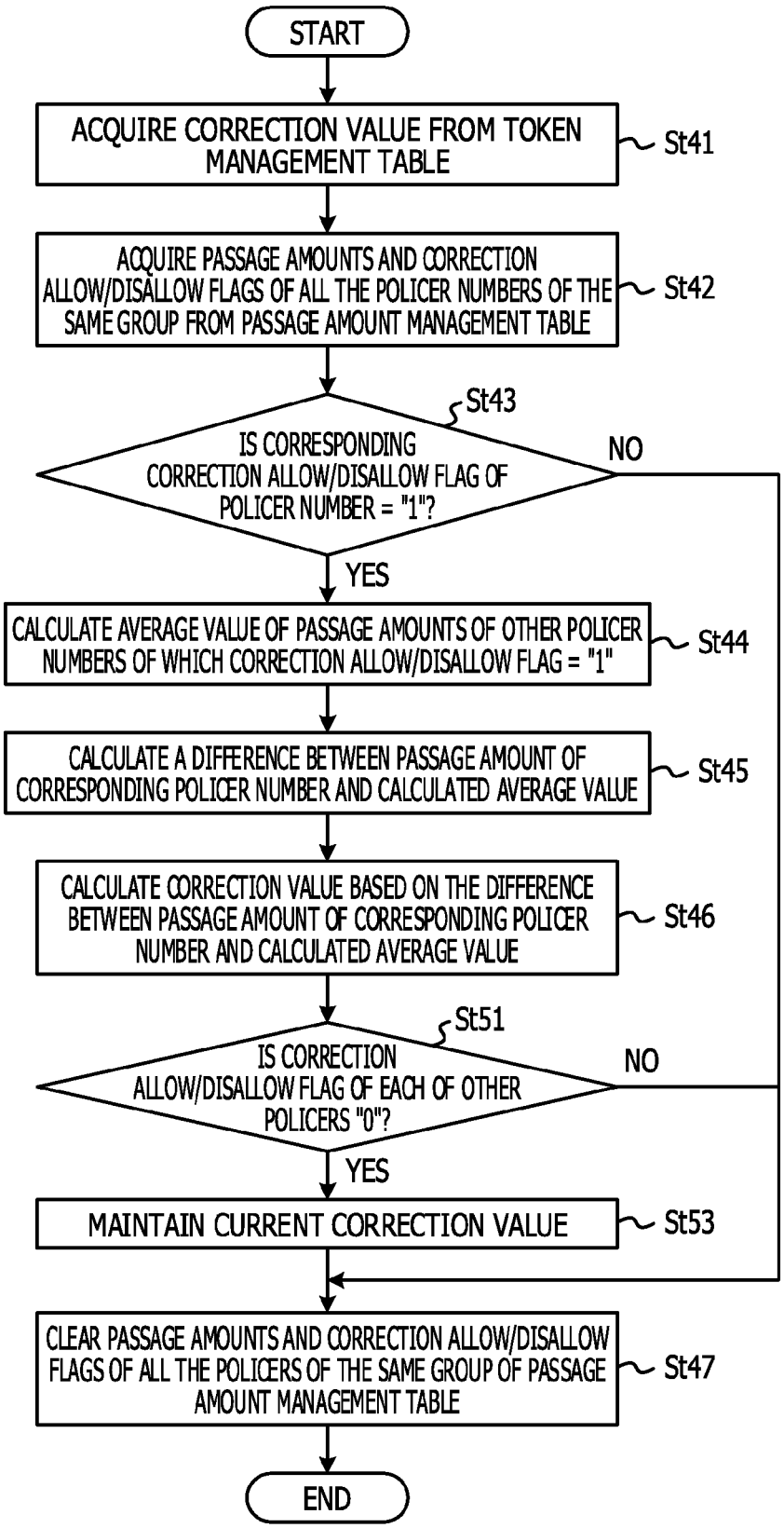
FIG. 23 is a flowchart illustrating another example of the correction value calculation processing.

FIG. 23 is a flowchart illustrating another example of the correction value calculation processing in the example described above. In the meantime, in FIG. 23, the same reference numerals are assigned to the processings thereof which are common to those of FIG. 17, and descriptions thereof will be omitted.

The correction units 14a and 14b determines whether the correction allow/disallow flag of each of other policers #j and #k that belong to the same group is "0" (Operation St51) after calculating a new correction value (Operation St46). When it is determined that the correction allow/disallow flag of each of other policers #j and #k is not "0" ("NO" at Operation St51), that is, any one of the correction allow/disallow flags of other policers #j and #k is "1", the correction units 14a and 14b clear the passage amount management table 21 (Operation St47), and ends the correction value calculation processing.

Further, when it is determined that the correction allow/disallow flag of each of other policers #j and #k is "0" ("YES" at Operation St51), the correction units 14a and 14b maintain the current correction value (Operation St53). As described above, when the token accumulation amount Tc is equal to or less than the threshold value or a value obtained by adding a predetermined value to the threshold value, the correction allow/disallow flag is updated with the value of "1" and otherwise, when the token accumulation amount Tc is greater than the threshold value or the value obtained by adding a predetermined value to the threshold value, the correction allow/disallow flag is updated with the value of "0". That is, when the token accumulation amount of each of policers #j and #k is greater than the threshold value or the value obtained by adding a predetermined value to the threshold value, the correction units 14a and 14b maintain the current correction value.

Next, the correction units 14a and 14b perform the Operation St47 and end the processing. In this manner, the correction value calculation processing is performed.

As described above, when the correction allow/disallow flags of other policers #j and #k are "0", the correction units 14a and 14b of the present example do not change the current correction value. Accordingly, as illustrated in FIGS. 22A and 22B, the output rate is prevented from being reduced in order to make the correction value increase consecutively.

Figure 24A:
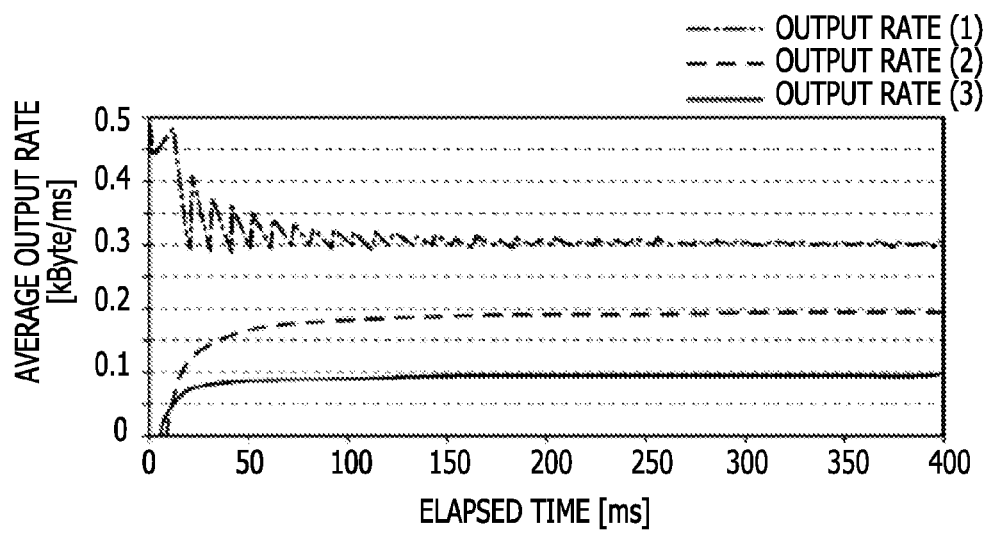
FIGS. 24A and 24B are graphs illustrating examples of improvements of the simulation results of the output rate and the correction value, respectively, in the case where only one policer within the same group performs the correction value calculation processing.
Figure 24B:
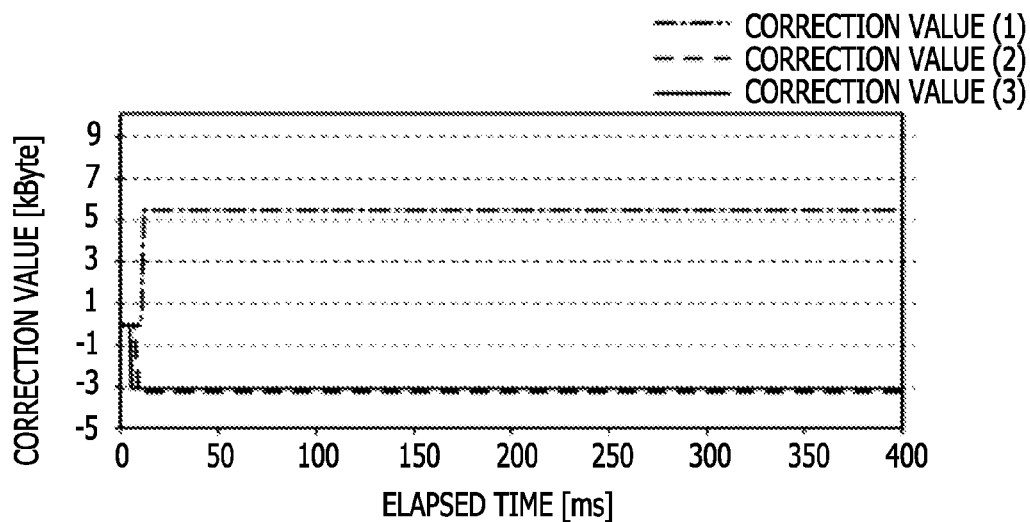

FIGS. 24A and 24B are graphs illustrating examples of improvements of the simulation results of the output rate and the correction value, respectively, in the case where only one policer within the same group performs the correction value calculation processing. The present simulation is performed for the correction value calculation processing under the same conditions as those in the examples of FIGS. 22A and 22B.

As illustrated in FIG. 24B, the correction value of the policer #1 is maintained in a predetermined value after approximately 12 ms has been elapsed from the start timing of simulation. Therefore, since the passage amount of the packet of the policer #1 is not suppressed more than necessary, the average output rate (1) is converged to the expected value of 0.3 Kbytes/ms as illustrated in FIG. 24B. In the meantime, the average output rates (2) and (3) of other policers #2 and #3 are also converged to the expected value.

Further, in the correction value calculation processing described above, in a case where the newly calculated correction value is less than the current correction value, since the correction is made in a direction in which the threshold value of the token is reduced, the passage amount of the packet increases. In the example of the policer #i illustrated in FIG. 8, in the case as described above, since the bottom (which equals to threshold value) of the token bucket 19a is lowered, the passage amount of the packet increases.

Accordingly, when the newly calculated correction value is less than the current correction value, the correction units 14a and 14b may correct the threshold value with the newly calculated correction value.

Figure 25:
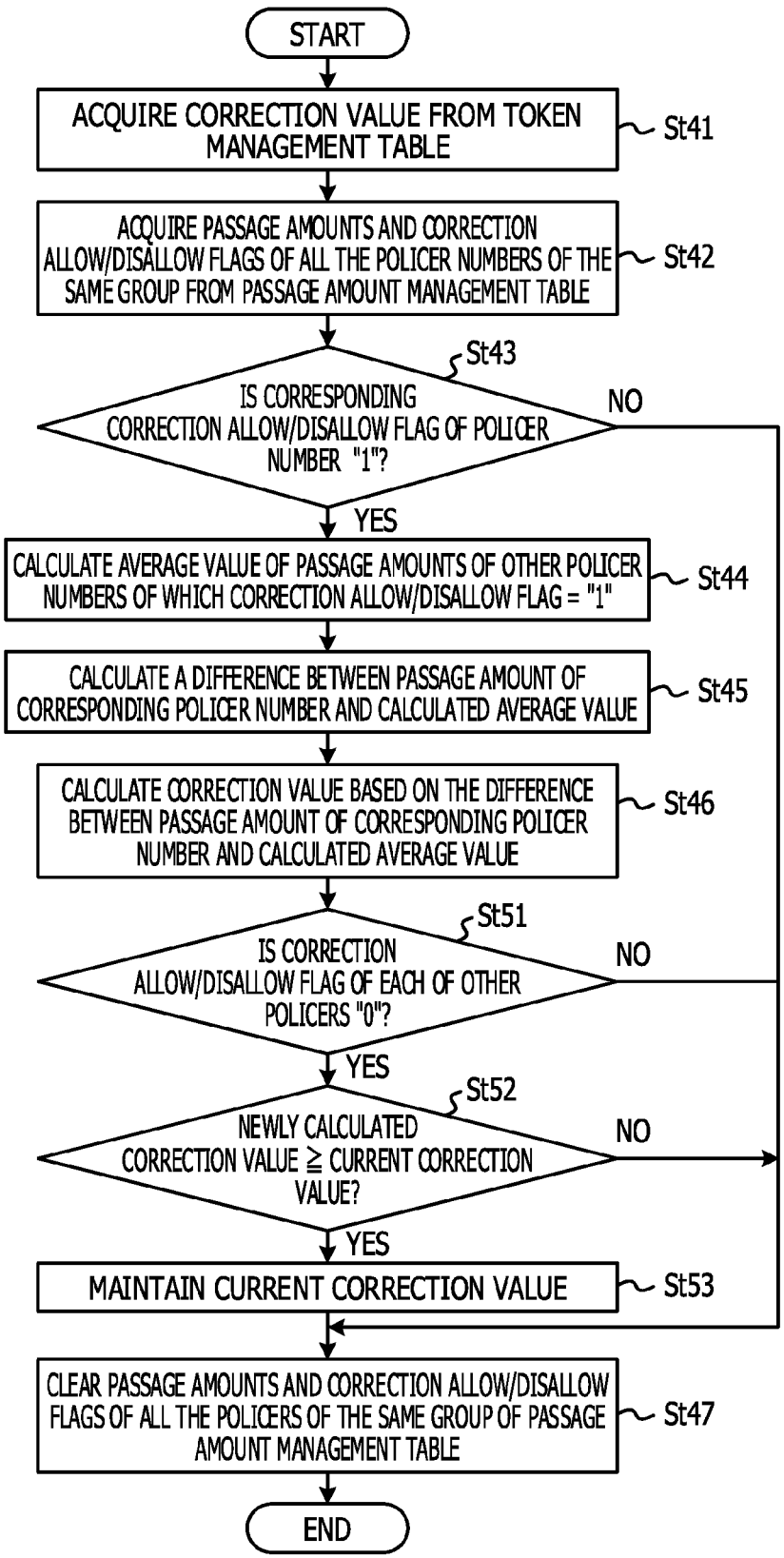
FIG. 25 is a flowchart illustrating another example of the correction value calculation processing.

FIG. 25 is a flowchart illustrating the correction value calculation processing in the example described above. In the meantime, in FIG. 25, the same reference numerals are assigned to the processings thereof which are common to those of FIGS. 17 and 23, and descriptions thereof will be omitted.

When it is determined that the correction allow/disallow flag of each of the policer numbers j and #k of the same group is "0" ("YES" at Operation St51), the correction units 14a and 14b compare the correction value which is newly calculated in Operation St46 with the current correction value (Operation St52). When it is determined that the newly calculated correction value is less than the current correction value ("NO" at Operation St52), the correction units 14a and 14b clear the passage amount management table 21 (Operation St47), and ends the correction value calculation processing. In this case, the newly calculated correction value is used for correcting the threshold value.

Further, when it is determined that the newly calculated correction value is equal to or greater than the current correction value ("YES" at Operation St52), the correction units 14a and 14b maintain the current correction value (Operation St53). That is, when the token accumulation amount of each of other policers j and #k is greater than the threshold value or the value obtained by adding a predetermined value to the threshold value and the newly calculated correction value is equal to or greater than the current correction value, the correction units 14a and 14b maintain the current correction value. In this case, the current correction value is used for correcting the threshold value.

Next, the correction units 14a and 14b performs the processing of Operation St47 and ends the processing. In this manner, the correction value calculation processing is performed. According to the present embodiment, the passage amount of packets is prevented from being suppressed more than necessary.

In the first embodiment described above, a target policer for calculating the correction value is determined based on the current correction allow/disallow flag, but the determination of the target policer is not limited thereto, and the target policer for calculating the correction value may be determined in consideration of the correction allow/disallow flag which is set in the previous time. Hereinafter, descriptions will be made on an example of the simulation result.

Figure 26:
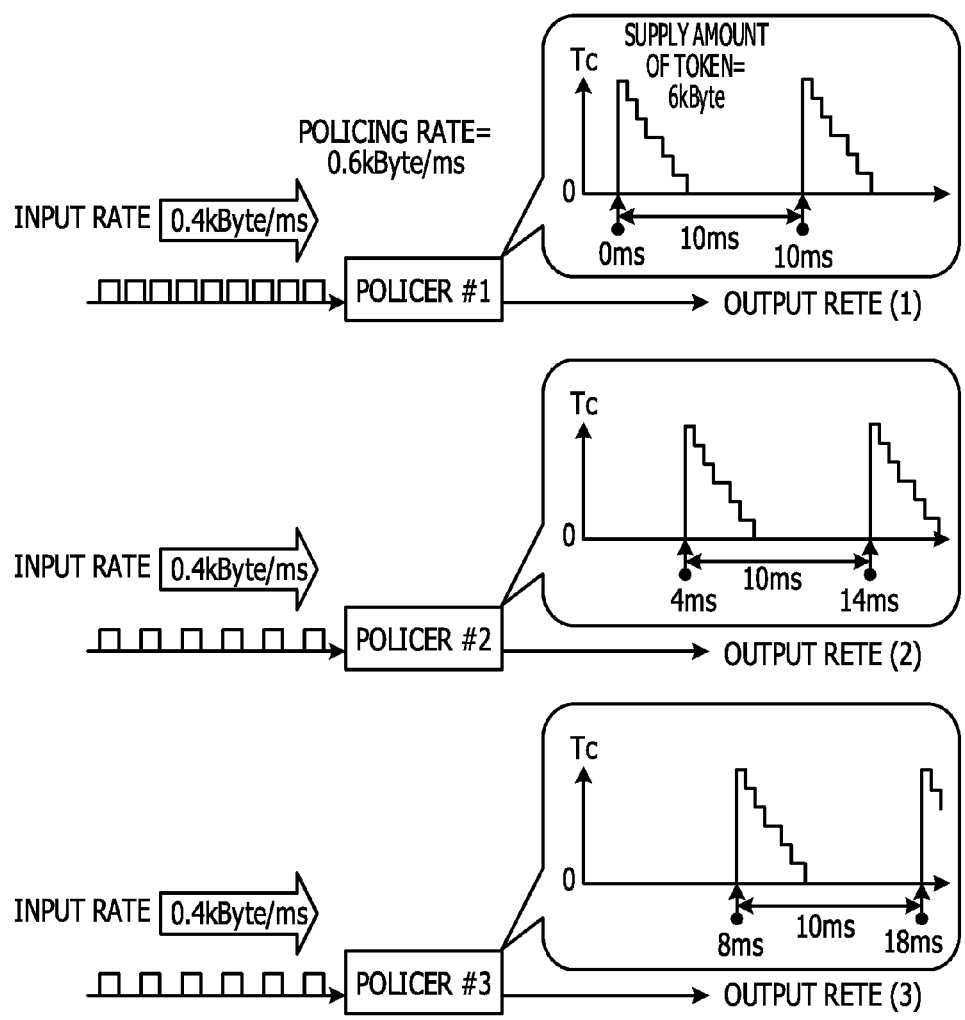
FIG. 26 is a diagram illustrating other conditions in the simulation of the bandwidth control unit.

In FIG. 26, conditions of the present simulation are illustrated. The token supply timings and the input rates of packets of the policers #1 to #3 of the conditions of the present simulation are different from those of the simulation of FIG. 19 described above when compared to the conditions of the simulation of FIG. 19 described above.

The token supply timing of the policer #1 is 10×n (ms), the token supply timing of the policer #2 is 4+10×n (ms), and the token supply timing of the policer #3 is 8+10×n (ms).

Further, the packets are input to each of the policers #1 to #3 at an input rate of 0.4 Kbytes/ms. That is, the packets with a bandwidth, which is equal to or greater than an average value of 0.2 Kbytes/ms (which equals to 0.6/3) of the policing rate of 0.6 Kbytes/ms, are input to each of the policer #1 to #3. Accordingly, in the present simulation, the average value of 0.2 Kbytes/ms becomes an expected value of the output rate of each of the policers #1 to #3.

Figure 27:
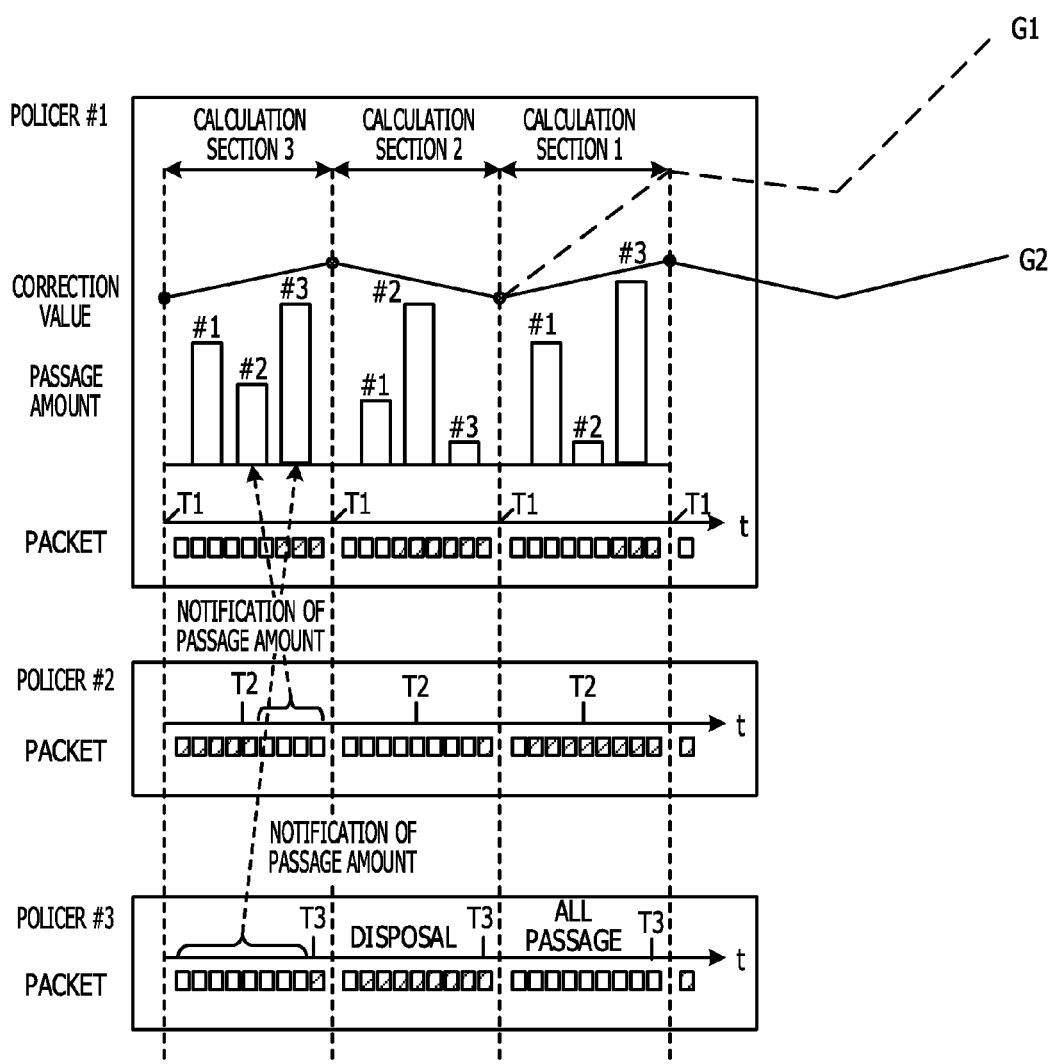
FIG. 27 is a graph illustrating a simulation result of a correction value.

FIG. 27 is a graph illustrating a simulation result of a correction value obtained under the simulation conditions described above. In FIG. 27, for each of the correction value calculation sections 1 to 3 of the policer #1, the change in the correction value of the policer #1, the passage amount of the packets of the policer #1, and the passage amounts notified from other policers #2 and #3 are illustrated.

The correction value calculation sections 1 to 3 each corresponds to a time period between the token supply timings T1 and T1 of the policer #1 in the time axis t, and the calculation section 1 is assumed as the current calculation section. In the meantime, T2 and T3 illustrate the token supply timings of other policers #2 and #3, respectively.

Further, in FIG. 27, the packets of the policer #1 to #3 that are allowed to pass through or discarded are illustrated along the time axis t. The hatched rectangular frames indicate the packets discarded by the policers #1 to #3 and the non-hatched rectangular frames indicate the packets which have passed through the policer #1 to #3.

While the passage amount of the packets of the policer #1 is almost the average value in each of the calculation sections 1 to 3, the passage amount of the packets of the policer #2 has a small quantity in the calculation sections 1 and 3, and has a large quantity in the calculation section 2. Further, the passage amount of the packets of the policer #3 has a large quantity in the calculation sections 1 and 3, and has a small quantity in the calculation section 2. When determining in terms of the average of the calculation sections, the output rates of all the policers #1 to #3 almost become the expected value, but since the calculation processings (token supply timings are T1 to T3) are performed in asynchronization with each other among the policers #1 to #3, when determining for each of the calculation processes 1 to 3, there is deviation in passage amount between the policer #2 and #3.

In the calculation section 3, the policer #3 allows all the packets to pass. That is, in the calculation section 3, the token accumulation amount Tc of the policer #3 exceeds the threshold value (correction value) and the correction allow/disallow flag of the policer #3 becomes "0". Therefore, the passage amount of the packets of the policer #3 is not used for calculating the correction value of the policer #1.

However, since the input rate of packet of the policer #3 exceeds the expected value of the output rate similarly as in other policers #1 and #2, in the case as described above, the correction value of the policer #1 increases largely (see dotted line) after the calculation section 3 as illustrated with a reference symbol G1 such that the passage amount of the packets is suppressed more than necessary.

Accordingly, the correction units 14a and 14b may take a policer for which the number of times in which the correction allow/disallow flags becomes "1" exceeds a predetermined number of times in several correction value calculations as a target policer for calculating correction value.

For example, when a policer of which the correction allow/disallow flag is "1" in any one of the current calculation section 3 and the previous calculation section 2 is taken as the target policer for calculating correction value, since the policer #3 discards almost all of the packets in the calculation section 2 and the correction allow/disallow flag is "1", the policer #3 becomes the target policer for calculating the correction value. Since the correction allow/disallow flag of the policer #2 is also "1" in the calculation section 3, the policer #2 becomes the target policer for calculating the correction value.

Accordingly, the policer #1 calculates the correction value using the passage amounts of the packets of the policers #2 and #3 in the calculation section 3. More specifically, the policer #1 calculates the correction value by calculating an average value of the passage amounts of the packets of the policers #2 and #3 and subtracting the average value from the passage amount of the packet of the first bandwidth control device.

In this case, since the correction value of the policer #1 is controlled to be fallen within a predetermined range (see solid line) after the calculation section 3 as illustrated with the reference symbol G2, the passage amount of packet is not suppressed more than necessary. In the meantime, in the present example, even when the policer of which the correction allow/disallow flag is "0" in two or more calculation sections among the calculation sections 1 to 3 is taken as a target for calculating the correction value, the correction value is controlled to be fallen within a predetermined range.

As described above, the correction units 14a and 14b determine the target for calculating the correction value based on the allow/disallow flags in the current correction value calculation and the several previous correction value calculations, that is, a plurality of calculation sections. Therefore, the correction allow/disallow flags in the plurality of calculation sections are stored in the passage amount management table 21.

In FIG. 28, the passage amount management table 21 of the present example is illustrated. A "policer number", a "policer number within a group", a "passage amount [Byte]", and a "correction allow/disallow flag" are registered in the passage amount management table 21. The "policer number", "policer number within a group", and "passage amount [Byte]" are the same as those described with reference to FIG. 10.

The value of the "correction allow/disallow flag" is registered for each of the plurality of calculation sections 1 to Z (Z is a positive integer). The calculation section 1 is the current calculation section and the calculation sections 2 to Z are the previous calculation sections among the plurality of calculation sections 1 to Z.

The correction units 14a and 14b refer to the correction allow/disallow flags of the calculation sections 1 to Z and take a policer of which the correction allow/disallow flag is "1" in at least L (L is a positive integer) calculation sections as a target policer for calculating the correction value. Further, when the correction value calculation processing is completed, the correction units 14a and 14b update the correction allow/disallow flag of each of the calculation sections 1 to Z. More specifically, the correction units 14a and 14b copy the respective values of the correction allow/disallow flags in the calculation sections 1 to Z−1 to the respective correction allow/disallow flags in the calculation sections 2 to Z. In the meantime, the correction allow/disallow flag of the calculation section 1 is set to "1" or "0" at the time of the update.

Figure 29:
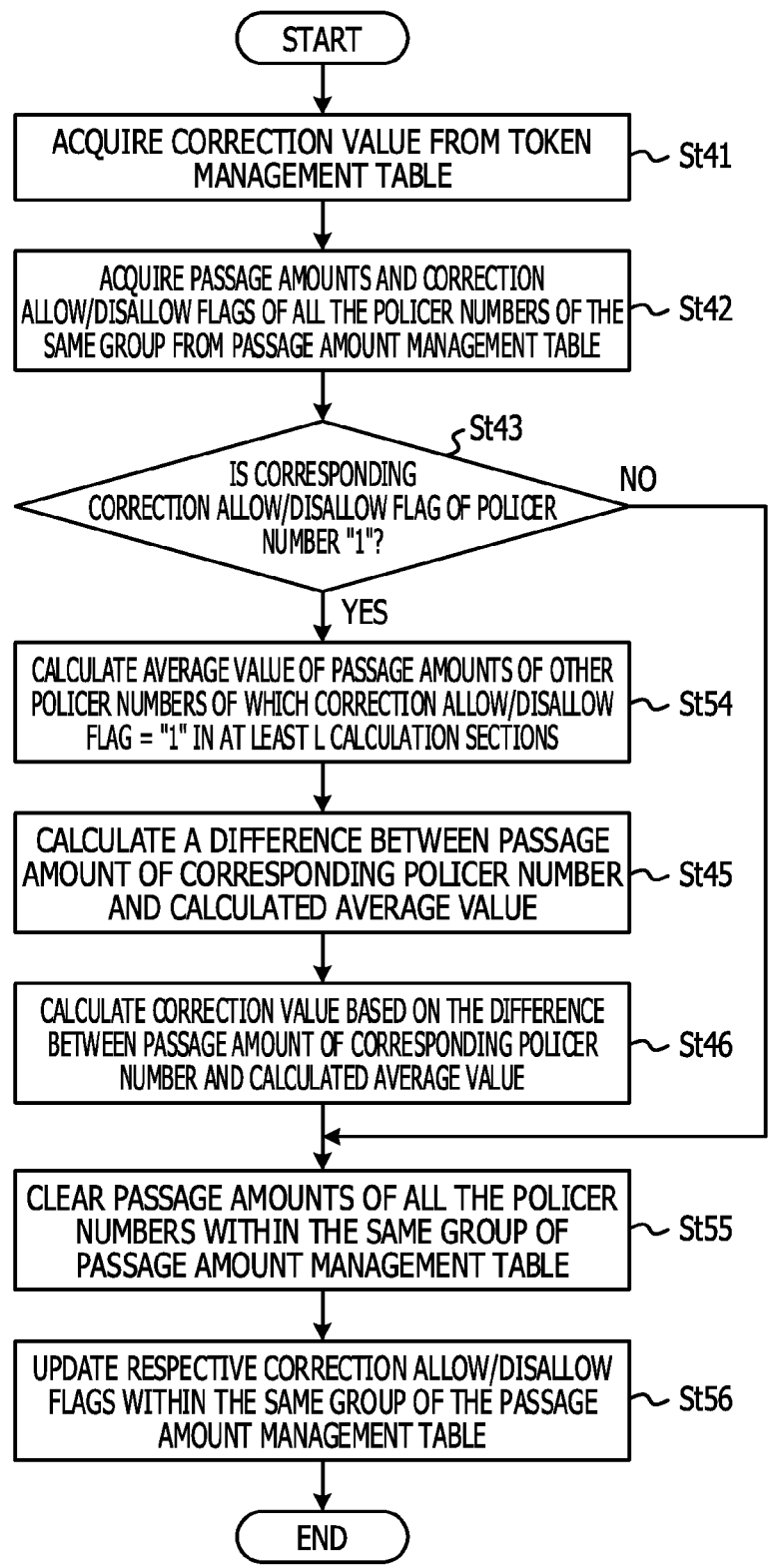
FIG. 29 is a flowchart illustrating another example of the correction value calculation processing.

FIG. 29 is a flowchart illustrating the correction value calculation processing of the present example. In the meantime, in FIG. 29, the same reference numerals are assigned to the processings thereof which are common to those of FIG. 17, and descriptions thereof will be omitted.

When it is determined that the correction allow/disallow flag of the policer number "i" is "1" ("YES" at Operation St43), the correction units 14a and 14b calculate an average value of the passage amounts of other policer numbers "j" and "k" of which the correction allow/disallow flag is "1" in at least L calculation sections (Operation St54). That is, the correction units 14a and 14b calculate an average value of the passage amounts of packets of other policers #j and #k for which the number of times in which the token accumulation amount Tc is equal to or less than the threshold value or a value obtained by adding a predetermined value to the threshold value in several correction value calculations exceeds L number of times.

The correction units 14a and 14b clear the passage amounts of all the policer numbers "i", "j" and "k" that belong to the same group of the passage amount management table 21 (Operation St55) after calculating the correction value based on the calculated average value (Operation St45, St46). Next, the correction units 14a and 14b update the correction allow/disallow flags of all the policer numbers "i" "j" and "k" that belong to the same group of the passage amount management table 21 (Operation St56), and ends the correction value calculation processing. In this manner, the correction value calculation processing is performed.

As described above, in the present embodiment, the correction units 14a and 14b determine whether the passage amount of the packets of other policers are to be used for calculating the correction value based on the correction allow/disallow flag in the plurality of calculation sections. Accordingly, an accuracy of determination of the target policer for calculating the correction value, that is, an accuracy of correction value calculation is improved such that the passage amount of the packets is prevented from being suppressed more than necessary.

Further, the correction units 14a and 14b may determine the policer of which the packet passage amount is greater than that of the first bandwidth control device as the target policer for calculating the correction value, among other policers that satisfy the conditions for the correction allow/disallow flag in the plurality of calculation sections. This is because the correction value of the first bandwidth control device is reduced due to the calculation of the average value such that the passage amount of the packets is increased in a case where the passage amount of the packets of each of other policers is greater than the passage amount of the packets of the first bandwidth control device. In an example of the policer #i illustrated in FIG. 8, in the case described above, since the bottom (which equals to threshold value) of the token bucket 19a is lowered, the passage amount of the packets is increased.

Figure 30:
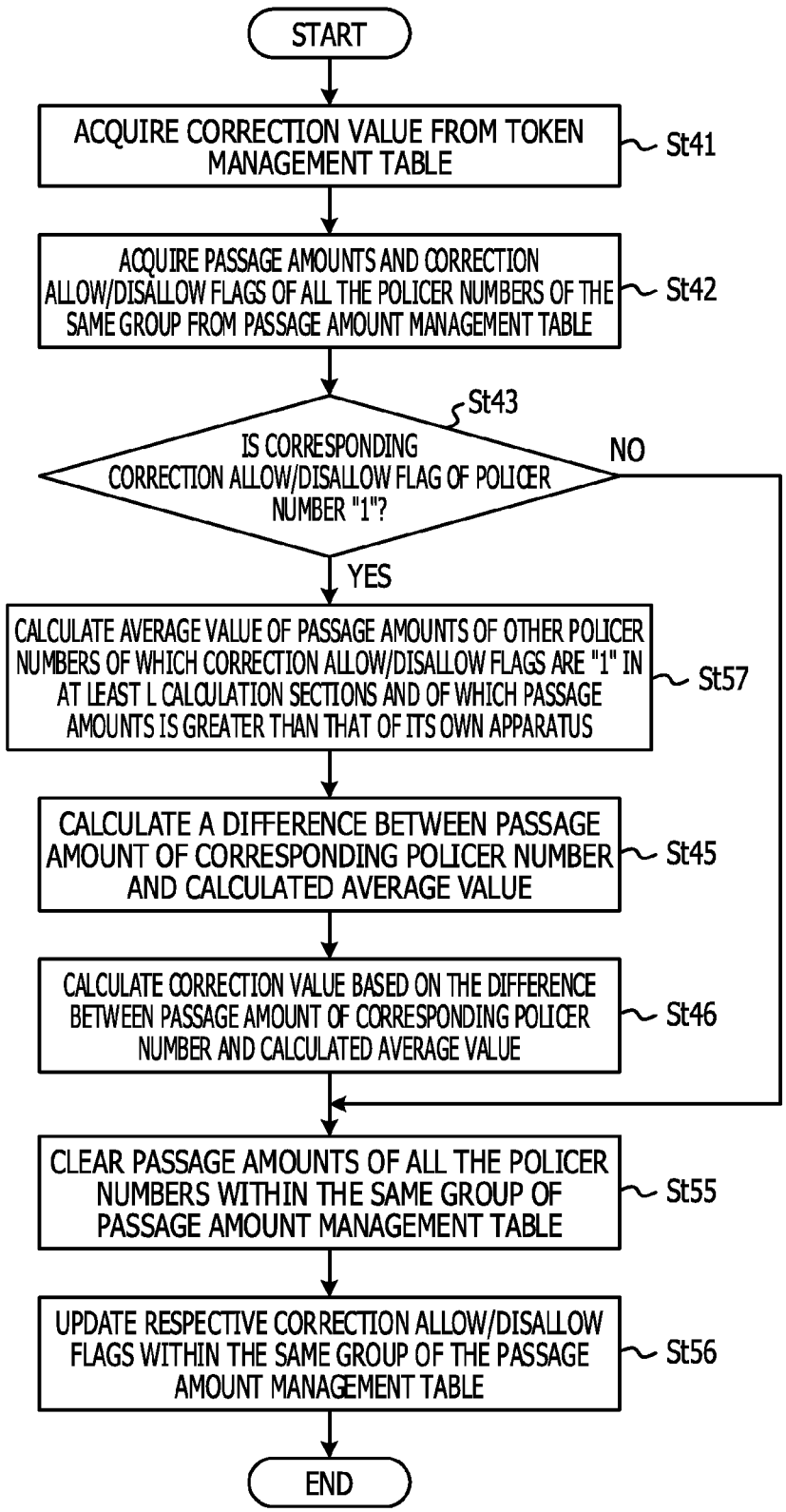
FIG. 30 is a flowchart illustrating still another example of the correction value calculation processing.

FIG. 30 is a flowchart illustrating the correction value calculation processing of the present example. In the meantime, in FIG. 30, the same reference numerals are assigned to the processings thereof which are common to those of FIGS. 17 and 29, and descriptions thereof will be omitted.

When it is determined that the correction allow/disallow flag of the policer number "i" is "1" ("YES" at Operation St43), the correction units 14a and 14b calculate an average value of the passage amounts of other policer numbers "j" and "k" of which the correction allow/disallow flags are "1" in at least L calculation sections and of which the passage amounts of packets is greater than that of the first bandwidth control device (Operation St57). That is, the correction units 14a and 14b calculate an average value of the passage amounts of packets of other policers #j and #k for which the number of times in which the token accumulation amount Tc is equal to or less than the threshold value or a value obtained by adding a predetermined value to the threshold value exceeds L number of times in several correction value calculations, and of which the passage amounts of packets are greater than that of the first bandwidth control device.

The correction units 14a and 14b clear the passage amounts of all the policer numbers "i", "j" and "k" that belong to the same group (Operation St55) and performs the update of the correction allow/disallow flag (Operation St56) after calculating the correction value based on the calculated average value (Operation St45, St46), and ends the processing. In this manner, the correction value calculation processing is performed. According to the present embodiment, since the policer of which the passage amount is greater than that of the first bandwidth control device is selected as the target for calculating the correction value, the correction value of the first bandwidth control device is decreased and thus the passage amount of packet is increased.

As described above, the bandwidth control device (policer #i) according to the present embodiment determines whether the packet is to be allowed to pass through based on a result of the comparison between the individual token accumulation amount Tc and the predetermined threshold value and belongs to a group of the bandwidth control devices (policers #i, #j, and #k) that allow the packet to pass or discards the packet according to the determination result.

The bandwidth control device includes the management unit (token management unit) 12 and the correction units 14a and 14b. The management unit 12 subtracts the permissible passage amount of the first bandwidth control device each time when the first bandwidth control device (policer #i) or one or more of other bandwidth control devices (policer #j and #k) among the plurality of bandwidth control devices allow the packet to pass. The correction units 14a and 14b correct the permissible passage amount of the first bandwidth control device or the threshold value of the first bandwidth control device based on the result of the comparison between the passage amount of packets of the first bandwidth control device and the passage amounts of packets of one or more other bandwidth control devices.

According to the configuration described above, it is determined whether the packet is to be allowed to pass through or not based on the result of the comparison between the permissible passage amount Tc which is subtracted each time when any one of the bandwidth control devices that belong to the same group allows the packet to pass and the threshold value. Therefore, it is possible to limit a total bandwidth of the packets inputted to the plurality of bandwidth control devices in its entirety.

Further, the correction units 14a and 14b correct the permissible passage amount Tc of the first bandwidth control device or the threshold value of the first bandwidth control device based on the result of the comparison between the passage amount of packets of the first bandwidth control device and the passage amounts of packets of other bandwidth control devices that belongs to the same group as that of the first bandwidth control device. Accordingly, when the passage amount of packets of the bandwidth control device is greater than that of other bandwidth control devices of the same group, the bandwidth control device becomes difficult to allow the packet to pass and otherwise, when the passage amount of packets of the bandwidth control device is less than those of other bandwidth control devices, the bandwidth control device becomes easy to allow the packet to pass.

Accordingly, the bandwidth control device according to the present embodiment may reduce the difference in pass bandwidth between the bandwidth control device and other bandwidth control devices of the same group.

Further, the bandwidth control method according to the present embodiment is a bandwidth control method in which a plurality of bandwidth control devices (policers #i, #j, and #k) that belong to the same group determine whether the packet is to be allowed to pass through or not based on the result of the comparison between the individual permissible passage amount (accumulation amount) Tc and the threshold value and allow the packet to pass or discards the packet according to the determination result. The bandwidth control method according to the present embodiment includes the following processes. Process (1): Subtracting the permissible passage amount of one bandwidth control device each time when one bandwidth control device (policer #i) or one or more of other bandwidth control devices (policers #j and #k) among the plurality of bandwidth control devices allow the packet to pass. Process (2): Correcting the permissible passage amount of one bandwidth control device or the threshold value of one bandwidth control device based on the result of the comparison between the passage amount of packets of one bandwidth control device and the passage amounts of packets of one or more other bandwidth control devices.

Since the bandwidth control method according to the present embodiment has the same configuration as that of the bandwidth control device described above, the effect described above is achieved.

Second Embodiment

As described above, in the first embodiment, the bandwidth control (hereinafter, referred to as the "passage amount equalizing control") is performed in such a way that the difference in pass bandwidth between the bandwidth control device and other bandwidth control devices of the same group, that is, the difference in the passage amount is reduced, but the bandwidth control is not limited thereto. The policers #i, #j, and #k may perform a bandwidth control (hereinafter, referred to as the "passage ratio equalizing control") in such a way that the difference of passage amount, which is a ratio of the output rate to the input rate of the packet (a ratio of a pass bandwidth to an input bandwidth), is reduced instead of the passage amount equalizing control.

In FIGS. 31A and 31B, examples of a passage amount equalizing control and a passage ratio equalizing control are illustrated, respectively. In the present example, the grouped policers #1 and #2 are equipped in the network interface cards (#1 and #2) 91, respectively. The policers #1 and #2 limit the pass bandwidth of the packet inputted to the network interface cards (#1 and #2) 91 to a policing rate of a total of 100 Gbps. Here, the input rates of the packets of the policers #1 and #2 are assumed as 100 Gbps and 50 Gbps, respectively.

The packets outputted from the policers #1 and #2 are input to the network interface card (#3) 91 of the output side through the switch card 92. The network interface card (#3) 91 transmits the packet to other apparatuses through a communication line of 100 GbE (Gigabit Ethernet).

As illustrated in FIG. 31A, in a case of the passage amount equalizing control, the policers #1 and #2 each equivalently outputs the packet to the switch card 92 at the output rate of 50 Gbps as an expected value. Accordingly, the packet is input to the network interface card (#3) 91 of the output side at the total input rate of 100 Gbps.

In the meantime, as illustrated in FIG. 31B, in a case of the passage ratio equalizing control, the output rates of the packets of the policers #1 and #2 are determined in such a way that the passage ratios of the packets becomes equivalent to each other. Therefore, the expected values of the output rates of the packets of the policers #1 and #2 become values each of which is obtained by allocating the policing rate according to the ratio of the input rate.

$$Sr=Pr\times(Nr/\Sigma Nr) \quad (5)$$

More specifically, when the input rate of each of policers #1 and #2 is assumed as Nr and the policing rate is assumed as Pr, the expected value Sr of the output rate of each of the policers #1 and #2 is calculated by Equation (5), where $\Sigma Nr$ is a total of the input rates of the policers #1 and #2.

Accordingly, the expected value of the output rate of the policer #1 becomes 100×100/(100+50)=66.6 Gbps and the expected value of the output rate of the policer #2 becomes 100×50/(100+50)=33.3 Gbps. In this case, the passage ratios of the respective policers #1 and #2 become 66.6(%). Accordingly, the packet is input to the network interface card (#3) 91 of the output side at a total input rate of approximately 100 Gbps.

In the case of the passage amount equalizing control, since the policer #2 may allow all the packets to pass, the discard amount of the packet is 0 (zero), but the policer #1 discards a predetermined amount of the packet which amounts to 50 Gbps. In the meantime, in the case of the passage ratio equalizing control, the policer #1 and the policer #2 discard the packets of 100-66.6=33.4 Gbps and the packets of 50-33.3=16.7 Gbps, respectively, according to the ratio of the input rate. Accordingly, according to the passage ratio equalizing control, it becomes possible to equally control the passage ratio of packets as well as the discard ratio of packets between the policers #1 and #2.

However, in the passage ratio equalizing control, as will be described below, when the token supply timings are not synchronized with each other between the plurality of policers within the same group, it is unable to guarantee equivalence between the policers and thus the difference in pass bandwidth occurs, similarly as in the passage amount equalizing control, which is problematic.

FIG. 32 is a graph illustrating an example of change in a token accumulation amount Tc in a case where the token supply timings are synchronized with each other between the policers #1 and #2. In FIG. 32, the horizontal axis indicates time t and the vertical axis indicates the token accumulation amount Tc. In the meantime, in the present example, the update of the token accumulation amount Tc due to passing through of the packet in each of the policers #1 and #2 is performed with one time at each of the token supply timings T1 and T2.

Since the token supply timings T1 and T2 of the policers #1 and #2 are synchronized with each other, the token accumulation amounts Tc of the policers #1 and #2 changes in the same fashion. Since Tc is greater than the threshold value (i.e., Tc>0) in the first two calculation sections, the policers #1 and #2 allow the packet to pass, and since Tc is equal to or less than 0 (zero) (i.e., Tc≤0) in the last calculation section, the policers #1 and #2 discard the packet. Therefore, as a result, the passage ratio of each of the policers #1 and #2 becomes 66.6(%), which is equivalent to each other.

FIG. 33 is a graph illustrating the example of change in the token accumulation amount in a case where the token supply timings T1 and T2 are not synchronized with each other between the policers #1 and #2. Since the token supply timing T1 of the policer #1 precedes the token supply timing T2 of the policer #2, the policer #1 may consume the token prior to the policer #2 to allow the packet to pass. That is, since accumulation amount is larger than 0 (zero) (threshold value) in all the calculation sections for the policer #1, the policer #1 may allow the packet to pass.

In the meantime, regarding the policer #2, since the accumulation amount is greater than 0 (zero) (threshold value) in the first calculation section, the policer #2 allows the packet to pass, but since the policer #2 consumes more tokens than the policer #1 in the last two calculation sections and thus accumulation amount becomes equal to or less than 0 (zero), the policer #2 discards the packet. Accordingly, the passage ratios of the policers #1 and #2 becomes unequivalent.

As described above, in the passage ratio equalizing control, when the token supply timings are not synchronized between the policers #1 and #2 within the same group, the difference in the passage ratios occurs between the policers #1 and #2. When the token supply timings T1 and T2 are synchronized with each other between the plurality of policers #1 and #2, as described above, since the control of the communication apparatus becomes complicated in its entirety and another problem of an increase of hardware or software scale or increase of costs occurs.

In this regard, in the following second embodiment, the policer corrects the threshold value of the first bandwidth control device based on the result of the comparison between the ratio of the passage amount to the input amount of packets of the first bandwidth control device and the ratio of the passage amounts to the input amounts of packets of other policers. That is, the policer compares the passage ratio of the first bandwidth control device and the passage ratios of other policers and corrects the bottom of the token bucket based on the comparison result.

Figure 34:
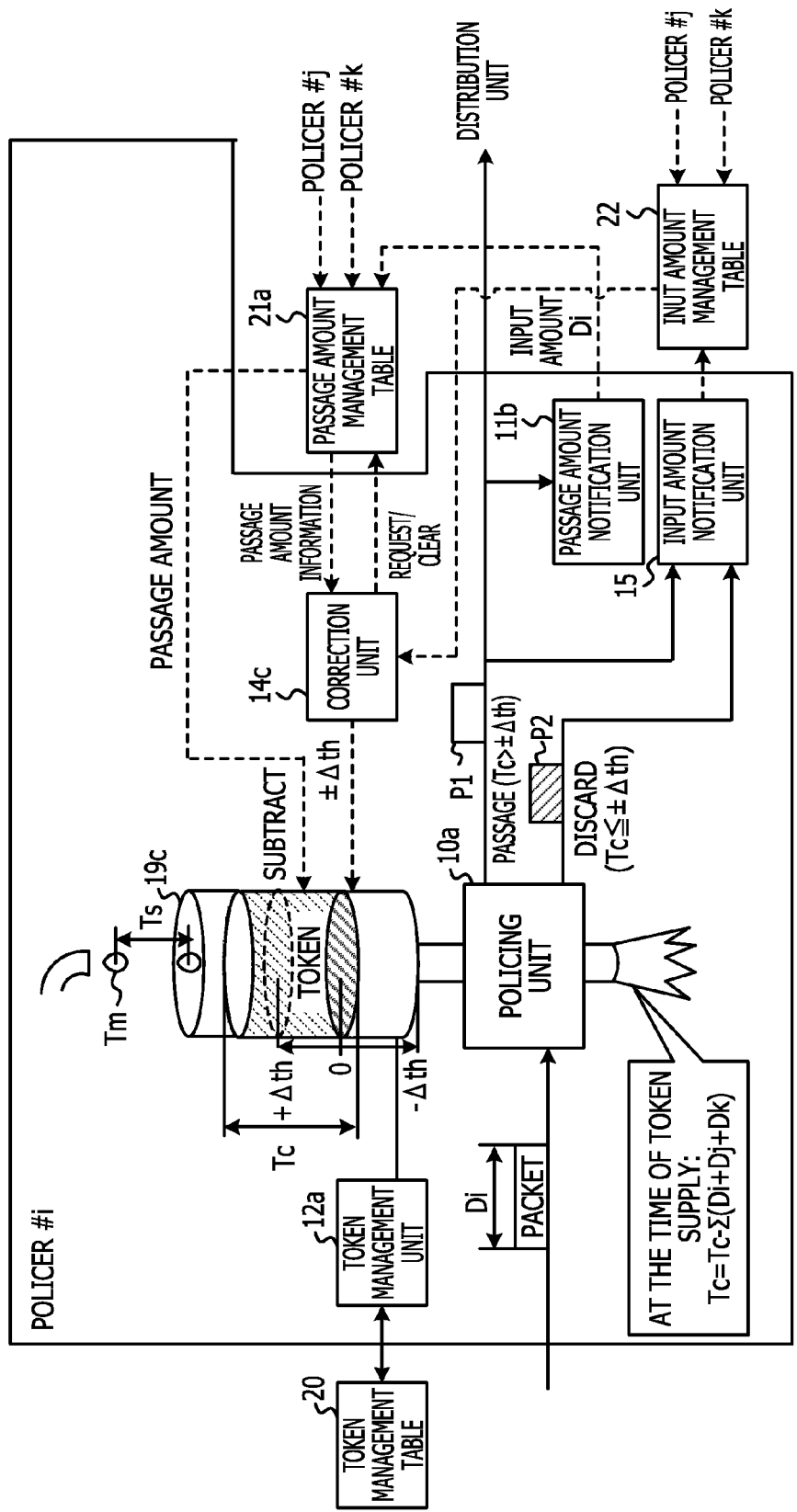
FIG. 34 is a block diagram illustrating a configuration of a second embodiment of the bandwidth control unit which controls a passage ratio.

FIG. 34 is a block diagram illustrating a second embodiment of the bandwidth control unit 81 which controls a passage ratio. In FIG. 34, the same reference numerals are assigned to the constitutional elements which are common to those of FIG. 8, and descriptions thereof will be omitted. In the meantime, in FIG. 34, only the configuration of the policer #i among the policers #i, #j, and #k within the same group is illustrated, but other policers #j and #k also have the same configuration. The policers #i, #j, and #k are equipped in a common network interface card 91 or individual network interface cards 91.

The policer #i determines whether the packet is to be allowed to pass through based on the result of the comparison between the token accumulation amount Tc and the threshold value, and allows the packet to pass or discards the packet based on the determination result. The policer #i includes the policing unit 10a, the passage amount notification unit 11b, the token management unit (management unit) 12a functioning as a token bucket 19c, and a correction unit 14c, and, an input amount notification unit 15.

The token management unit 12a manages the token accumulation amount Tc using the token management table 20 stored in the storage unit 915. When the token supply timing Ti arrives, the token management unit 12a acquires the accumulation amount Tc and the supply amount Tm from the token management table 20 and adds the supply amount Tm to accumulation amount Tc to update the accumulation amount Tc within the token management table 20. The time interval Ts at which the token is supplied is common between the policers #i, #j, and #k within the same group, but the token supply timings are not synchronized between the policers #i, #j, and #k within the same group.

Further, the token management unit 12 acquires the passage amount of packets of each of the policers #i, #j, and #k from the passage amount management table 21a stored in the storage unit 915 at the token supply timing and subtracts the passage amount of packets from the accumulation amount Tc of the token management table 20. That is, the token management unit 12a subtracts a total of the lengths Di, Dj and Dk of the packets which is allowed to pass through by each of the policers #i, #j, and #k from the accumulation amount Tc of the token management table 20. Accordingly, the accumulation amount Tc within the token management table 20 is updated by being synchronized with the token supply timing.

Further, the passage amount notification unit 11b detects the length Di of the packet P1 which has passed through and notifies the length Di to the passage amount management table 21a. The passage amount notification unit 11b of each of other policers #j and #k also detects the lengths Dj and Dk of the packet P1 which has passed through and notifies the lengths Dj and Dk to the passage amount management table 21a. The notified lengths Di, Dj and Dk of the packet P1 are added to the passage amount of the corresponding policer number within the passage amount management table 21a.

In FIG. 35A, an example of the passage amount management table 21a is illustrated. In the passage amount management table 21a, a "policer number", a "policer number within a group", and a "passage amount [Byte]" are registered.

The "policer number", the "policer number within a group", and the "passage amount [Byte]" are the same as those described with reference to FIG. 10. In FIG. 35A, examples of the passage amounts of the policers #1 and #2 and #N that are grouped are illustrated. In the meantime, the passage amount management table 21a is shared between the plurality of policers #1 to #M.

The input amount notification unit 15 detects the length Di of the packet P1 which has passed through and a length of the packet P2 which is discarded and notifies the length Di of the packet P1 and the length of the packet P2 to the input amount management table 22 stored in the storage unit 915. The input amount notification unit 15 of each of other policers #j and #k also detects the lengths Dj and Dk of the packet P1 which has passed through and a length of the packet P2 which is discarded and notifies the lengths Dj and Dk of the packet P1 and the length of the packet P2 to the input amount management table 22. The notified lengths Di, Dj and Dk of the packets P1 and P2 are added to the input amount of the corresponding policer number within the input amount management table 22.

In FIG. 35B, an example of the input amount management table 22 is illustrated. In the input amount management table 22, a "policer number", a "policer number within a group", and an "input amount [Byte]" is registered. The contents of the "policer number" and the "policer number within a group" are the same as those of the "policer number" and the "policer number within a group" of the passage amount management table 21a.

The "input amount [Byte]" indicates a total length (a data amount) of the packets inputted to each policer indicated by the policer number within a group within a predetermined time period (a correction value calculation section). For example, the passage amounts of packets of the policers #1, #2 and #N cumulatively summed up within a predetermined time period by the policer #1 are 25000 bytes, 30000 bytes, and 13000 bytes, respectively.

The "input amount [Byte]" is obtained by adding the passage amount and the discard amount of the packet notified from the input amount notification unit 15. The addition of the passage amount and the discard amount of the packet may be performed in any one of the input amount notification unit 15 and the input amount management table 22. In the meantime, the "input amount [Byte]" of the input amount management table 22 is shared between the plurality of policers #1 to #M. Further, the "input amount [Byte]" of the input amount management table 22 is cleared to 0 byte by the correction unit 14c at the time when the token supply timing of the policers #1 to #M arrives.

The correction unit 14c corrects the threshold value of the token bucket 19c of the policer #i based on the result of the comparison between the ratio of the passage amount to the input amount of packets of the policer #i and the ratio of the passage amounts to the input amounts of packets of other policers #j and #k that belong to the same group. That is, the correction unit 14c corrects the threshold value of the token bucket 19c of the policer #i based on the result of the comparison between the passage ratio of the packet of the policer #i and the passage ratios of other policers #j and #k that belong to the same group.

Accordingly, when the passage ratio of packets of the policer #i is greater than that of each of other policers #j and #k of the same group, the policer #i becomes difficult to allow the packet to pass and otherwise, when the passage ratio of packets of the policer #i is less than that of each of other policers #j and #k, the policer #i becomes easy to allow the packet to pass. Accordingly, the passage ratio of the packet of the policer #i is controlled to be equal to the passage ratio of each of other policers #j and #k.

More specifically, the correction unit 14c acquires the passage amount of packets and input amount of each of the policers #i, #j, and #k of the same group from the passage amount management table 21a and the input amount management table 22, respectively, at the time when the token supply timing of the policer #i arrives. The correction unit 14c compares the passage ratios between the policers based on the acquired passage amount and input amount.

$$(NP(i)+\alpha)/NI(i)=(\Sigma NP(s)-\alpha)/\Sigma NI(s) \qquad (6)$$

Since the passage ratio is equal to a value obtained by dividing the passage amount by the input amount (passage ratio=passage amount/input amount), the correction unit 14c calculates, for example, the variable $\alpha$ which satisfies Equation (6) so as to make the passage ratio of the policer #i equal to those of other policers #j and #k. Here, the terms NP(i) and NI(i) correspond to the passage amount and input amount of packets of the policer #i, respectively, and the terms $\Sigma NP(s)$ and $\Sigma NI(s)$ correspond to the total passage amount and total input amount of packets of other policers #j and #k, respectively.

$$\alpha=(NI(i)\times\Sigma NP(s-NP(i)\times\Sigma NI(s)/(NI(i)-\Sigma NI(s)) \qquad (7)$$

The variable $\alpha$ is calculated by Equation (7) based on Equation (6). When the variable $\alpha$ is greater than 0 (that is, $\alpha>0$) (positive value), since the passage ratio of the policer #i becomes less than the average value of the passage ratios of other policers #j and #k, the correction unit 14c lowers the bottom (which equals to threshold value) of the token bucket 19c to increase the passage ratio. In the meantime, when the variable α is less than 0 (that is, α<0) (negative value), since the passage ratio of the policer #i becomes greater than the average value of the passage ratios of other policers #j and #k, the correction unit 14c raises the bottom (which equals to threshold value) of the token bucket 19c to decrease the passage ratio. Hereinafter, descriptions will be made using numerical values for the passage amount, input amount and passage ratio.

In FIGS. 36A and 36B, examples of the calculated passage ratio before and after the correction of the threshold value are illustrated, respectively. In the case before the correction, when the passage amount NP(i) and input amount NI(i) of packets of the policer #i are assumed as 10000 bytes and 20000 bytes, respectively, the passage ratio of the policer #i is 50(%) (which equals to 10000/20000× 100).

Further, when the total passage amount of packets ΣNP(s) and the total input amount of other policers #j and #k are assumed as 6000 bytes and 10000 bytes, respectively, an average value of the passage ratios of other policers #j and #k is 60% (which equals to 6000/10000×100).

According to the conditions described above, a value of the variable α calculated from Equation (7) is "667". Accordingly, as illustrated in FIG. 36B, the correction unit 14c lowers the threshold value of the token bucket 19c to increase the passage amount of packets of the policer #i by "667" and decrease the total the passage amount of packets of other policers #j and #k by "667". Accordingly, an average value of the passage ratio of the policer #i and the passage ratios of other policers #j and #k are averaged to 53.3%.

$$\pm \Delta th = \pm \Delta th(\text{pre}) - \alpha \qquad (8)$$

The correction unit 14c calculates the correction value (±Δth) according to, for example, Equation (8). That is, the correction unit 14c calculates a new correction value by subtracting the variable α from the previous correction value (±Δth(pre)) acquired from the token management table 20.

As described above, the correction unit 14c calculates the correction value of the threshold value using the correction value calculated at the previous time. Therefore, the correction unit 14a may calculate a suitable correction value based on the passage amount and the input amount cumulatively summed up over a long time period using the correction value calculated at the previous time in the calculation processing performed at the time sections after a certain section for the calculation processing even in a case where the suitable correction value is unable to be calculated within a single time section of the calculation process alone (i.e., the time interval Ts of FIG. 11).

Further, the correction unit 14c calculates the correction value of the threshold value based on the condition (Equation 7) that the ratio of the passage amount NP(i) to the input amount NI(i) of packets of the policer #i is made equal to the ratio of the total passage amount ΣNP(s) to the total input amount ΣNI(s) of other policers #j and #k. Therefore, the correction unit 14c may calculate the correction value which makes the passage ratio of the policer #i equal to each of other policers #j and #k with a high precision.

Further, according to Equation (7), the correction unit 14c calculates the variable α using the passage amount NP(i) and the input amount NI(i) of packets of the policer #i and the total passage amount ΣNP(s) and the total input amount ΣNI(s) of other policers #j and #k. Therefore, the total passage amount and the total input amount of other policers #j and #k may be registered in the passage amount management table 21a and the input amount management table 22, respectively, instead of an individual passage amount and individual input amount of other policers #j and #k.

In FIGS. 37A and 37B, other examples of the passage amount management table 21a and the input amount management table 22 are illustrated, respectively. In the passage amount management table 21a of the present example, the passage amount of the corresponding policer and the total passage amount of other policers that belong to the same group are registered for each policer number.

For example, regarding the policer number "1", the passage amount of 10000 bytes of the policer #1 and the total passage amount of 15000 bytes of other policers #2 and #N of the same group are registered in the passage amount management table 21a. In contrast, in the passage amount management table 21a illustrated in FIG. 35A, regarding the policer number "1", the passage amount of 10000 bytes of the policer #1, the passage amount of 10000 bytes of the policer #2, and the passage amount of 5000 bytes of the policer #N are individually registered.

Further, in the input amount management table 22 of the present example, the input amount of the corresponding and the total input amount of other policers that belong to the same group are registered for each policer number.

For example, regarding the policer number "1", the input amount of 25000 bytes of the policer #1 and the total passage amount of 43000 bytes of other policers #2 and #N of the same group are registered in the input amount management table 22. In contrast, in the input amount management table 22 illustrated in FIG. 35B, regarding the policer number "1", the input amount of 25000 bytes of the policer #1, the input amount of 30000 bytes of the policer #2, and the input amount of 13000 bytes of the policer #N are individually registered.

As described above, the total passage amount and the total input amount of other policers #j and #k are registered in the passage amount management table 21a and the input amount management table 22, respectively, such that the amount of information to be registered in the passage amount management table 21a and the input amount management table 22 is reduced.

Next, descriptions will be made on respective processings in the bandwidth control method of the second embodiment illustrated in FIG. 34.

Figure 38:
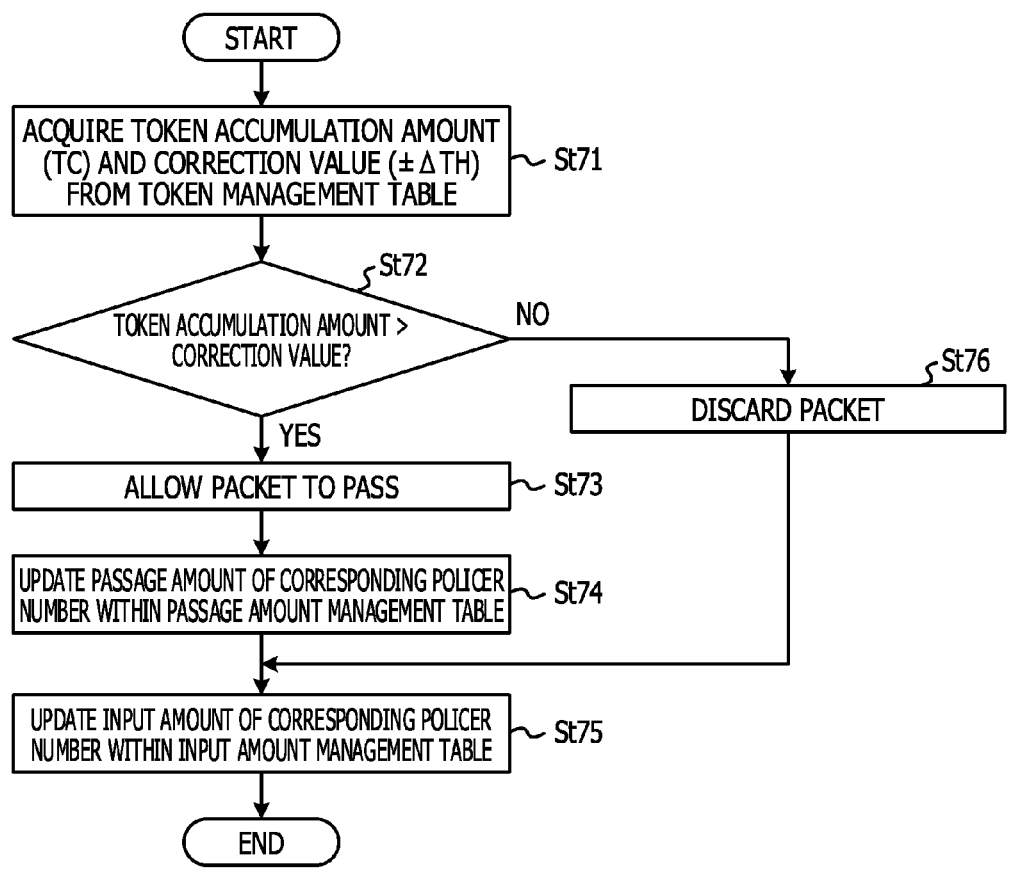
FIG. 38 is a flowchart illustrating another example of the packet processing.

FIG. 38 is a flowchart illustrating another example of the packet processing. The policing unit 10a acquires the token accumulation amount Tc and correction value (±Δth) from the token management table 20 (Operation St71).

Next, the policing unit 10a compares the token accumulation amount Tc with the correction value (which equals to the threshold value after the correction) (Operation St72). When it is determined that the token accumulation amount Tc is greater than the correction value ("YES" at Operation St72), the policing unit 10a allows the inputted packet to pass (Operation St73).

Next, the passage amount notification unit 11b detects the length Di of the packet which has been allowed to pass through and adds the length Di to the passage amount of the policer #1 within the passage amount management table 21a to update the passage amount (Operation St74). Next, the input amount notification unit 15 detects the length Di of the packet which has been allowed to pass through and adds the length Di to the input amount of the policer #1 within the input amount management table 22 to update the input amount (Operation St75). Thereafter, the packet processing is ended.

In the meantime, when it is determined that the token accumulation amount Tc is equal to or less than the correction value ("NO" at Operation St72), the policing unit 10a discards the packet (Operation St76). Next, the input amount notification unit 15 detects the length of the discarded packet and adds the length to the input amount of the policer #1 within the input amount management table 22a to update the input amount (Operation St75). Thereafter, the packet processing is ended. In this manner, the packet processing is performed.

Figure 39:
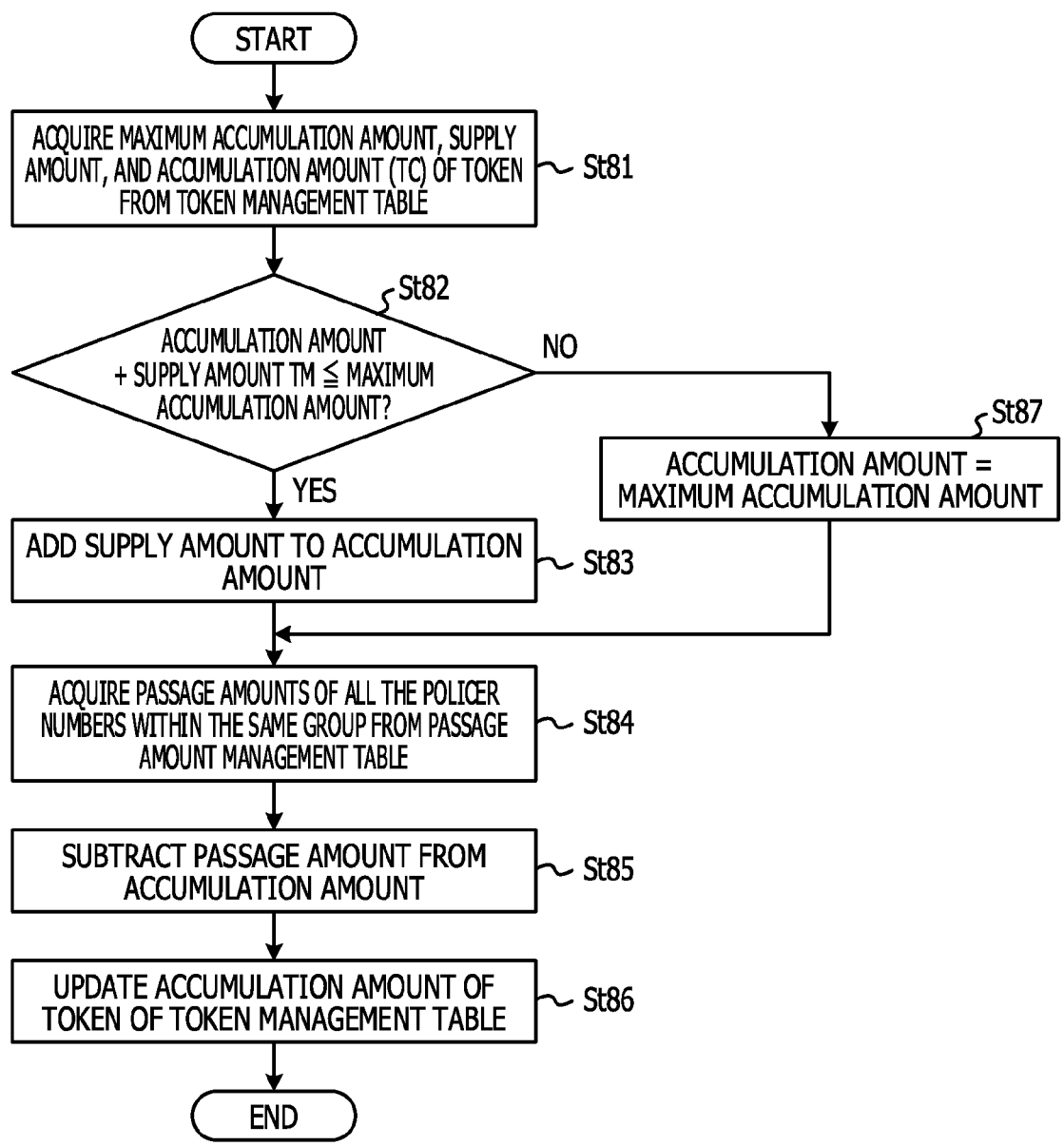
FIG. 39 is a flowchart illustrating another example of the token supply processing.

FIG. 39 is a flowchart illustrating another example of the token supply processing. When the token supply timing Ti arrives, the token management unit 12a acquires the maximum accumulation amount, the supply amount Tm, and the accumulation amount Tc of the policer number "i" from the token management table 20 (Operation St81). In the meantime, the token management unit 12a detects the token supply timing Ti using, for example, a built-in timer.

Next, the token management unit 12a determines whether a total of the accumulation amount Tc and the supply amount Tm is equal to or less than the maximum accumulation amount (Operation St82). When it is determined that the total of the accumulation amount Tc and the supply amount Tm is equal to or less than the maximum accumulation amount ("YES" at Operation St82), the token management unit 12 adds the supply amount to the accumulation amount Tc (Operation St83). Further, when it is determined that the total of the accumulation amount Tc and the supply amount Tm is greater than the maximum accumulation amount ("NO" at Operation St82), the token management unit 12 sets the accumulation amount Tc as the maximum supply amount (Operation St 87).

Next, the token management unit 12a acquires the passage amounts of all the policer numbers "i", "j" and "k" within the same group from the passage amount management table 21a (Operation St84). Next, the token management unit 12a subtracts the acquired passage amount of each of policers #i, #j, and #k from the accumulation amount Tc (Operation St85). Next, the token management unit 12a updates the accumulation amount Tc of the token management table 20 (Operation St86), and ends the token supply processing. In this manner, the token supply processing is performed.

As described above, in the present embodiment, since the total passage amount of the policer #i and other policers #j and #k is subtracted from the token accumulation amount Tc in synchronization with the token supply timing, the bandwidth control is readily performed. In the meantime, rather than subtracting the total passage amount in synchronization with the token supply timing, the token management unit 12a may subtract the length of the packet from the accumulation amount Tc at the time when the policer #i has allowed the packet to pass or the passage information is received from other policers #j and #k similarly as in the first embodiment illustrated in FIG. 8.

Figure 40:
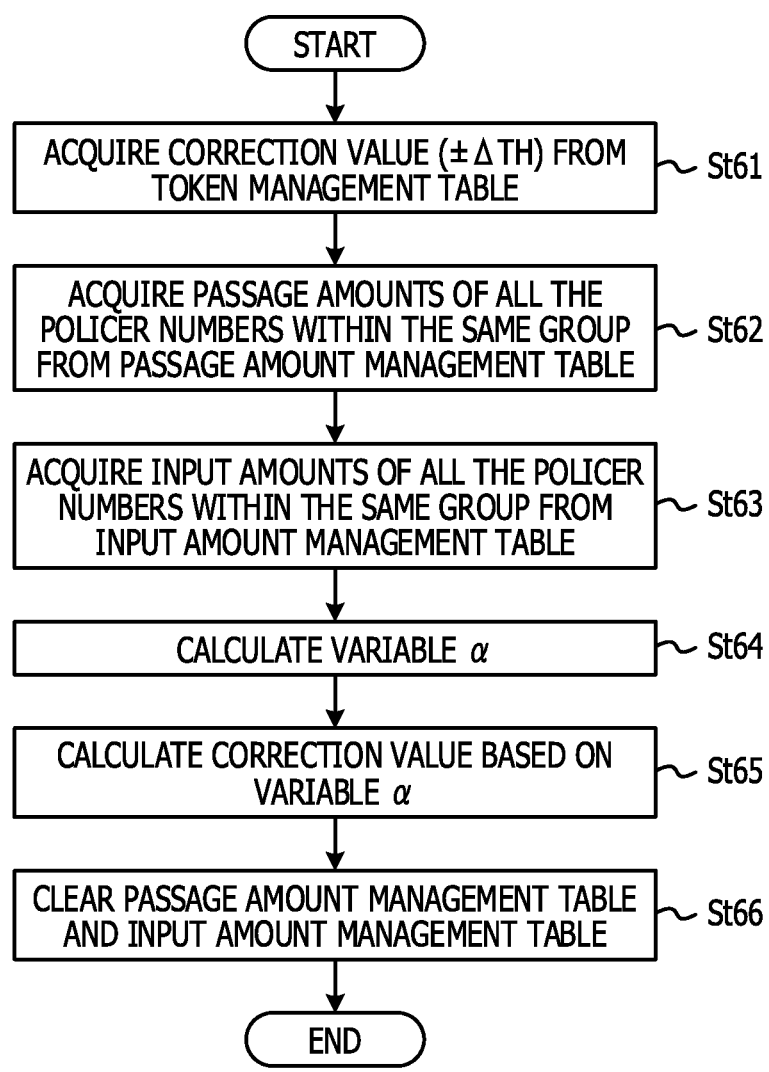
FIG. 40 is a flowchart illustrating still yet another example of the correction value calculation processing.

FIG. 40 is a flowchart illustrating another example of the correction value calculation processing. The correction value calculation processing is performed after the token supply processing.

The correction unit 14c acquires the correction value (±Δth) of the policer number "i" from the token management table 20 (Operation St61). Next, the correction unit 14c acquires the passage amounts of all the policer numbers "i", "j" and "k" within the same group from the passage amount management table 21a (Operation St62). Next, the correction unit 14c acquires the input amounts of all the policer numbers "i", "j" and "k" within the same group from the input amount management table 22 (Operation St63).

Next, the correction unit 14c calculates the variable α from Equation (7) (Operation St64). Next, the correction unit 14c calculates the correction value using the variable α from Equation (8) (Operation St65).

Next, the correction unit 14c clears the passage amounts of all the policer numbers "i", "j" and "k" within the passage amount management table 21a and the input amounts of all the policer numbers "i", "j" and "k" within the input amount management table 22 to 0 (zero), respectively (Operation St66), and ends the correction value calculation processing. In this manner, the correction value calculation processing is performed.

In the present embodiment, the correction unit 14c calculates the variable α from the input amount and passage amount of the packet based on Equation (7), but is not limited thereto, the variable α may be calculated from the discard amount and passage amount of the packet.

Figure 41:
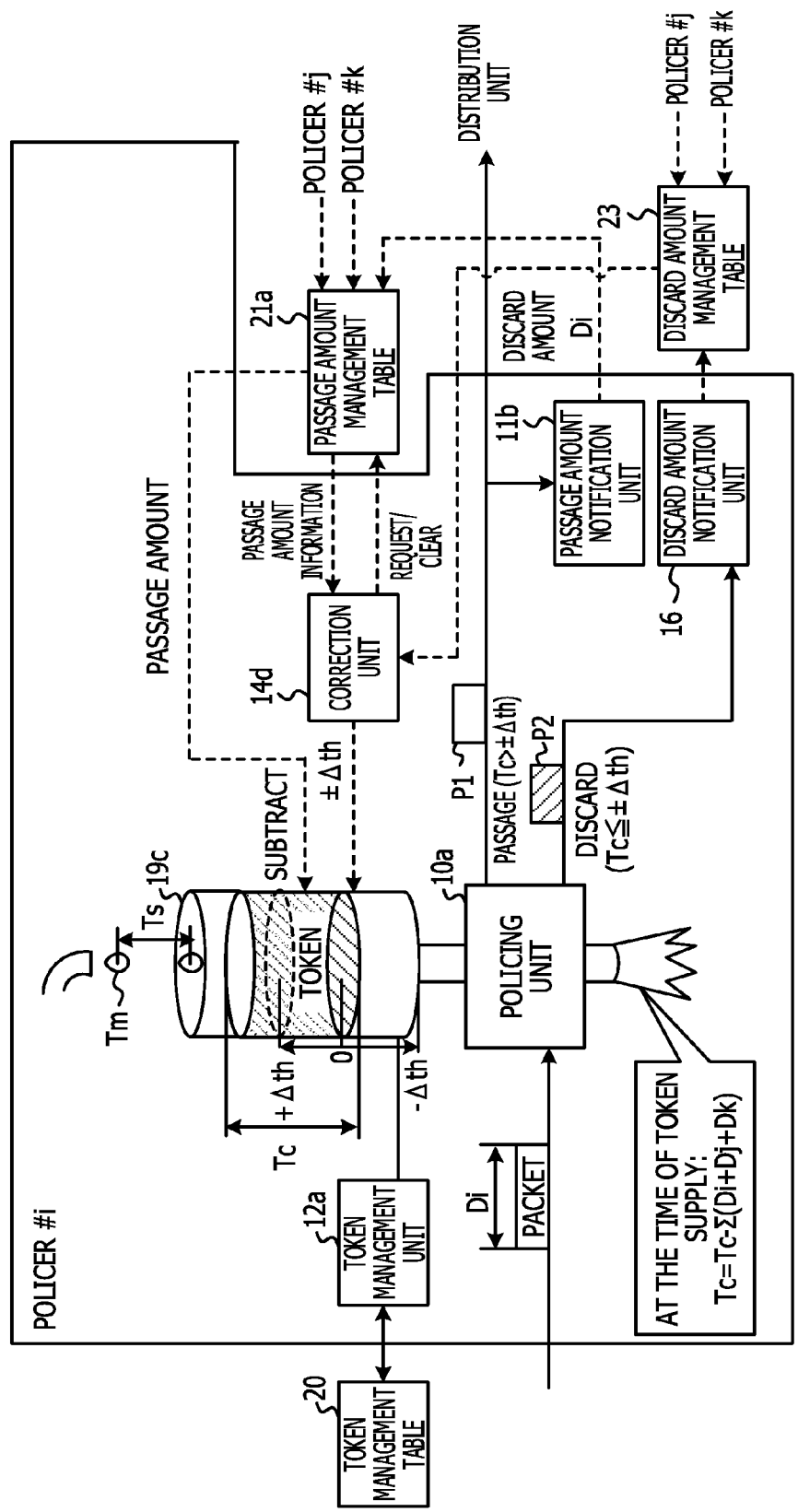
FIG. 41 is a block diagram illustrating a configuration of another embodiment of the bandwidth control unit which controls the passage ratio.

FIG. 41 is a block diagram illustrating a configuration of another embodiment of the bandwidth control unit 81 which controls the passage ratio. In FIG. 41, the same reference numerals are assigned to the constitutional elements which are common to those of FIGS. 34 and 8, and descriptions thereof will be omitted. In the meantime, in FIG. 41, only the configuration of the policer #i among the policers #i, #j, and #k within the same group is illustrated, but other policers #j and #k also have the same configuration. The policers #i, #j, and #k are equipped in the common network interface card 91 or individual network interface cards 91.

The policer #i includes the policing unit 10a, the passage amount notification unit 11b, the token management unit 12a functioning as the token bucket 19c, a correction unit 14d, and a discard amount notification unit 16.

The discard amount notification unit 16 detects a length of the packet P2 which is discarded and notifies the length to the discard amount management table 23 stored in the storage unit 915. The discard amount notification unit 16 of each of other policers #j and #k also detects the length of the packet P2 which is discarded and notifies the length of the discarded packet to the discard amount management table 23. The notified length of the packet P2 is added to the discard amount of the corresponding policer number within the discard amount management table 23. In the meantime, in the discard amount management table 23, the "discard amount [Byte]" of the packet is registered in corresponding with the "policer number" and the "policer number within a group" of the passage amount management table 21a or the input amount management table 22.

The correction unit 14d calculates the input amounts of the packets of the policer #i and other policers #j and #k from the passage amount and the discard amount of the packet of each of the policer #i and other policers #j and #k, respectively. More specifically, the input amount of the packet is calculated by totaling the passage amount and the discard amount of the packet.

$$NI(i)=NP(i)+ND(i) \tag{9}$$

$$\Sigma NI(s)=\Sigma NP(s)+\Sigma ND(s) \tag{10}$$

When it is assumed that the discard amount of the packet of the policer #i is ND(i) and a total discard amount of the packets of other policers #j and #k is ΣND(s), the input amount NI(i) of the packet of the policer #i and the total input amount ΣNI(s) of the packets of other policers #j and #k are calculated by Equation (9) and Equation (10), respectively.

$$\alpha = (ND(i) \times \Sigma NP(s) - NP(i) \times \Sigma ND(s))/(NP(i) + ND(i) + \Sigma NP(s) + \Sigma ND(s)) \quad (11)$$

Accordingly, the variable α is calculated by Equation (11) based on Equation (7), Equation (9), and Equation (10).

The correction unit 14d calculates the correction value (±Δth) based on the calculated variable α similarly as in the second embodiment illustrated in FIG. 34. The correction unit 14d clears the passage amount within the passage amount management table 21a and the discard amount within the discard amount management table 23 to 0 (zero) after the correction value is calculated. In the meantime, the correction value calculation processing is performed after the token is supplied.

According to the present embodiment, the policers #i, #j, and #k may calculate the correction value without cumulatively summing up the input amount of the packet. Further, the policers #i, #j, and #k may calculate the passage amount from the input amount and discard amount of the packet without cumulatively summing up the passage amount of packets in total.

Figure 42:
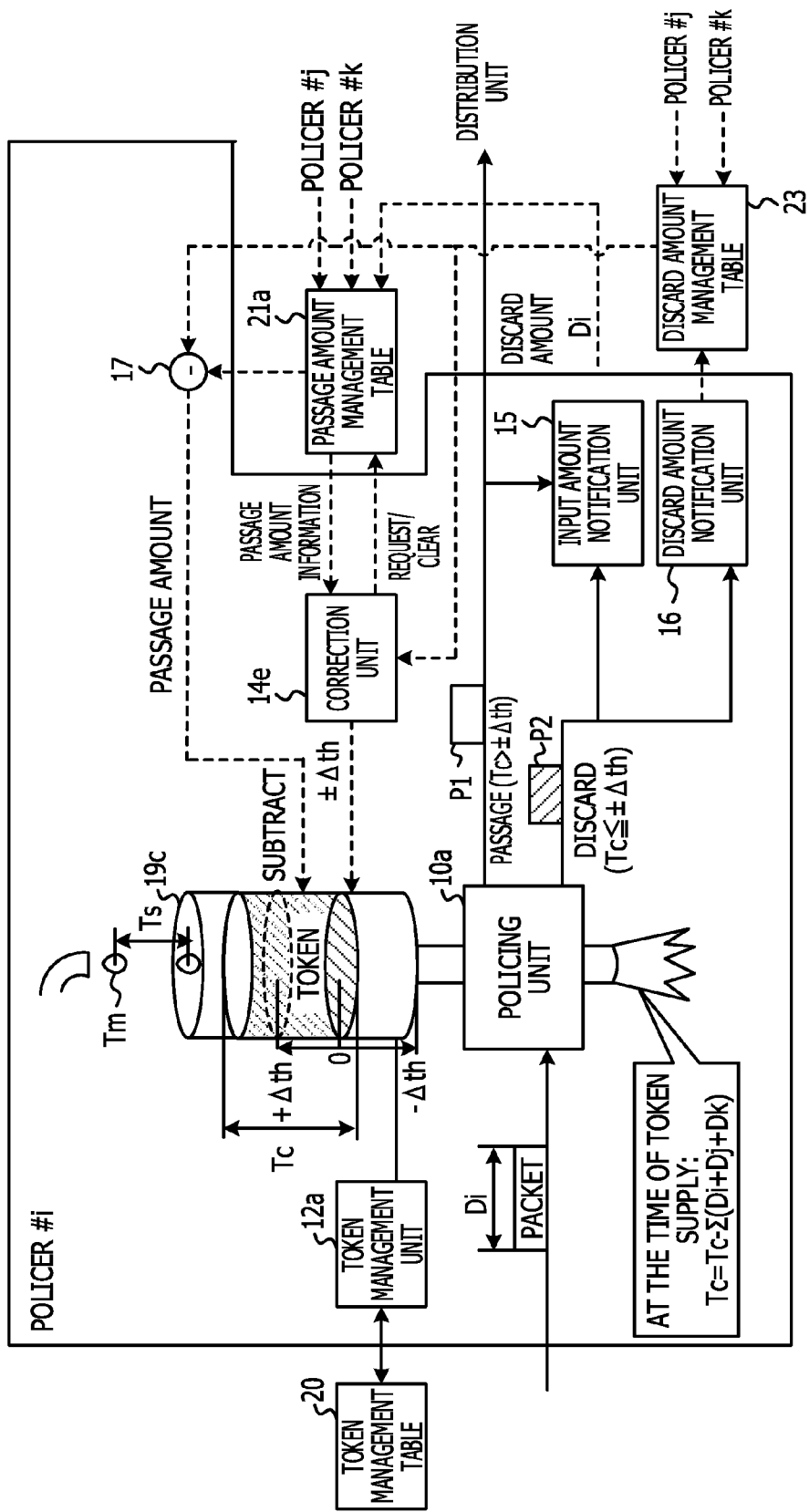
FIG. 42 is a block diagram illustrating a configuration of still another embodiment of the bandwidth control unit which controls the passage ratio.

FIG. 42 is a block diagram illustrating a configuration of still another embodiment of the bandwidth control unit 81 which controls the passage ratio. In FIG. 42, the same reference numerals are assigned to the constitutional elements which are common to those of FIGS. 34, 41, and 8, and descriptions thereof will be omitted. In the meantime, in FIG. 42, only the configuration of the policer #i among the policers #i, #j, and #k within the same group is illustrated, but other policers #j and #k also have the same configuration. The policers #i, #j, and #k are equipped in the common network interface card 91 or individual network interface cards 91, respectively.

The policer #i includes the policing unit 10a, the token management unit 12a functioning as the token bucket 19c, a correction unit 14e, the input amount notification unit 15, the discard amount notification unit 16, and a subtraction unit 17.

The correction unit 14e calculates the passage amounts of the packets of the policer #i and each of other policers #j and #k from the input amount and the discard amount of the policer #1 and other policers #j and #k, respectively. More specifically, the passage amount of the packet is calculated by subtracting the discard amount from the input amount.

$$NP(i) = NI(i) - ND(i) \quad (12)$$

$$\Sigma NP(s) = \Sigma NI(s) - \Sigma ND(s) \quad (13)$$

That is, the passage amount NI(i) of the packet of the policer #i and the total passage amount ΣNI(s) of the packets of other policers #j and #k are calculated by Equation (12) and Equation (13), respectively.

$$\alpha = (ND(i) \times \Sigma NI(s) - NI(i) \times \Sigma ND(s))/(NI(i) - F\Sigma NI(s)) \quad (14)$$

Accordingly, the variable α is calculated by Equation (14) based on Equation (7), Equation (9), and Equation (10).

The correction unit 14e calculates the correction value (±Δth) based on the calculated variable α similarly as in the embodiment illustrated in FIG. 34. The correction unit 14e clears the passage amount within the input amount management table 22 and the discard amount within the discard amount management table 23 to 0 (zero) after the correction value is calculated. In the meantime, the correction value calculation processing is performed after the token is supplied.

Further, the subtraction unit 17 calculates the passage amount of packets of the policer #i and the passage amount of packets of other policers #j and #k by subtracting the discard amount of the policer #i and the passage amount of packets of each of other policers #j and #k from the input amount of each of other policers #j and #k, respectively. The input amount and the discard amount of the packet are acquired from the input amount management table 22 and the discard amount management table 23, respectively. The subtraction unit 17 notifies the calculated passage amount of packets to the token management unit 12a to be synchronized with the token supply timing.

According to the present embodiment, the policers #i, #j, and #k may calculate the correction value without cumulatively summing up the passage amount of packets. In the meantime, in the second embodiment illustrated in FIGS. 34, 41, and 42, the correction unit 14c to 14e correct the threshold value which corresponds to the bottom of the token bucket 19c, but may correct the token accumulation amount Tc instead of the threshold value as described with reference to FIG. 18.

Figure 43:
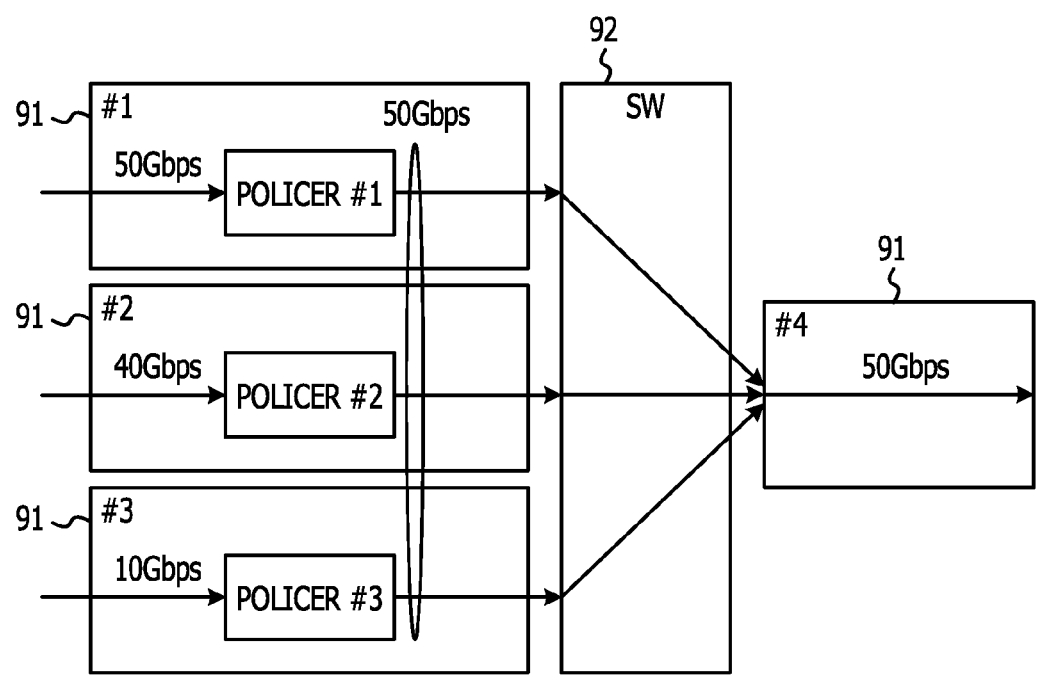
FIG. 43 is a diagram illustrating other conditions in the simulation of the bandwidth control unit.

Next, the simulation result of the output rate of the packet of the policer which performs the passage ratio equalizing control will be described by comparing with the policer in the comparative example (see, e.g., FIG. 4) and the policer in the passage amount equalizing control (see, e.g., FIG. 8). In FIG. 43, the conditions of the present simulation are illustrated.

In the present simulation, the grouped policers #1 to #3 are equipped in the network interface cards (#1 to #3) 91, respectively. The input rates of the packets of the policers #1 to #3 are 50 Gbps, 40 Gbps, and 10 Gbps, respectively, and the pass bandwidth of the packets of the policers #1 to #3 is limited to the total policing rate of 50 Gbps.

Accordingly, in a case of the passage amount equalizing control, the expected values of the output rates of the policers #1 to #3 are 20 Gbps, 20 Gbps, and 10 Gbps, respectively, and in a case of the passage ratio equalizing control, the expected values are 25 Gbps, 20 Gbps, and 5 Gbps, respectively. The packets outputted from the policer #1 to #3 are input to the network interface card (#4) 91 of the output side through the switch card 92.

In FIG. 44, the output rates of results of the present simulation are illustrated. The output rates of the policer #1 to #3 are illustrated along with the expected values regarding the comparative example (see, e.g., the "comparative example") illustrated in FIG. 4, the first embodiment (see, e.g., the "passage amount equalizing control") illustrated in FIG. 8, and the second embodiment (see, e.g., the "passage ratio equalizing control") illustrated in FIG. 34.

Further, the output rates of the policers #1 to #3 are represented by being classified into a case where the token supply timings are synchronized with each other between the policers (see, e.g., "at the time of token synchronization") and a case where the token supply timings are not synchronized with each other between the policers (see, e.g., "at the time of token asynchronization"). In the meantime, at the time of token asynchronization, the token supply timings of the policers #1 to #3 are deviated from each other, respectively, by one third of a single time period Ts.

In the comparative example, at the time of token synchronization, the output rate of each of the policers #1 to #3 is controlled depending on the input rate such that the passage ratios of the policers #1 to #3 are made equal to each other. In the meantime, at the time of token asynchronization, since the token supply timing of the policer #1 precedes those of other policers #2 and #3, the policer #1 consumes all the tokens to allow the packets to pass. Accordingly, the output rate of the policer #1 becomes 50 Gbps and the output rate of each of other policers #2 and #3 becomes 0 Gbps.

In the passage amount equalizing control, the output rate of each of the policers #1 to #3 is controlled such that the passage amount is equally controlled to be equal to the expected value, in both cases of at the time of token synchronization and at the time of token asynchronization. Further, in the passage ratio equalizing control, the output rate of each of the policers #1 to #3 is controlled such that the passage ratio is equally controlled to be equal (approximately 50% in the present example) to the expected value in both cases of at the time of token synchronization and at the time of token asynchronization.

As described above, the bandwidth control device (e.g., policer #i) according to the first and second embodiments determines whether the input packet is to be allowed to pass through based on the result of the comparison between the individual permissible passage amount (e.g., accumulation amount) Tc and the threshold value and belongs to a group of a plurality of bandwidth control devices (e.g., policers #i, #j, and #k) that allows the packet to pass or discards the packet.

The bandwidth control device includes the management unit (token management unit) 12a and the correction units 14c to 14e. The management unit 12a subtracts the passage amounts of packets of its own apparatus (e.g., first bandwidth control device) (e.g., policer #i) and one or more of other bandwidth control devices (e.g., second bandwidth control devices) (e.g., policer #j and #k) among the plurality of bandwidth control devices from the permissible passage amount of its own apparatus. The correction units 14c to 14e correct the permissible passage amount of its own apparatus or the threshold value of its own apparatus based on the result of the comparison between the ratio of the passage amount to the input amount of packet of its own apparatus and the ratio of the passage amounts to the input amounts of packets of one or more other bandwidth control devices.

According to the configuration described above, it is determined whether the packet is to be allowed to pass or not based on the result of the comparison between the permissible passage amount Tc from which the passage amount of packets of each of the bandwidth control devices of the same group is subtracted and the threshold value. Therefore, it is possible to limit a total bandwidth of the packets inputted to the plurality of bandwidth control devices in its entirety.

Further, the correction units 14c to 14e correct the permissible passage amount of its own apparatus or the threshold value of its own apparatus based on the ratio of the passage amount to the input amount of packet of its own apparatus and the ratio of the passage amounts to the input amounts of packets of one or more other bandwidth control devices. Accordingly, when the passage ratio of packets of the bandwidth control device is greater than that of other bandwidth control devices of the same group, the bandwidth control device becomes difficult to allow the packet to pass and otherwise, when the passage ratio of packets of the bandwidth control device is less than that of other bandwidth control devices, the bandwidth control device becomes easy to allow the packet to pass.

Accordingly, the bandwidth control device according to the first and second embodiments may reduce the difference in pass bandwidth of the packet between the bandwidth control device and other bandwidth control devices of the same group.

Further, the bandwidth control method according to the first and second embodiments is a method in which each of the plurality of bandwidth control devices (e.g., policers #i, #j, and #k) that belong to the same group determines whether the packet inputted to each of the plurality of bandwidth control devices is to be allowed to pass through based on the result of the comparison between the individual permissible passage amount and the threshold value, and allows the packet to pass or discards the packet according to the determination result. The bandwidth control method according to the present embodiment includes the following processes. Process (1): Subtracting the passage amounts of packets of one bandwidth control device or one or more of other bandwidth control devices among the plurality of bandwidth control devices from the permissible passage amount of the one bandwidth control device. Process (2): Correcting the permissible passage amount or the threshold value of one bandwidth control device based on the result of the comparison between the ratio of the passage amount to the input amount of packet of the one bandwidth control device and the ratio of the passage amounts to the input amounts of packets of one or more of other bandwidth control devices.

The bandwidth control method according to the present embodiment has the same configuration implemented by the constitutional elements of the bandwidth control device figuration and thus achieves the effect as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A bandwidth control device of a group formed by a first bandwidth control device and one or more second bandwidth control devices, the bandwidth control device comprising:
   a hardware processor configured to:
   subtract, when the first bandwidth control device or the one or more second bandwidth control devices allow a packet to pass, an amount of the passed packet from a permissible passage amount to be passed the first bandwidth control device; and
   correct the permissible passage amount of the first bandwidth control device or a threshold value of the first bandwidth control device based on a result of a comparison between a passage amount of packets passed the first bandwidth control device and passage amounts of packets passed the one or more second bandwidth control devices,
   wherein the first bandwidth control device is configured to determine whether a packet is to be allowed to pass through or not based on a result of a comparison between the permissible passage amount and the threshold value and to allow the packet to pass or discard the packet according to the determination result.

2. The bandwidth control device according to claim 1, wherein the hardware processor is configured to calculate a correction value of the permissible passage amount or the threshold value based on a difference between the passage amount of packets of the first bandwidth control device and an average value of the passage amounts of packets of the one or more second bandwidth control devices.

3. The bandwidth control device according to claim 2, wherein the hardware processor is configured to calculate the average value of the passage amount of packets of the second bandwidth control device of which the passage amount of packets is equal to or less than the threshold value or a value obtained by adding a predetermined value to the threshold value, among the one or more second bandwidth control devices.

4. The bandwidth control device according to claim 3, wherein the hardware processor is configured to maintain a current correction value in a case where the permissible passage amount of the one or more second bandwidth control devices is greater than the threshold value or the value obtained by adding the predetermined value to the threshold value.

5. The bandwidth control device according to claim 4, wherein the hardware processor is configured to maintain the current correction value in a case where a newly calculated correction value is greater than or equal to the current correction value.

6. The bandwidth control device according to claim 2, wherein the hardware processor is configured to calculate the average value of the passage amounts of packets of the second bandwidth control device for which the number of times in which the permissible passage amount is equal to or less than the threshold value or the value obtained by adding the predetermined value to the threshold value exceeds a predetermined number of times in several correction value calculations, among the one or more second bandwidth control devices.

7. The bandwidth control device according to claim 2, wherein the hardware processor is configured to calculate the average value of the passage amounts of packets of the second bandwidth control device for which the number of times in which the permissible passage amount is equal to or less than the threshold value or the value obtained by adding the predetermined value to the threshold value exceeds a predetermined number of times and of which the passage amount of the packets is greater than that of the first bandwidth control device in several correction value calculations, among the one or more second bandwidth control devices.

8. The bandwidth control device according to claim 1, wherein the hardware processor is configured to calculate a correction value of the permissible passage amount or the threshold value by adding a difference between the passage amount of packets of the first bandwidth control device and an average value of the passage amounts of packets of the one or more second bandwidth control devices to the correction value calculated at a previous time.

9. A bandwidth control device of a group formed by a first bandwidth control device and one or more second bandwidth control devices, the bandwidth control devices comprising:
   a hardware processor configured to:
   subtract, when the first bandwidth control device or the one or more second bandwidth control devices allow a packet to pass, an amount of the passed packet from a permissible passage amount to be passed the first bandwidth control device; and
   correct the permissible passage amount of the first bandwidth control device or a threshold value of the first bandwidth control device based on a result of a comparison between a first ratio of a passage amount to total data amount of packets input to the first bandwidth control device and a second ratio of passage amounts to total data amounts of packets input to the one or more second bandwidth control devices,
   wherein the first bandwidth control device is configured to determine whether a packet is to be allowed to pass through or not based on a result of a comparison between the permissible passage amount and the threshold value and to allow the packet to pass or discard the packet according to the determination result.

10. The bandwidth control device according to claim 9, wherein the hardware processor is configured to calculate the permissible passage amount or a correction value of the threshold value under the condition that the first ratio is made equal to the second ratio of the total passage amount to the total input amount of the packets of the one or more second bandwidth control devices.

11. The bandwidth control device according to claim 9, wherein the hardware processor is configured to calculate the permissible passage amount or a correction value of the threshold value using the correction value calculated at a previous time.

12. The bandwidth control device according to claim 9, wherein the hardware processor is configured to calculate the total data amount of packets input to the first bandwidth control device and the one or more second bandwidth control devices from the passage amount and a discard amount of the packets of each of the first bandwidth control device and the one or more second bandwidth control devices.

13. The bandwidth control device according to claim 9, wherein the hardware processor is configured to calculate the passage amounts of the first bandwidth control device and the one or more second bandwidth control devices from the input amount and a discard amount of the packet of each of the first bandwidth control device and the one or more second bandwidth control devices.

14. A bandwidth control method of a bandwidth control device of a group formed by a first bandwidth control device and one or more second bandwidth control devices, the bandwidth control method comprising:
   subtracting, when the first bandwidth control device or the one or more second bandwidth control devices allow a packet to pass, an amount of the passed packet from a permissible passage amount to be passed the first bandwidth control device;
   correcting the permissible passage amount of the first bandwidth control device or a threshold value of the first bandwidth control device based on a result of a comparison between a first ratio of a passage amount to a total data amount of packets input to the first bandwidth control device and a second ratio of passage amounts to total data amounts of the packets input to the one or more second bandwidth control devices;
   determining whether a packet is to be allowed to pass through or not based on a result of a comparison between the permissible passage amount and the threshold value; and
   allowing the packet to pass or discard the packet according to the determination result.

15. The bandwidth control method according to claim 14, wherein the permissible passage amount or a correction value of the threshold value is calculated under the condition that the first ratio is made equal to the second ratio of the total passage amount to the total input amounts of the packets of the one or more second bandwidth control devices.

16. The bandwidth control method according to claim 14, wherein the permissible passage amount or a correction value of the threshold value is calculated by using the correction value calculated at the previous time.

17. The bandwidth control method according to claim 14, wherein the total data amount of packets input to the first bandwidth control device and the one or more second bandwidth control devices are calculated from the passage amount and the discard amount of the packets of each of the first bandwidth control device and the one or more second bandwidth control devices.

18. The bandwidth control method according to claim 14, wherein the passage amounts of the first bandwidth control device and the one or more second bandwidth control devices are calculated from the input amount and the discard amount of the packet of each of the first bandwidth control device and the one or more second bandwidth control devices.

* * * * *